US011443738B2

(12) United States Patent
Choi et al.

(10) Patent No.: US 11,443,738 B2
(45) Date of Patent: Sep. 13, 2022

(54) ELECTRONIC DEVICE PROCESSING USER UTTERANCE AND CONTROL METHOD THEREOF

(71) Applicant: Samsung Electronics Co., Ltd., Suwon-si (KR)

(72) Inventors: Yuri Choi, Suwon-si (KR); Gahee Lee, Suwon-si (KR); Minseok Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 401 days.

(21) Appl. No.: 16/596,083

(22) Filed: Oct. 8, 2019

(65) Prior Publication Data

US 2020/0118562 A1 Apr. 16, 2020

(30) Foreign Application Priority Data

Oct. 10, 2018 (KR) .................. 10-2018-0120779

(51) Int. Cl.
*G10L 15/25* (2013.01)
*G06F 3/04845* (2022.01)
(Continued)

(52) U.S. Cl.
CPC ............ *G10L 15/22* (2013.01); *G06F 3/0481* (2013.01); *G06F 3/0484* (2013.01);
(Continued)

(58) Field of Classification Search
USPC ............... 704/1–10, 200–275; 382/100–103, 382/117–118, 155–160, 170, 218–224
See application file for complete search history.

(56) References Cited

U.S. PATENT DOCUMENTS 9,558,428 B1 * 1/2017 Green .................. G06V 20/30
2008/0037841 A1 2/2008 Ogawa
(Continued)

FOREIGN PATENT DOCUMENTS

| CN | 106796787 A | 5/2017 |
| CN | 108121490 A | 6/2018 |

(Continued)

OTHER PUBLICATIONS

International Search Report dated Jan. 31, 2020, issued in International Patent Application No. PCT/KR2019/013283.
(Continued)

*Primary Examiner* — Marcellus J Augustin
(74) *Attorney, Agent, or Firm* — Jefferson IP Law, LLP

(57) ABSTRACT

A user terminal processing a user utterance and a control method thereof are provided. A user terminal according to various embodiments of the disclosure includes a processor configured as a portion of the user terminal or configured to remotely communicate with the user terminal; and a memory configured to operatively connect to the processor, wherein the memory may be configured to store instructions configured, when executed, to enable the processor to, receive a user utterance, the user utterance including a first expression for classifying a plurality of images, transmit information about the received user utterance to an external electronic device using a communication circuit, and perform a task according to operation information by receiving the operation information associated with the user utterance, and the operation information may include an operation of providing the first expression and the second expression indicating attribute information about images classified by the first expression.

23 Claims, 50 Drawing Sheets

(51) Int. Cl.
*G06F 3/0488* (2022.01)
*G10L 15/22* (2006.01)
*G06F 3/0481* (2022.01)
*G06F 3/0484* (2022.01)
*G06K 9/62* (2022.01)
*G06F 3/04883* (2022.01)
*G06V 40/16* (2022.01)

(52) U.S. Cl.
CPC ....... *G06F 3/04883* (2013.01); *G06K 9/6267* (2013.01); *G06V 40/174* (2022.01); *G10L 2015/223* (2013.01)

(56) References Cited

U.S. PATENT DOCUMENTS

| | | | |
|---|---|---|---|
| 2010/0131275 A1 | 5/2010 | Paek | |
| 2011/0087666 A1* | 4/2011 | Chou | G06F 16/583 |
| | | | 707/737 |
| 2013/0254816 A1 | 9/2013 | Kennedy et al. | |
| 2014/0192134 A1* | 7/2014 | Jung | H04N 21/41407 |
| | | | 348/14.02 |
| 2015/0340033 A1 | 11/2015 | Di Fabbrizio et al. | |
| 2016/0350588 A1 | 12/2016 | Movellan et al. | |
| 2017/0133009 A1 | 5/2017 | Cho et al. | |
| 2017/0289444 A1* | 10/2017 | Han | H04N 9/045 |
| 2017/0301121 A1 | 10/2017 | Whitehill et al. | |
| 2018/0150280 A1 | 5/2018 | Rhee et al. | |
| 2018/0286400 A1* | 10/2018 | Seo | G10L 15/1815 |
| 2019/0260866 A1* | 8/2019 | Choi | G06F 3/04847 |

FOREIGN PATENT DOCUMENTS

| | | |
|---|---|---|
| EP | 2 312 462 A1 | 4/2011 |
| JP | 2008-146219 A | 6/2008 |
| KR | 10-2016-0044194 A | 4/2016 |
| KR | 10-2017-0054707 A | 5/2017 |

OTHER PUBLICATIONS

Chinese Office Action dated Mar. 2, 2022, issued in Chinese Patent Application No. 201910953329.2.

* cited by examiner

ELECTRONIC DEVICE PROCESSING USER UTTERANCE AND CONTROL METHOD THEREOF

CROSS-REFERENCE TO RELATED APPLICATION(S)

This application is based on and claims priority under 35 U.S.C. § 119(a) of a Korean patent application number 10-2018-0120779, filed on Oct. 10, 2018, in the Korean Intellectual Property Office, the disclosure of which is incorporated by reference herein in its entirety.

BACKGROUND

1. Field

The disclosure relates to a user terminal processing a user utterance and a method of controlling the same.

2. Description of the Related Art

A growing number of diverse services and additional functions are provided through electronic devices, for example, portable electronic devices including smartphones. To increase the utility of electronic devices and to meet different users' needs, communication service providers or electronic device manufacturers are providing a wide range of functions and are competitively developing electronic devices differentiated from those of other companies. Accordingly, various functions provided through electronic devices are also becoming more sophisticated.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a user terminal processing a user utterance and a method of controlling the same.

A user of an electronic device (e.g., a smartphone) may input an utterance (e.g., "Show me pictures taken yesterday") in order to use a service provided by an intelligent application (e.g., Samsung Bixby). The intelligent application may provide an intelligent service (e.g., arrange and display pictures taken yesterday) according to the user's utterance. As intelligent services are diversified, a user using an intelligent application wants to feel emotional satisfaction through an intelligent service. To meet such users' demands, technology must be developed in view of users' emotional satisfaction as well as the provision of functions required by users.

According to various embodiments of the disclosure, there is provided an electronic device capable of providing additional information other than a search condition requested by a user, thus enabling a user provided with an intelligent service to feel satisfied even from an emotional aspect.

According to various embodiments of the disclosure, there is provided a control method of an electronic device capable of providing additional information other than a search condition requested by a user, thus enabling a user provided with an intelligent service to feel satisfied even from an emotional aspect.

Additional aspects will be set forth in part in the description which follows and, in part, will be apparent from the description, or may be learned by practice of the presented embodiments.

In accordance with an aspect of the disclosure, an electronic device is provided. The electronic device includes at least one processor configured as a portion of the electronic device or configured to remotely communicate with the electronic device, and a memory configured to be disposed in the electronic device or outside the electronic device and to be operatively connected to the at least one processor, wherein the memory may be configured to store instructions configured, when executed, to enable the at least one processor to, receive a user utterance, the user utterance including a first expression for classifying a plurality of images, transmit information about the received user utterance to an external electronic device using a communication circuit, and perform a task according to operation information by receiving the operation information associated with the user utterance from the external electronic device on the basis of transmission, and the operation information may include an operation of providing the at least one first expression and at least one second expression indicating attribute information about a plurality of images classified by the at least one first expression.

In accordance with another aspect of the disclosure, a control method of an electronic device is provided. The control method includes receiving a user utterance, the user utterance including a first expression for classifying a plurality of images, transmitting information about the received user utterance to an external electronic device using a communication circuit of the electronic device, and performing a task according to operation information by receiving the operation information associated with the user utterance from the external electronic device on the basis of the transmission, wherein the operation information may include an operation of providing the at least one first expression and at least one second expression indicating attribute information about a plurality of images classified by the at least one first expression.

In accordance with another aspect of the disclosure, an electronic device is provided. The electronic device includes at least one processor configured as a portion of the electronic device or configured to remotely communicate with the electronic device, and a memory configured to be disposed in the electronic device or outside the electronic device and to be operatively connected to the at least one processor, wherein the memory may be configured to store instructions configured, when executed, to enable the at least one processor to, receive a user utterance, the user utterance including a first expression for classifying a plurality of images, and perform a task associated with the user utterance on the basis of reception of the utterance, and the task may include a task of providing the at least one first expression and at least one second expression indicating attribute information about a plurality of images classified by the at least one first expression.

Additional information other than a search condition requested by a user may be provided, thereby providing an intelligent service that enables a user, provided with the intelligent service, to feel satisfied even from an emotion aspect.

It will be apparent to those skilled in the art that the effects according to various embodiments are not limited to the foregoing effects, and various effects are included herein.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following detailed description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
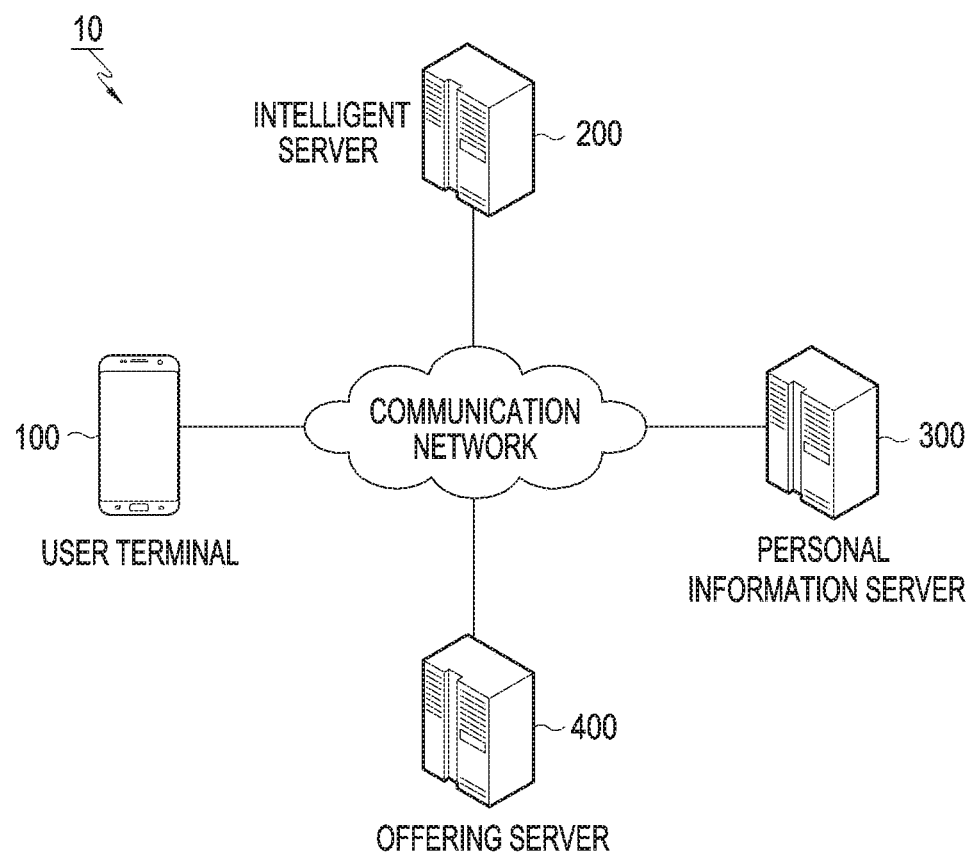
FIG. 1 illustrates an integrated intelligent system according to an embodiment of the disclosure.

FIG. 1 illustrates an integrated intelligent system according to an embodiment of the disclosure.

Referring to FIG. 1, an integrated intelligent system 10 may include a user terminal 100, an intelligent server 200, a personal information server 300, or an offering server 400.

According to various embodiments of the disclosure, the user terminal 100 may provide a necessary service for a user through an app (or an application, e.g., an alarm clock app, a message app, a photo (gallery) app, and the like) stored in the user terminal 100. For example, the user terminal 100 according to various embodiments of the disclosure may execute and operate an app through an intelligent app (or a voice recognition app) stored in the user terminal 100. The user terminal 100 according to various embodiments of the disclosure may receive user input to execute and operate the app through the intelligent app. The user input according to various embodiments of the disclosure may be received through, for example, a physical button, a touch pad, voice input, remote input, or the like. According to various embodiments, the user terminal 100 may include various terminal devices (or electronic devices) capable of connecting to the Internet, such as a mobile phone, a smartphone, a personal digital assistant (PDA), or a notebook computer.

According to various embodiments of the disclosure, the user terminal 100 may receive an utterance of the user as user input. The user terminal 100 according to various embodiments of the disclosure may receive the utterance of the user and may generate a command to operate an app on the basis of the utterance of the user. Accordingly, the user terminal 100 according to various embodiments of the disclosure may operate the app using the command.

The intelligent server 200 according to various embodiments of the disclosure may receive user voice input from the user terminal 100 through a communication network and may change the user voice input into text data. The intelligent server 200 according to various embodiments of the disclosure may generate (or select) a path rule on the basis of the text data. The path rule according to various embodiments of the disclosure may include information about an action (or operation) for performing the function of an app or information about a parameter necessary to execute the action. In addition, the path rule according to various embodiments of the disclosure may include the order of the action of the app. The user terminal 100 according to various embodiments of the disclosure may receive the path rule, may select an app according to the path rule, and may execute an action included in the path rule in the selected app.

The term "path rule" used herein may generally refer to a sequence of states for an electronic device to provide a task requested by a user, but is not limited thereto. That is, the path rule according to various embodiments of the disclosure may include information about the sequence of states. The task may be, for example, any action that an intelligent app can perform. The task may include generating a schedule, transmitting a photo to a desired counterpart, or providing weather information. The user terminal 100 may sequentially have at least one or more states (e.g., an operating state of the user terminal 100), thereby providing the task.

According to various embodiments of the disclosure, the path rule may be provided or generated by an artificially intelligent (AI) system. The AI system may be a rule-based system, a neural-network-based system (e.g., a feedforward neural network (FNN) or a recurrent neural network (RNN)). Alternatively, the AI system may be a combination of the foregoing systems or a different AI system. According to various embodiments of the disclosure, the path rule may be selected from a predefined set of path rules or may be generated in real time in response to a user request. For example, the AI system may select at least a path rule from among a plurality of predefined path rules or may generate a path rule dynamically (or in real time). In addition, the user terminal 100 according to various embodiments of the disclosure may use a hybrid system to provide a path rule.

According to various embodiments of the disclosure, the user terminal 100 may execute the action and may display a screen corresponding to the state of the user terminal 100 executing the action on a display. According to various embodiments of the disclosure, the user terminal 100 may execute the action, but may not display the result of executing the action on the display. For example, the user terminal 100 may execute a plurality of actions and may display only the result of executing some of the plurality of actions on the display. Specifically, the user terminal 100 according to various embodiments of the disclosure may display only the result of executing the last action on the display. In another example, the user terminal 100 according to various embodiments of the disclosure may display the result of executing the action on the display upon receiving user input.

The personal information server 300 according to various embodiments of the disclosure may include a database that stores user information. For example, the personal information server 300 according to various embodiments of the disclosure may receive user information (e.g., context information, app execution information, or the like) from the user terminal 100 and may store the user information in the database. The intelligent server 200 may receive the user information from the personal information server 300 through the communication network and may use the user information for generating a path rule for user input. According to various embodiments of the disclosure, the user terminal 100 may receive the user information from the personal information server 300 through the communication network and may use the user information as information for managing the database.

The offering server 400 according to various embodiments of the disclosure may include a database that stores information about the function of a terminal or the function of an application to be introduced or provided. For example, the offering server 400 according to various embodiments of the disclosure may receive the user information of the user terminal 100 from the personal information server 300 and may thus include a database of functions that the user can use. The user terminal 100 may receive the information about the function to be provided from the offering server 400 through the communication network and may provide the information for the user.

Figure 2A:
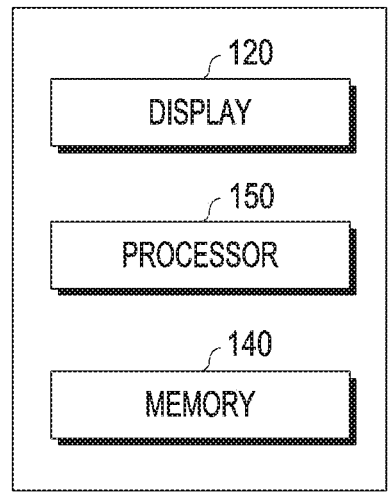
FIG. 2A is a block diagram illustrating a user terminal of an integrated intelligent system according to an embodiment of the disclosure.

FIG. 2A is a block diagram illustrating a user terminal 100 of an integrated intelligent system according to an embodiment of the disclosure.

Figure 2B:
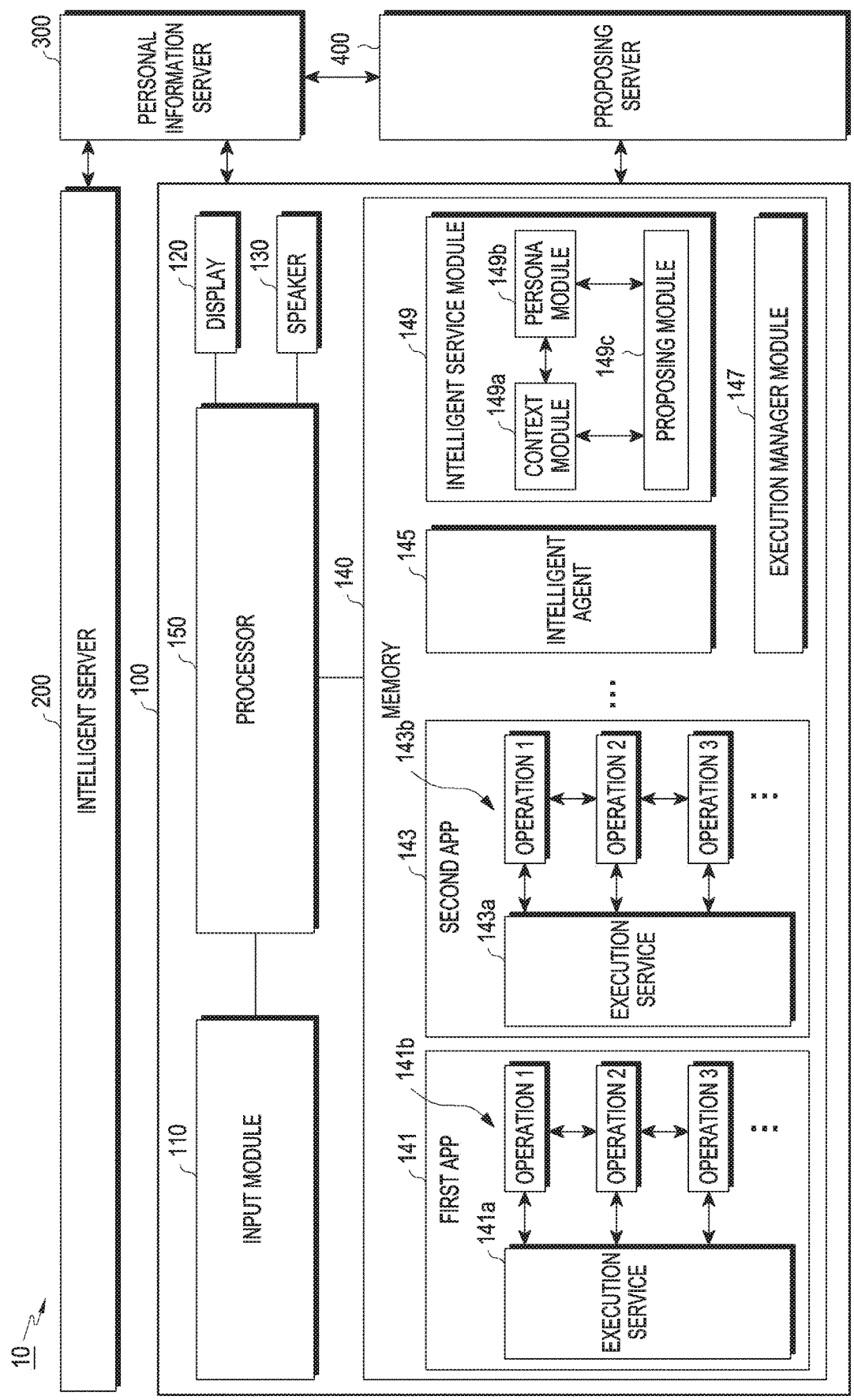
FIG. 2B is a block diagram illustrating a user terminal of an integrated intelligent system according to an embodiment of the disclosure.

FIG. 2B is a block diagram illustrating a user terminal 100 of an integrated intelligent system according to an embodiment of the disclosure.

Referring to FIG. 2A, the user terminal 100 according to various embodiments of the disclosure may include at least one of a display 120, a memory 140, and a processor 150. The display 120 according to various embodiments of the disclosure may include a touch screen display. The display 120 according to various embodiments of the disclosure may display various user interfaces. The memory 140 according to various embodiments of the disclosure may store various pieces of data used by at least one component (e.g., the processor 150) of the user terminal 100. A processor 150 according to various embodiments of the disclosure may execute software to control at least one other component (e.g., a hardware or software component) of the user terminal 100 connected to the processor 150 and may perform various types of data processing or operations.

Referring to FIG. 2B, the user terminal 100 according to various embodiments of the disclosure may include an input module 110, a display 120, a speaker 130, a memory 140, or a processor 150. The user terminal 100 may further include a housing, and the components of the user terminal 100 may be seated inside the housing or may be disposed on the housing. The user terminal 100 according to various embodiments of the disclosure may further include a communication circuit disposed inside the housing. The user terminal 100 according to various embodiments of the disclosure may transmit and receive data (or information) to and from an external server (e.g., an intelligent server 200) through the communication circuit.

According to various embodiments of the disclosure, the input module 110 may receive user input from a user. For example, the input module 110 according to various embodiments of the disclosure may receive user input from a connected external device (e.g., a keyboard or a headset). In another example, the input module 110 according to various embodiments of the disclosure may include a touch screen (e.g., a touch screen display) combined with the display 120. In still another example, the input module 110 may include a hardware key (or physical key) 112 disposed in the user terminal 100 (or the housing of the user terminal 100).

According to various embodiments of the disclosure, the input module 110 may include a microphone capable of receiving an utterance of the user as an audio signal. For example, the input module 110 according to various embodiments of the disclosure may include a speech input system and may receive an utterance of the user as an audio signal through the speech input system. The microphone may be exposed through, for example, a portion (e.g., a first portion) of the housing.

According to various embodiments of the disclosure, the display 120 may display an image, a video, and/or an execution screen of an application. For example, the display 120 may display a graphic user interface (GUI) of the app. According to various embodiments, the display 120 may be exposed through a portion (e.g., a second portion) of the housing.

According to various embodiments of the disclosure, the speaker 130 may output an audio signal. For example, the speaker 130 according to various embodiments of the disclosure may output an audio signal generated in the user terminal 100 to the outside. According to various embodiments, the speaker 130 may be exposed through a portion (e.g., a third portion) of the housing.

According to various embodiments of the disclosure, the memory 140 may store a plurality of apps (or applications) 141 and 143. The plurality of apps 141 and 143 may be, for example, programs for performing a function corresponding to user input. According to various embodiments, the memory 140 may store an intelligent agent 145, an execution manager module 147, or an intelligent service module 149. The intelligent agent 145, the execution manager module 147, and the intelligent service module 149 may be, for example, frameworks (or application frameworks) for processing received user input (e.g., user utterances).

According to various embodiments of the disclosure, the memory 140 may include a database that may store information necessary to recognize user input. For example, the memory 140 may include a log database that may store log information. In another example, the memory 140 may include a user database that may store user information.

According to various embodiments of the disclosure, the memory 140 may store the plurality of apps 141 and 143, and the plurality of apps 141 and 143 may be loaded and operated. For example, the plurality of apps 141 and 143 stored in the memory 140 may be loaded and operated by an execution manager module 147. The plurality of apps 141 and 143 may include execution service modules 141a and 143a that perform a function. In various embodiments, the plurality of apps 141 and 143 may execute a plurality of actions (e.g., a sequence of states) 141b and 143b through the execution service modules 141a and 143a in order to perform a function. That is, the execution service modules 141a and 143a may be activated by the execution manager module 147 and may execute the plurality of actions 141b and 143b.

According to various embodiments of the disclosure, when the actions 141b and 143b of the apps 141 and 143 are executed, an execution state screen corresponding to the execution of the actions 141b and 143b may be displayed on the display 120. The execution state screen according to various embodiments of the disclosure may be, for example, a screen indicating the completion of the actions 141b and 143b. In another example, the execution state screen may be a screen displaying the state in which the execution of the actions 141b and 143b is suspended (partial landing, e.g., when a parameter necessary for the actions 141b and 143b is not input).

According to various embodiments of the disclosure, the execution service modules 141a and 143a may execute the actions 141b and 143b according to a path rule. For example, the execution service modules 141a and 143a according to various embodiments of the disclosure may be activated by the execution manager module 147, may receive an execution request from the execution manager module 147 according to the path rule, and may perform the actions 141b and 143b according to the execution request, thereby executing the functions of the apps 141 and 143. When the execution of the actions 141b and 143b is completed, the execution service modules 141a and 143a may transmit information indicating completion to the execution manager module 147.

According to various embodiments of the disclosure, when the plurality of actions 141b and 143b is executed in the apps 141 and 143, the plurality of actions 141b and 143b may be sequentially executed. When the execution of one action (e.g., action 1 of a first app 141 and action 1 of a second app 143) is completed, the execution service modules 141a and 143a may then open the next action (e.g., action 2 of the first app 141 and action 2 of the second app 143), and may transmit information indicating completion to the execution manager module 147. Opening any action may be understood as transitioning any action to an executable state or preparing any action for execution. That is, when an action is not open, the action cannot be executed. Upon receiving the information indicating completion, the execution manager module 147 may transmit an execution request for the next action (e.g., action 2 of the first app 141 and action 2 of the second app 143) to the execution service modules. According to various embodiments, when the plurality of apps 141 and 143 are executed, the plurality of apps 141 and 143 may be sequentially executed. For example, when the execution of the last action of the first app 141 (e.g., action 3 of the first app 141) is completed and information indicating completion is received, the execution manager module 147 may transmit an execution request for a first action of the second app 143 (e.g., action 1 of the second app 143) to the execution service module 143a.

According to various embodiments of the disclosure, when the plurality of actions 141b and 143b is executed in the apps 141 and 143, a screen generated as a result of execution of each of the plurality of executed actions 141b and 143b may be displayed on the display 120. According to various embodiments, only some of a plurality of screens generated as a result of execution of the plurality of executed actions 141b and 143b may be displayed on the display 120.

According to various embodiments of the disclosure, the memory 140 may store an intelligent app (e.g., a voice recognition app) interworking with the intelligent agent 145. The app interworking with the intelligent agent 145 according to various embodiments of the disclosure may receive and process an utterance of the user as an audio signal. According to various embodiments, the app interworking with the intelligent agent 145 may be operated by specific input (e.g., input through the hardware key, input through the touch screen, or specific voice input) made through the input module 110.

According to various embodiments of the disclosure, the intelligent agent 145, the execution manager module 147, or the intelligent service module 149 stored in the memory 140 may be executed by the processor 150. A function of the intelligent agent 145, the execution manager module 147, or the intelligent service module 149 according to various embodiments of the disclosure may be implemented by the processor 150. Functions of the intelligent agent 145, the execution manager module 147, and the intelligent service module 149 according to various embodiments of the disclosure will be described with reference to the operation of the processor 150. According to various embodiments, the intelligent agent 145, the execution manager module 147, or the intelligent service module 149 stored in the memory 140 may be configured not only as software but also as hardware.

According to various embodiments of the disclosure, the processor 150 may control the overall operation of the user terminal 100. For example, the processor 150 may control the input module 110 to receive user input. The processor 150 according to various embodiments of the disclosure may control the display 120 to display an image. The processor 150 according to various embodiments of the disclosure may control the speaker 130 to output an audio signal. The processor 150 according to various embodiments of the disclosure may control the memory 140 to execute a program and to invoke or store necessary information.

According to various embodiments of the disclosure, the processor 150 may execute the intelligent agent 145, the execution manager module 147, or the intelligent service module 149 stored in the memory 140. Accordingly, the processor 150 according to various embodiments of the disclosure may implement the function of the intelligent agent 145, the execution manager module 147, or the intelligent service module 149.

According to various embodiments of the disclosure, the processor 150 may execute the intelligent agent 145 to generate a command to operate an app on the basis of an audio signal received via user input. According to various embodiments, the processor 150 may execute the execution manager module 147 to execute the apps 141 and 143 stored in the memory 140 according to the generated command. According to various embodiments, the processor 150 may execute the intelligent service module 149 to manage the user information and to process user input using the user information.

The processor 150 according to various embodiments of the disclosure may execute the intelligent agent 145 to transmit user input, received through the input module 110, to the intelligent server 200 and to process the user input through the intelligent server 200.

According to various embodiments of the disclosure, the processor 150 may execute the intelligent agent 145 to preprocess the user input before transmitting the user input to the intelligent server 200. According to various embodiments, the intelligent agent 145 may include an adaptive echo canceller (AEC) module, a noise suppression (NS) module, an endpoint detection (EPD) module, or an automatic gain control (AGC) module in order to preprocess the user input. The adaptive echo canceller module according to various embodiments of the disclosure may eliminate an echo included in the user input. The noise suppression module according to various embodiments of the disclosure may suppress background noise included in the user input. The endpoint detection module according to various embodiments of the disclosure may detect an endpoint of a user voice included in the user input and may discover a portion including the user voice using the detected endpoint. The automatic gain control module may recognize the user input and may adjust the volume of the user input appropriately in order to process the recognized user input. According to various embodiments, the processor 150 may execute all of the preprocessing components in order to improve performance. However, in other embodiments, the processor 150 may execute some of the preprocessing components in order to operate with a low power.

According to various embodiments of the disclosure, the intelligent agent 145 may execute a wake-up recognition module stored in the memory 140 in order to recognize a call from the user. Accordingly, the processor 150 according to various embodiments of the disclosure may recognize a wake-up command of the user through the wake-up recognition module, and may execute the intelligent agent 145 to receive user input when receiving the wake-up command. The wake-up recognition module according to various embodiments of the disclosure may be configured as a low-power processor (e.g., a processor included in an audio codec). According to various embodiments, the processor 150 may execute the intelligent agent 145 when receiving user input through the hardware key. When the intelligent agent 145 is executed, the intelligent app (e.g., the voice recognition app) interworking with the intelligent agent 145 may be executed.

According to various embodiments of the disclosure, the intelligent agent 145 may include a voice recognition module for executing user input. The processor 150 may recognize user input to execute an action in an app through the voice recognition module. For example, the processor 150 may recognize limited user (voice) input (e.g., an utterance like "click" to execute a photographing action during the execution of a camera app) to execute an action, such as the wake-up command, in the apps 141 and 143 through the voice recognition module. The processor 150 according to various embodiments of the disclosure may recognize and quickly process a user command that can be processed in the user terminal 100 through the voice recognition module to assist the intelligent server 200. According to various embodiments, the voice recognition module of the intelligent agent 145 for executing user input may be implemented in an app processor.

According to various embodiments of the disclosure, the voice recognition module (including a voice recognition module of a wake-up module) of the intelligent agent 145 may recognize user input using an algorithm for recognizing a voice. The algorithm used to recognize a voice according to various embodiments of the disclosure may be, for example, at least one of a hidden Markov model (HMM) algorithm, an artificial neural network (ANN) algorithm, or a dynamic time warping (DTW) algorithm.

According to various embodiments of the disclosure, the processor 150 may execute the intelligent agent 145 to convert the voice input of the user into text data. For example, the processor 150 according to various embodiments of the disclosure may transmit the voice of the user to the intelligent server 200 through the intelligent agent 145 and may receive text data corresponding to the voice of the user from the intelligent server 200. Accordingly, the processor 150 according to various embodiments of the disclosure may display the converted text data on the display 120.

According to various embodiments of the disclosure, the processor 150 may execute the intelligent agent 145 to receive a path rule from the intelligent server 200. According to various embodiments, the processor 150 may transmit the path rule to the execution manager module 147 through the intelligent agent 145.

According to various embodiments of the disclosure, the processor 150 may execute the intelligent agent 145 to transmit an execution result log according to the path rule received from the intelligent server 200 to the intelligent service module 149. The transmitted execution result log may be accumulated and managed in user preference information of the persona module 149b.

According to various embodiments of the disclosure, the processor 150 may execute the execution manager module 147 to receive the path rule from the intelligent agent 145, thus executing the apps 141 and 143 and enabling the apps 141 and 143 to execute the actions 141b and 143b included in the path rule. For example, the processor 150 may transmit command information (e.g., path rule information) for executing the actions 141b and 143b to the apps 141 and 143 through the execution manager module 147 and may receive information indicating completion of the actions 141b and 143b from the apps 141 and 143.

According to various embodiments of the disclosure, the processor 150 may execute the execution manager module 147 to transmit the command information (e.g., path rule information) for executing the actions 141b and 143b of the apps 141 and 143 between the intelligent agent 145 and the apps 141 and 143. The processor 150 may bind the apps 141 and 143 to be executed according to the path rule through the execution manager module 147 and may transmit the command information (e.g., path rule information) about the actions 141b and 143b included in the path rule to the apps 141 and 143. For example, the processor 150 may sequentially transmit the actions 141b and 143b included in the path rule to the apps 141 and 143 through the execution manager module 147 and may sequentially execute the actions 141b and 143b of the apps 141 and 143 according to the path rule.

According to various embodiments of the disclosure, the processor 150 may execute the execution manager module 147 to manage the execution state of the actions 141b and 143b of the apps 141 and 143. For example, the processor 150 may receive information about the execution state of the actions 141b and 143b from the apps 141 and 143 through the execution manager module 147. When the execution state of the actions 141b and 143b is, for example, an inactive state (partial landing, e.g., when a parameter necessary for the actions 141b and 143b is not input), the processor 150 may transmit information about the inactive state to the intelligent agent 145 through the execution manager module 147. The processor 150 may request the user to input necessary information (e.g., parameter information) using the received information through the intelligent agent 145. When the execution state of the actions 141b and 143b is a different state, for example, an active state, the processor 150 may receive an utterance from the user through the intelligent agent 145. The processor 150 may transmit information about the apps 141 and 143 being executed and the execution state of the apps 141 and 143 to the intelligent agent 145 through the execution manager module 147. The processor 150 may transmit the utterance of the user to the intelligent server 200 through the intelligent agent 145. The processor 150 may receive parameter information about the utterance of the user from the intelligent server 200 through the intelligent agent 145. The processor 150 may transmit the received parameter information to the execution manager module 147 through the intelligent agent 145. The execution manager module 147 may change a parameter of the actions 141b and 143b to a new parameter using the received parameter information.

According to various embodiments of the disclosure, the processor 150 may execute the execution manager module 147 to transmit parameter information included in the path rule to the apps 141 and 143. When the plurality of apps 141 and 143 are sequentially executed according to the path rule, the execution manager module 147 may transmit the parameter information included in the path rule from one app to another app.

According to various embodiments of the disclosure, the processor 150 may execute the execution manager module 147 to receive a plurality of path rules. The processor 150 may select a plurality of path rules on the basis of the utterance of the user through the execution manager module 147. For example, when the utterance of the user specifies an app 141 to execute some actions 141b but does not specify different apps 143 to execute other actions 143b through the execution manager module 147, the processor 150 may receive a plurality of different path rules for respectively executing the same app 141 (e.g., a gallery app) to execute the actions 141b and the different apps 143 (e.g., a message app and a telegram app) to execute the other actions 143b. The processor 150 may execute, for example, identical actions 141b and 143b (e.g., successive identical actions 141b and 143b) of the plurality of path rules through the execution manager module 147. After the identical actions are executed, the processor 150 may display a state screen for selecting different apps 141 and 143 respectively included in the plurality of path rules through the execution manager module 147 on the display 120.

According to various embodiments of the disclosure, the intelligent service module 149 may include a context module 149a, the persona module 149b, or an offering module 149c.

The processor 150 according to various embodiments of the disclosure may execute the context module 149a to collect information about the current state of the apps 141 and 143 from the apps 141 and 143. For example, the processor 150 may execute the context module 149a to receive context information indicating the current state of the apps 141 and 143 and may collect information about the current state of the apps 141 and 143 through the received context information.

The processor 150 according to various embodiments of the disclosure may execute the persona module 149b to manage personal information about the user using the user terminal 100. For example, the processor 150 may execute the persona module 149b to collect usage information about the user terminal 100 and an execution result and may manage the personal information about the user using the collected usage information about the user terminal 100 and the execution result.

The processor 150 according to various embodiments of the disclosure may execute the offering module 149c to predict the intent of the user and may recommend a command to the user on the basis of the intent of the user. For example, the processor 150 may execute the offering module 149c to recommend a command to the user according to the current state of the user (e.g., time, a place, a condition, or an app).

Figure 3:
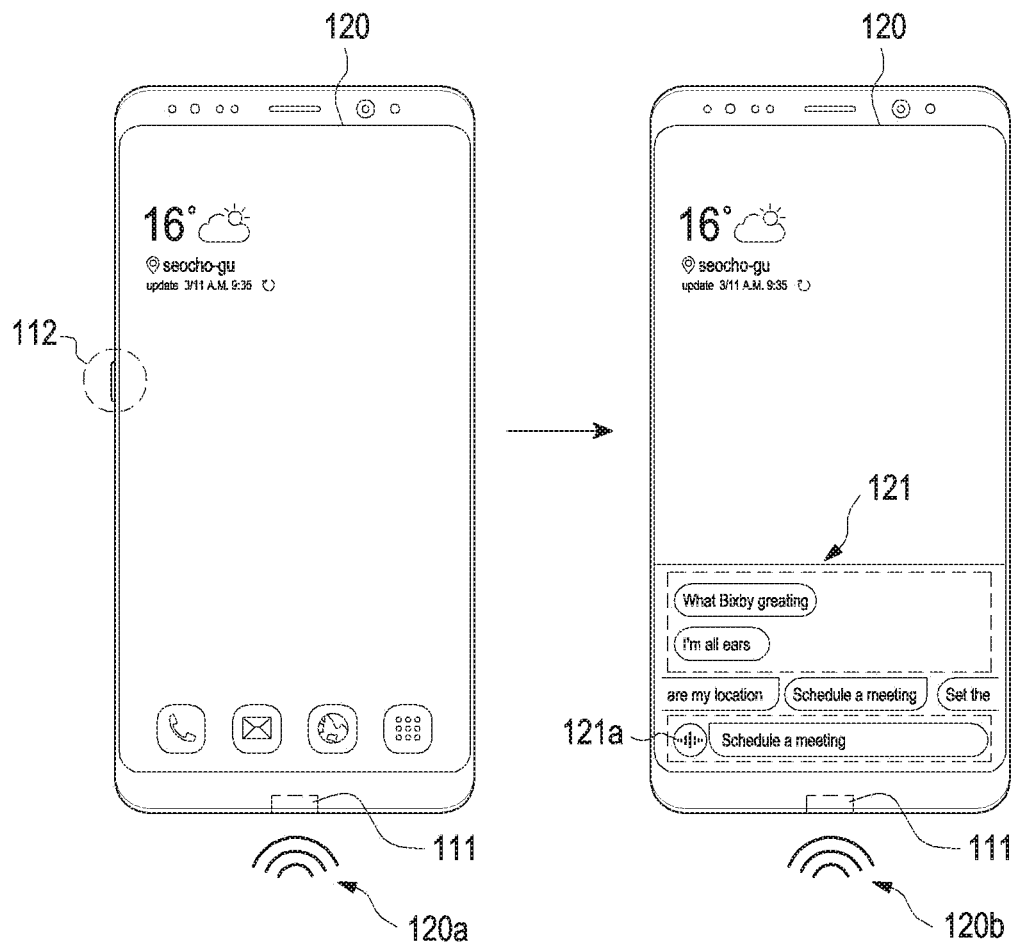
FIG. 3 illustrates an operation of executing an intelligent app of a user terminal according to an embodiment of the disclosure.

FIG. 3 illustrates an operation of executing an intelligent app of a user terminal according to an embodiment of the disclosure.

Referring to FIG. 3, a user terminal 100 receives user input and executes an intelligent app (e.g., a voice recognition app) interworking with an intelligent agent 145.

According to various embodiments of the disclosure, the user terminal 100 may execute the intelligent app for recognizing a voice through a hardware key 112. For example, upon receiving user input through the hardware key 112, the user terminal 100 may display a user interface (UI) 121 of the intelligent app on a display 120. In one example, with the UI 121 of the intelligent app displayed on the display 120, a user may touch a voice recognition button 121a on the UI 121 of the intelligent app in order to input a voice 120b. In another example, the user may input a voice 120b by continuously pressing the hardware key 112 in order to input the voice 120b.

According to various embodiments of the disclosure, the user terminal 100 may execute the intelligent app for recognizing the voice through a microphone 111. For example, when a specified utterance (e.g., "Wake up!") is input 120a through the microphone 111, the user terminal 100 may display the UI 121 of the intelligent app on the display 120.

Figure 4:
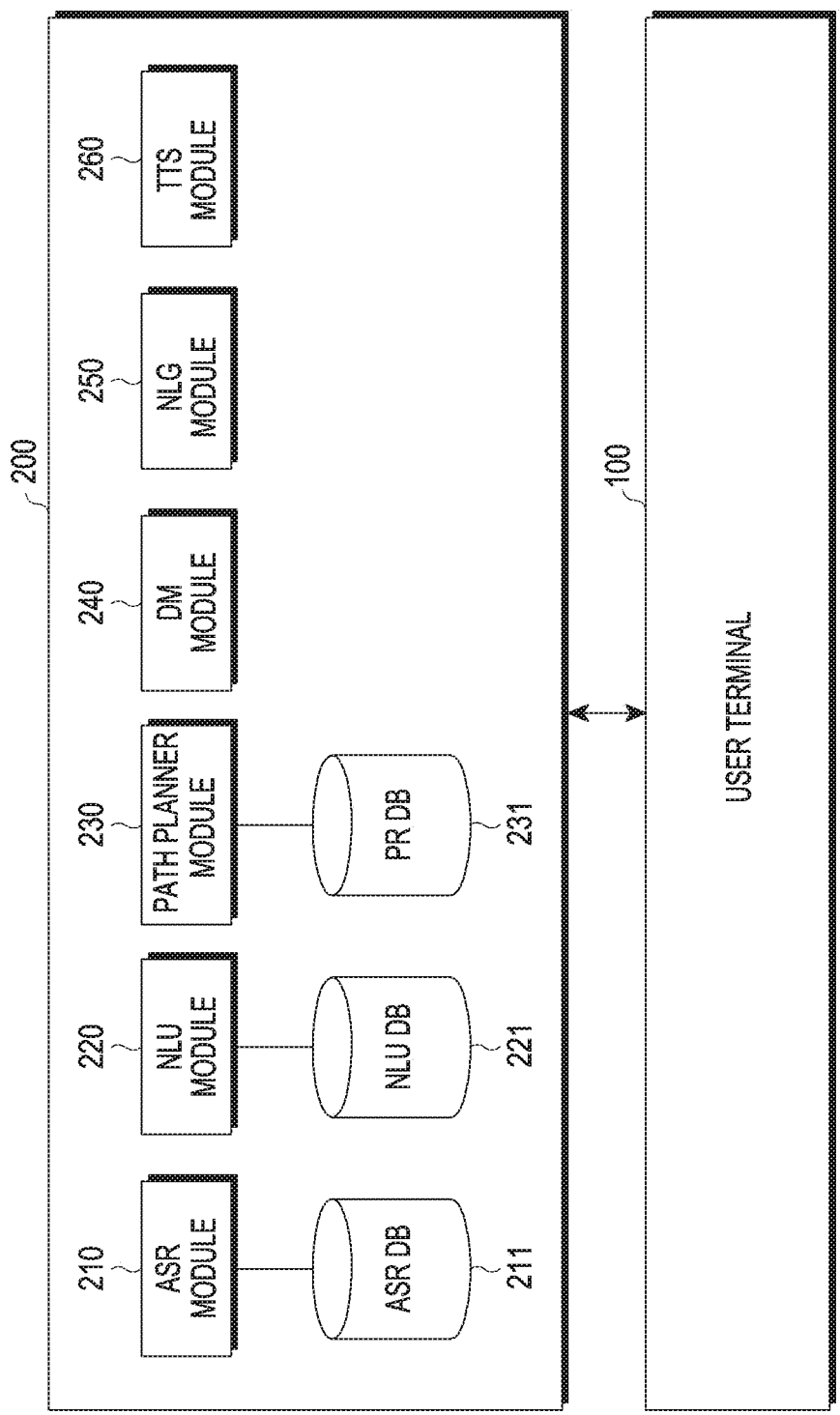
FIG. 4 is a block diagram illustrating an intelligent server of an integrated intelligent system according to an embodiment of the disclosure.

FIG. 4 is a block diagram illustrating an intelligent server of an integrated intelligent system according to an embodiment of the disclosure.

Referring to FIG. 4, the intelligent server 200 may include an automatic speech recognition (ASR) module 210, a natural language understanding (NLU) module 220, a path planner module 230, a dialogue manager (DM) module 240, a natural language generator (NLG) module 250, or a text-to-speech (TTS) module 260. According to various embodiments, the intelligent server 200 may include a communication circuit, a memory, and a processor. The processor may execute an instruction stored in the memory, and may operate the ASR module 210, the natural language understanding module 220, the path planner module 230, the DM module 240, the NLG module 250, and the text-to-speech module 260. The intelligent server 200 may transmit and receive data (or information) to and from an external electronic device (e.g., a user terminal 100) through the communication circuit.

The NLU module 220 or the path planner module 230 of the intelligent server 200 may generate a path rule.

According to various embodiments of the disclosure, the ASR module 210 may convert user input, received from the user terminal 100, into text data.

According to various embodiments of the disclosure, the ASR module 210 may convert user input, received from the user terminal 100, into text data. For example, the ASR module 210 may include an utterance recognition module. The utterance recognition module may include an acoustic model and a language model. For example, the acoustic model may include information about a vocalization, and the language model may include phonemic unit information and information about a combination of phonemic unit information. The utterance recognition module may convert a user utterance into text data using the information about the vocalization and the phonemic unit information. Information about the acoustic model and the language model may be stored, for example, in an automatic speech recognition database (ASR DB) 211.

According to various embodiments of the disclosure, the NLU module 220 may perform syntactic analysis or semantic analysis, thereby determining the intent of the user. The syntactic analysis may be performed by dividing user input into syntactic units (e.g., words, phrases, morphemes, and the like) and determining which syntactic elements the divided units have. The semantic analysis may be performed using semantic matching, rule matching, formula matching, and the like. Accordingly, the NLU module 220 may obtain a domain, intent, or a parameter (or slot) necessary to express the intent from the user input.

According to various embodiments of the disclosure, the NLU module 220 may determine the intent of the user and a parameter using a matching rule, which is divided into a domain, an intent, and a parameter (or a slot) necessary to determine the intent. For example, one domain (e.g. an alarm) may include a plurality of intents (e.g., setting an alarm, disarming an alarm, and the like), and one intent may include a plurality of parameters (e.g. a time, the number of repetitions, an alarm sound, and the like). A plurality of rules may include, for example, one or more essential element parameters. The matching rule may be stored in a natural language understanding database (NLU DB) 221.

According to various embodiments of the disclosure, the NLU module 220 may identify the meaning of a word extracted from the user input using linguistic features (e.g., syntactic elements), such as a morpheme and a phrase, and may match the identified meaning of the word and a domain and intent, thereby determining the intent of the user. For example, the NLU module 220 may calculate how often the word extracted from the user input is included in each domain and each intention, thereby determining the intent of the user. According to various embodiments, the NLU module 220 may determine a parameter of the user input using the word on the basis of which the intent is identified. According to various embodiments, the NLU module 220 may determine the intent of the user using the natural language understanding database 221, which stores linguistic features for determining the intent of user input. According to other embodiments, the NLU module 220 may determine the intent of the user using a personal language model (PLM). For example, the NLU module 220 may determine the intent of the user using personal information (e.g., a contact list or a music list). The personal language model may be stored, for example, in the NLU database 221. According to various embodiments, not only the NLU module 220 but also the ASR module 210 may recognize the voice of the user with reference to the personal language model stored in the NLU database 221.

According to various embodiments of the disclosure, the NLU module 220 may generate a path rule on the basis of the intent of the user input and the parameter. For example, the NLU module 220 may select an app to be executed on the basis of the intent of the user input and may determine an action to be performed in the selected app. The NLU module 220 may determine a parameter corresponding to the determined action and may thus generate a path rule. According to various embodiments, the path rule generated by the NLU module 220 may include information about an app to be executed, an action (e.g., at least one state) to be executed in the app, and a parameter necessary to execute the action.

According to various embodiments of the disclosure, the NLU module 220 may generate one path rule or a plurality of path rules on the basis of the intent of the user input and the parameter. For example, the NLU module 220 may receive a path rule set corresponding to the user terminal 100 from the path planner module 230 and may map the intent of the user input and the parameter to the received path rule set, thereby determining a path rule.

According to various embodiments of the disclosure, the NLU module 220 may generate one path rule or a plurality of path rules by determining an app to be executed, an action to be executed in the app, and a parameter necessary to execute the action on the basis of the intent of the user input and the parameter. For example, the NLU module 220 may arrange the app to be executed and the action to be executed in the app in an ontological form or in the form of a graph model according to the intent of the user input using information about the user terminal 100, thereby generating a path rule. The generated path rule may be stored, for example, in a path rule database (PR DB) 231 through the path planner module 230. The generated path rule may be added to a path rule set in the PR DB 231.

According to various embodiments of the disclosure, the NLU module 220 may select at least one path rule from among the plurality of generated path rules. For example, the NLU module 220 may select an optimal path rule from among the plurality of path rules. In another example, the NLU module 220 may select a plurality of path rules when only some actions are specified on the basis of the user utterance. The NLU module 220 may determine one path rule among the plurality of path rules by additional user input.

According to various embodiments of the disclosure, the NLU module 220 may transmit a path rule to the user terminal 100 upon request with respect to the user input. For example, the NLU module 220 may transmit one path rule corresponding to the user input to the user terminal 100. In another example, the NLU module 220 may transmit a plurality of path rules corresponding to the user input to the user terminal 100. The plurality of path rules may be generated by the natural language understanding module 220, for example, when only some actions are specified on the basis of the user utterance.

According to various embodiments of the disclosure, the path planner module 230 may select at least one path rule from among a plurality of path rules.

According to various embodiments of the disclosure, the path planner module 230 may transmit a path rule set including a plurality of path rules to the natural language understanding module 220. The plurality of path rules of the path rule set may be stored in a table in the PR DB 231 connected to the path planner module 230. For example, the path planner module 230 may transmit a path rule set corresponding to the information (e.g., OS information or app information) about the user terminal 100, received from an intelligent agent 145, to the natural language understanding module 220. The table stored in the PR DB 231 may be stored, for example, by domain or domain version.

According to various embodiments of the disclosure, the path planner module 230 may select one path rule or a plurality of path rules from a path rule set and may transmit the selected path rule or path rules to the natural language understanding module 220. For example, the path planner module 230 may match the intent of the user and the parameter with the path rule set corresponding to the user terminal 100, may select one path rule or a plurality of path rules, and may transmit the selected path rule or path rules to the natural language understanding module 220.

According to various embodiments of the disclosure, the path planner module 230 may generate one path rule or a plurality of path rules using the intent of the user and the parameter. For example, the path planner module 230 may determine an app to be executed and an action to be executed in the app on the basis of the intent of the user and the parameter and may generate one path rule or a plurality of path rules. According to various embodiments, the path planner module 230 may store the generated path rule in the PR DB 231.

According to various embodiments of the disclosure, the path planner module 230 may store the path rule generated by the NLU module 220 in the PR DB 231. The generated path rule may be added to a path rule set stored in the PR DB 231.

According to various embodiments of the disclosure, the table stored in the PR DB 231 may include a plurality of path rules or a plurality of path rule sets. The plurality of path rules or the plurality of path rule sets may reflect the kind, version, type, or characteristics of the device that performs each path rule.

According to various embodiments of the disclosure, the dialog manager module 240 may determine whether the intent of the user identified by the NLU module 220 is clear. For example, the dialog manager module 240 may determine whether the intent of the user is clear on the basis of whether parameter information is sufficient. The dialog manager module 240 may determine whether the parameter identified by the NLU module 220 is sufficient to perform a task. According to various embodiments, when the intent of the user is not clear, the dialog manager module 240 may provide feedback to request necessary information from the user. For example, the dialog manager module 240 may provide feedback requesting parameter information for determining the intent of the user.

According to various embodiments of the disclosure, the dialog manager module 240 may include a content provider module. The content provider module may generate the result of performing a task corresponding to the user input when an action can be performed on the basis of the intent and the parameter identified by the natural language understanding module 220. According to various embodiments, the dialog manager module 240 may transmit the result generated by the content provider module to the user terminal 100 in response to the user input.

According to various embodiments of the disclosure, the natural language generator module (NLG) 250 may change specified information into a text form. The information changed into the text form may be a natural language utterance form. The specified information may be, for example, information about additional input, information indicating completion of an action corresponding to user input, or information indicating additional user input (e.g., feedback information about user input). The information changed into the text form may be transmitted to the user terminal 100 to be displayed on the display 120, or may be transmitted to the text-to-speech module 260 to be changed into a voice form.

According to various embodiments of the disclosure, the text-to-speech module 260 may change information in a text form into information in a voice form. The text-to-speech module 260 may receive information in a text form from the NLG module 250, may change the information in the text form into information in a voice form, and may transmit the information in the voice form to the user terminal 100. The user terminal 100 may output the information in the voice form via a speaker 130.

According to various embodiments of the disclosure, the natural language understanding module 220, the path planner module 230, and the dialog manager module 240 may be configured as a single module. For example, the natural language understanding module 220, the path planner module 230, and the dialog manager module 240 may be configured as a single module to determine the intent of the user and a parameter and to generate a response (e.g., a path rule) corresponding to the determined intent of the user and parameter. The generated response may be transmitted to the user terminal 100.

Figure 5:
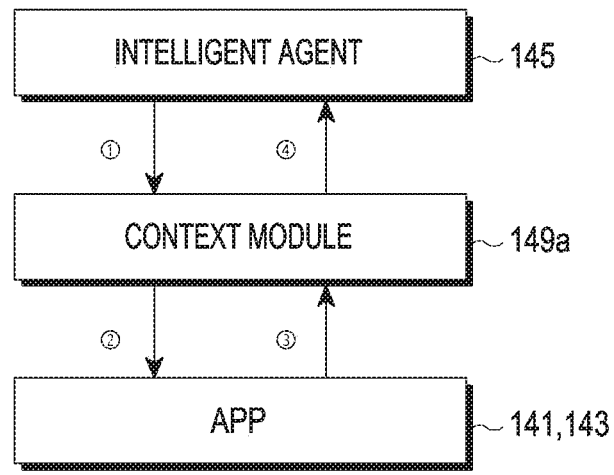
FIG. 5 illustrates an operation of a context module of an intelligent service module collecting a current state according to an embodiment of the disclosure.

FIG. 5 illustrates an operation of a context module of an intelligent service module collecting a current state according to an embodiment of the disclosure.

Referring to FIG. 5, upon receiving a context request (①) from an intelligent agent 145, a processor 150 may request (②) context information indicating the current state of an app 141 or 143 through the context module 149*a*. According to various embodiments, the processor 150 may receive (③) the context information from the app 141 or 143 through the context module 149*a* and may transmit (④) the context information to the intelligent agent 145.

According to various embodiments, the processor 150 may receive a plurality of pieces of context information from the app 141 or 143 through the context module 149*a*. The context information may be, for example, information about the most recently executed app 141 or 143. The context information may be, for example, information about the current state of the app 141 or 143 (e.g., information about a picture when viewing the picture in a gallery).

According to various embodiments of the disclosure, the processor 150 may receive not only the context information about the app 141 or 143 but also context information indicating the current state of a user terminal 100 from a device platform through the context module 149*a*. The context information may include general context information, user context information, or device context information.

The general context information may include general information about the user terminal 100. The general context information may be identified through an internal algorithm by receiving data through a sensor hub of the device platform. For example, the general context information may include information about the current time and space. The information about the current time and space may include, for example, a current time or information about the current location of the user terminal 100. The current time may be identified based on the time kept by the user terminal 100, and the information about the current location may be identified through a global positioning system (GPS). In another example, the general context information may include information about physical movement. The information about physical movement may include, for example, information about walking, running, driving, and the like. The information about physical movement may be identified by a motion sensor. The information on driving may be identified not only with respect to driving through the motion sensor but also with respect to boarding and parking by detecting a Bluetooth connection in a vehicle. In another example, the general context information may include user activity information. The user activity information may include, for example, information about commuting, shopping, travel, and the like. The user activity information may be identified using information about a place registered by a user or an app in a database.

The user context information may include information about the user. For example, the user context information may include information about the emotional state of the user. The information about the emotional state may include, for example, information about the user's happiness, sadness, anger, and the like. In another example, the user context information may include information about the current state of the user. The information about the current state may include, for example, information about interests, intent (e.g., shopping), and the like.

The device context information may include information about the state of the user terminal 100. For example, the device context information may include information about a path rule executed by an execution manager module 147. In another example, the device context information may include information about a battery. The information about the battery may be identified, for example, through the charge and discharge states of the battery. In another example, the device context information may include information about a connected device and a network. The information about the connected device may be identified, for example, through a communication interface to which the device is connected.

Figure 6:
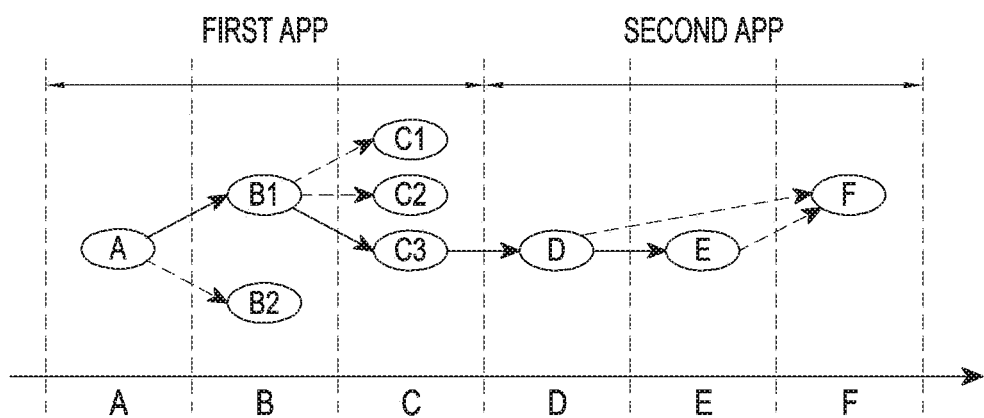
FIG. 6 illustrates a method in which a path planner module generates a path rule according to an embodiment of the disclosure.

FIG. 6 illustrates a method in which a path planner module generates a path rule according to an embodiment of the disclosure.

Referring to FIG. 6, according to various embodiments, a NLU module 220 may classify a function of an app as one action (e.g., state A to state F) and may store the action in a PR DB 231. For example, the NLU module 220 may store a path rule set including a plurality of path rules A-B1-C1, A-B1-C2, A-B1-C3-D-F, and A-B-C3-D-E-F classified as one action (e.g., state) in the PR DB 231.

According to various embodiments of the disclosure, the PR DB 231 of the path planner module 230 may store a path rule set for performing a function of an app. The path rule set may include a plurality of path rules including a plurality of actions (e.g., a sequence of states). According to the plurality of path rules, a plurality of actions executed according to parameters input for the respective actions may be sequentially arranged. According to various embodiments, the plurality of path rules may be configured in an ontological form or in the form of a graph model, and may be stored in the PR DB 231.

According to various embodiments of the disclosure, the NLU module 220 may select an optimal path rule A-B1-C3-D-F corresponding to the intent of user input and a parameter from among the plurality of path rules A-B1-C1, A-B1-C2, A-B1-C3-D-F, and A-B1-C3-D-E-F.

According to various embodiments of the disclosure, when there is no path rule that optimally matches the user input, the NLU module 220 may transmit a plurality of rules to the user terminal 100. For example, the NLU module 220 may select a path rule (e.g., A-B1) partially corresponding to the user input. The NLU module 220 may select one or more path rules (e.g., A-B1-C1, A-B1-C2, A-B1-C3-D-F, and A-B1-C3-D-E-F) including the path rule (e.g., A-B1) partially corresponding to the user input and may transmit the one or more path rules to the user terminal 100.

According to various embodiments of the disclosure, the NLU module 220 may select one of the plurality of path rules on the basis of additional input of the user terminal 100 and may transmit the selected one path rule to the user terminal 100. For example, the NLU module 220 may select one path rule (e.g., A-B1-C3-D-F) from among the plurality of path rules (e.g., A-B1-C1, A-B1-C2, A-B1-C3-D-F, and A-B1-C3-D-E-F) according to user input (e.g., input to selected C3) additionally made in the user terminal 100 and may transmit the selected path rule to the user terminal 100.

According to various embodiments of the disclosure, the NLU module 220 may determine user intent and a parameter corresponding to the user input (e.g., the input to select C3) additionally made in the user terminal 100 through the NLU module 220 and may transmit the determined user intent and parameter to the user terminal 100. The user terminal 100 may select one path rule (e.g., A-B1-C3-D-F) from among the plurality of path rules (e.g., A-B1-C1, A-B1-C2, A-B1-C3-D-F, and A-B1-C3-D-E-F) on the basis of the transmitted intent or parameter.

Accordingly, the user terminal 100 may complete the action of the app 141 or 143 according to the selected one path rule.

According to various embodiments of the disclosure, when user input lacking information is received by an intelligent server 200, the NLU module 220 may generate a path rule partially corresponding to the received user input. For example, the NLU module 220 may transmit the partially corresponding path rule to an intelligent agent 145. A processor 150 may execute the intelligent agent 145 to receive the path rule and may transmit the partially corresponding path rule to an execution manager module 147. The processor 150 may execute a first app 141 according to the path rule through the execution manager module 147. The processor 150 may transmit information about a lacking parameter to the intelligent agent 145 while executing the first app 141 through the execution manager module 147. The processor 150 may request additional input from the user through the intelligent agent 145 using the information about the lacking parameter. When additional input is received from the user through the intelligent agent 145, the processor 150 may transmit the user input to the intelligent server 200 for processing. The NLU module 220 may generate an additional path rule on the basis of the intent of the additional user input and the information about the parameter and may transmit the additional path rule to the intelligent agent 145. The processor 150 may transmit the path rule to the execution manager module 147 through the intelligent agent 145 and may execute a second app 143.

According to various embodiments of the disclosure, when user input with some information missing is received by the intelligent server 200, the NLU module 220 may transmit a user information request to a personal information server 300. The personal information server 300 may transmit information about the user who performs the user input, which is stored in a persona database, to the natural language understanding module 220. The NLU module 220 may select a path rule corresponding to the user input with some information missing using the information about the user. Accordingly, even though user input with some information missing is received by the intelligent server 200, the NLU module 220 may receive additional input by requesting the missing information or may determine a path rule corresponding to the user input using user information.

Table 1 below may show illustrative examples of path rules related to a task requested by the user according to various embodiments.

TABLE 1

| Path rule ID | State | Parameter |
|---|---|---|
| Gallery_101 | PictureView (25) | NULL |
| | SearchView (26) | NULL |
| | SearchViewResult (27) | Location, time |
| | SearchEmptySelectedView (28) | NULL |
| | SearchSelectedView (29) | ContentType, selectall |
| | CrossShare (30) | anaphora |

Referring to Table 1, a path rule generated or selected by an intelligent server (the intelligent server 200 of FIG. 1) according to a user utterance (e.g., "Share the picture") may include at least one state 25, 26, 27, 28, 29, or 30. For example, the at least one state (e.g., any one operation state of a terminal) may correspond to at least one of execution of a picture application (PictureView) 25, execution of a picture search function (SearchView) 26, display of a search result display screen (SearchViewResult) 27, display of a search result display screen with no picture selected (SearchEmptySelectedView) 28, display of a search result display screen with at least one picture selected (SearchSelectedView) 29, or display of a shared application selection screen (CrossShare) 30.

According to various embodiments of the disclosure, parameter information of the path rule may correspond to at least one state. For example, the parameter information may be included in the state of the display of the search result display screen with the at least one picture selected 29.

When the path rule including a sequence of the states 25, 26, 27, 28, and 29 is executed, a task (e.g., "Share this picture!") requested by the user may be performed.

Figure 7A:
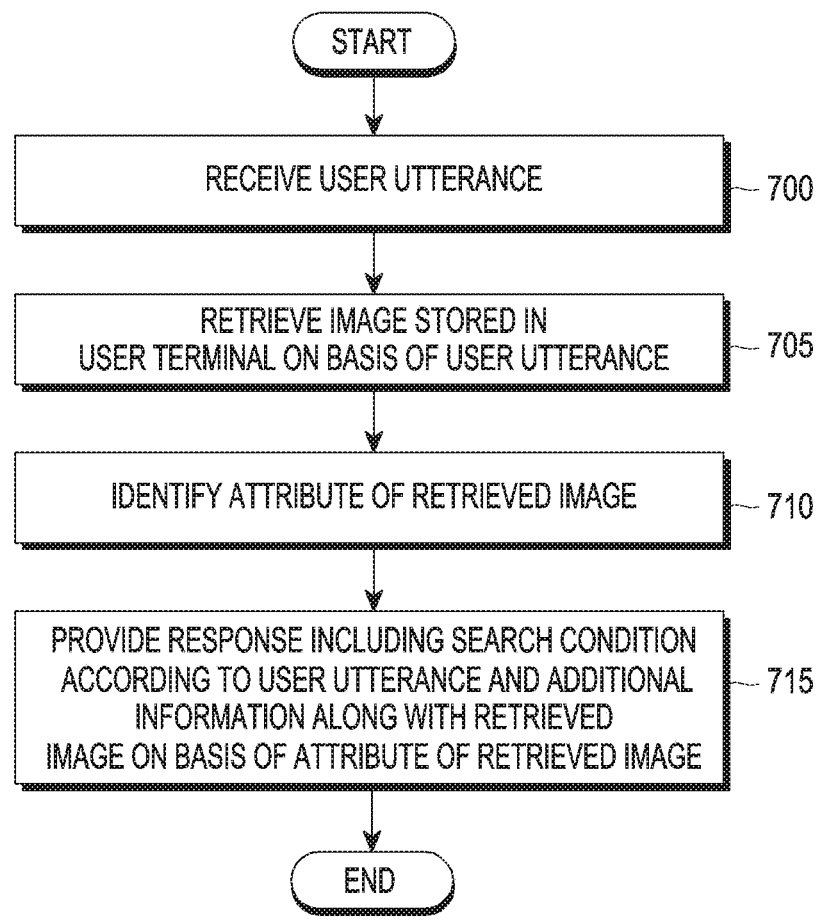
FIG. 7A illustrates an operation of providing additional information other than a search condition included in a user utterance according to an embodiment of the disclosure.

FIG. 7A illustrates an operation of providing additional information other than a search condition included in a user utterance according to an embodiment of the disclosure.

Figure 7B:
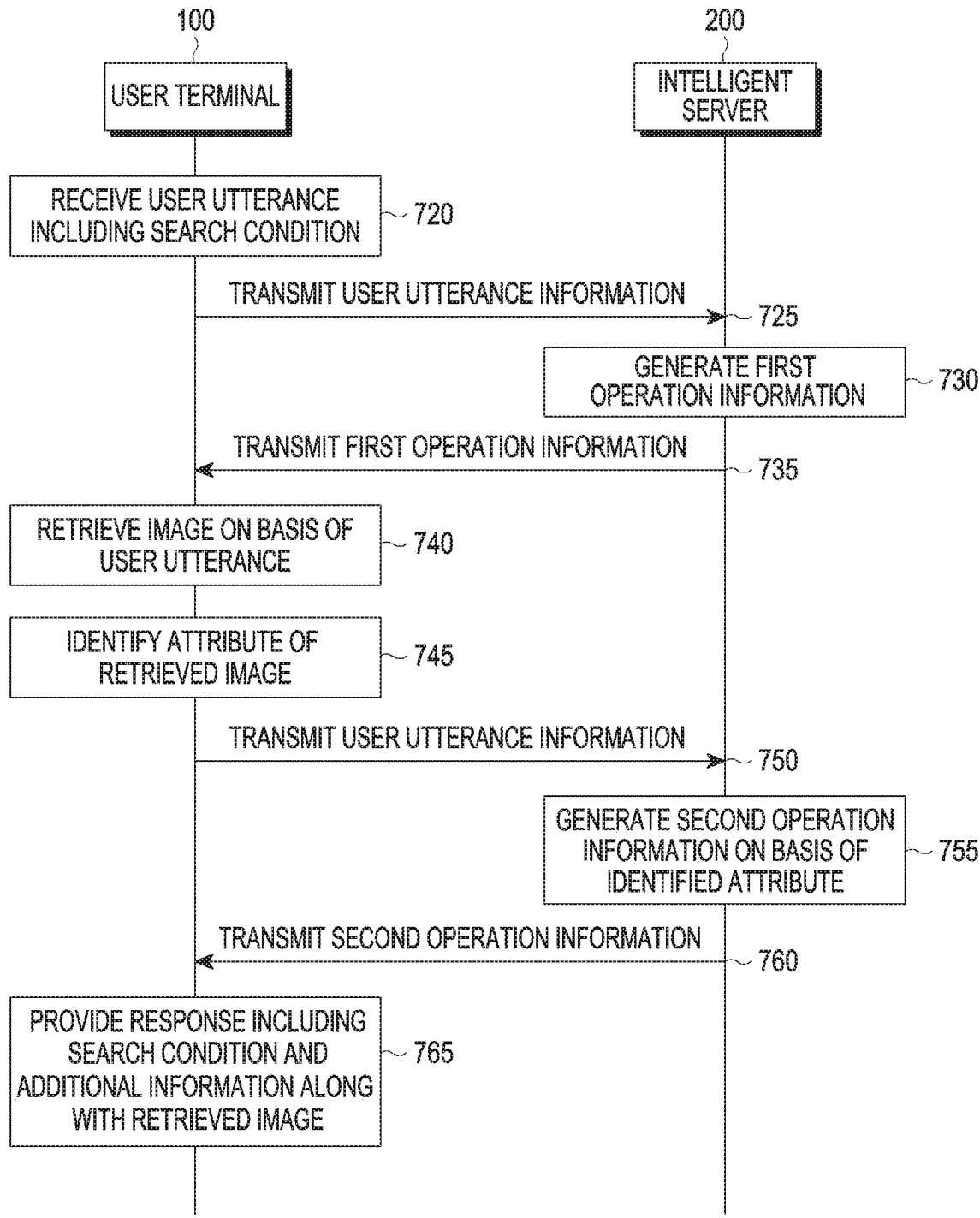
FIG. 7B illustrates an operation of providing additional information other than a search condition included in a user utterance according to an embodiment of the disclosure.

FIG. 7B illustrates an operation of providing additional information other than a search condition included in a user utterance according to an embodiment of the disclosure.

Figure 8A:
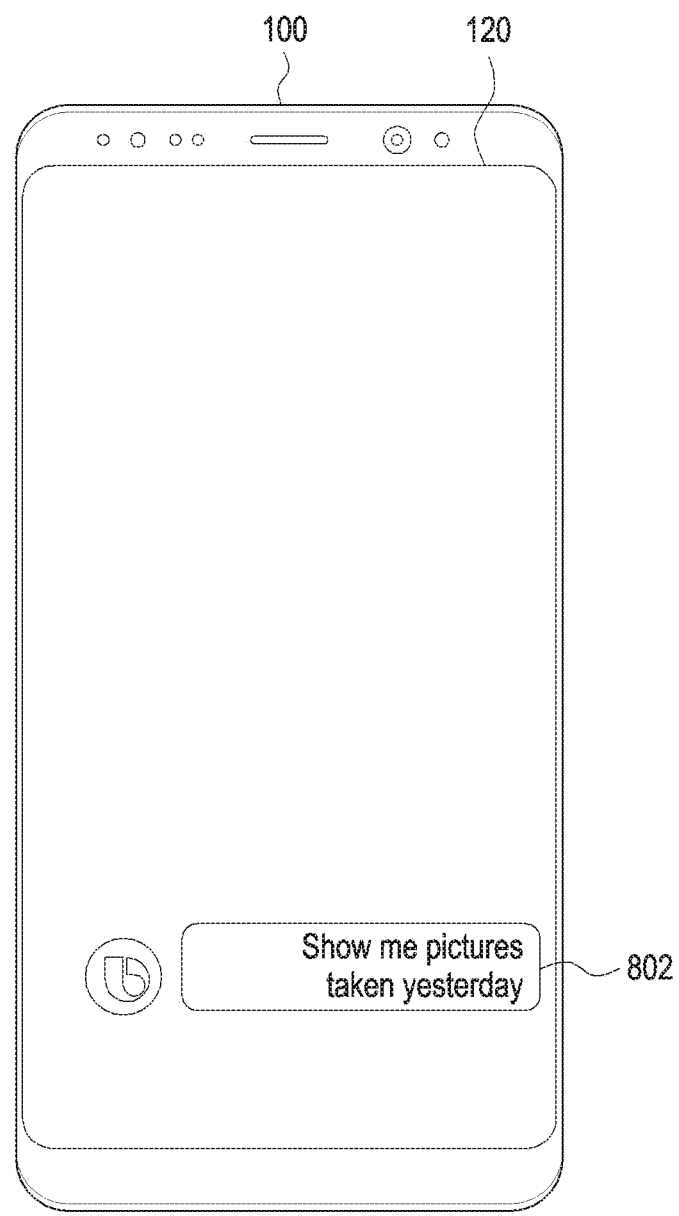
FIG. 8A illustrates an operation of providing additional information other than a search condition included in a user utterance according to an embodiment of the disclosure.

FIG. 8A illustrates an operation of providing additional information other than a search condition included in a user utterance according to an embodiment of the disclosure.

Figure 8B:
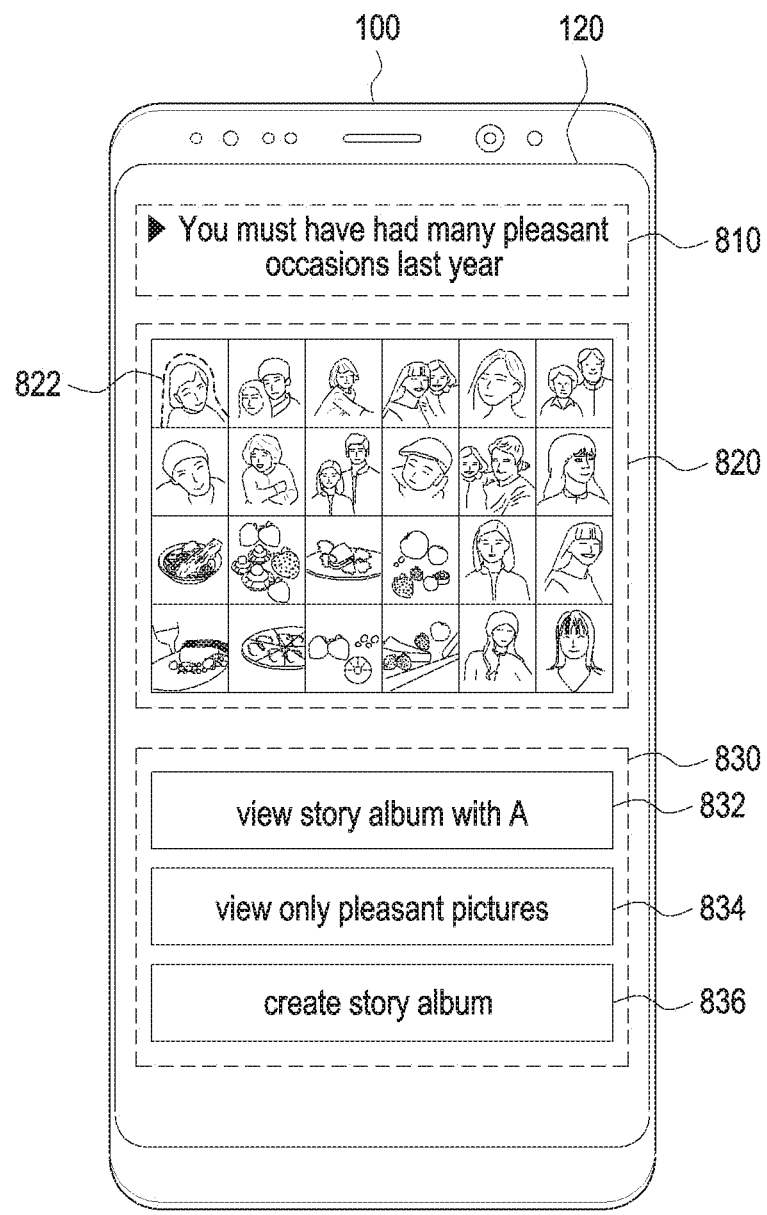
FIG. 8B illustrates an operation of providing additional information other than a search condition included in a user utterance according to an embodiment of the disclosure.

FIG. 8B illustrates an operation of providing additional information other than a search condition included in a user utterance according to an embodiment of the disclosure.

Figure 8C:
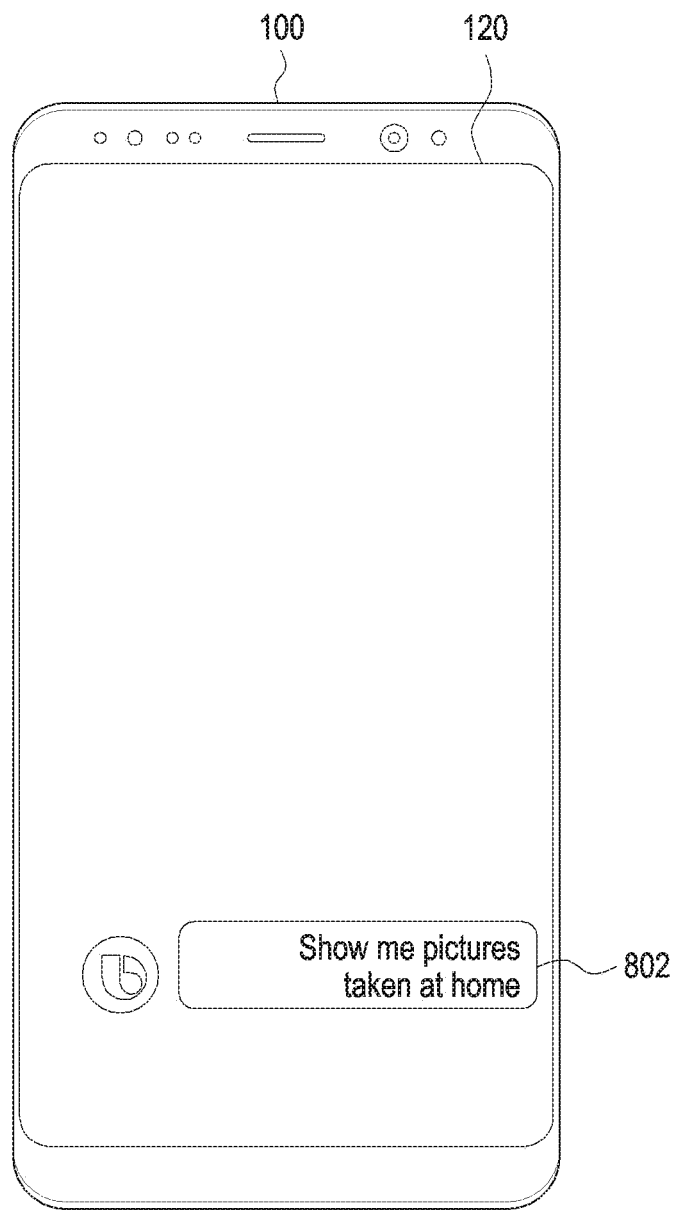
FIG. 8C illustrates an operation of providing additional information other than a search condition included in a user utterance according to an embodiment of the disclosure.

FIG. 8C illustrates an operation of providing additional information other than a search condition included in a user utterance according to an embodiment of the disclosure.

Figure 8D:
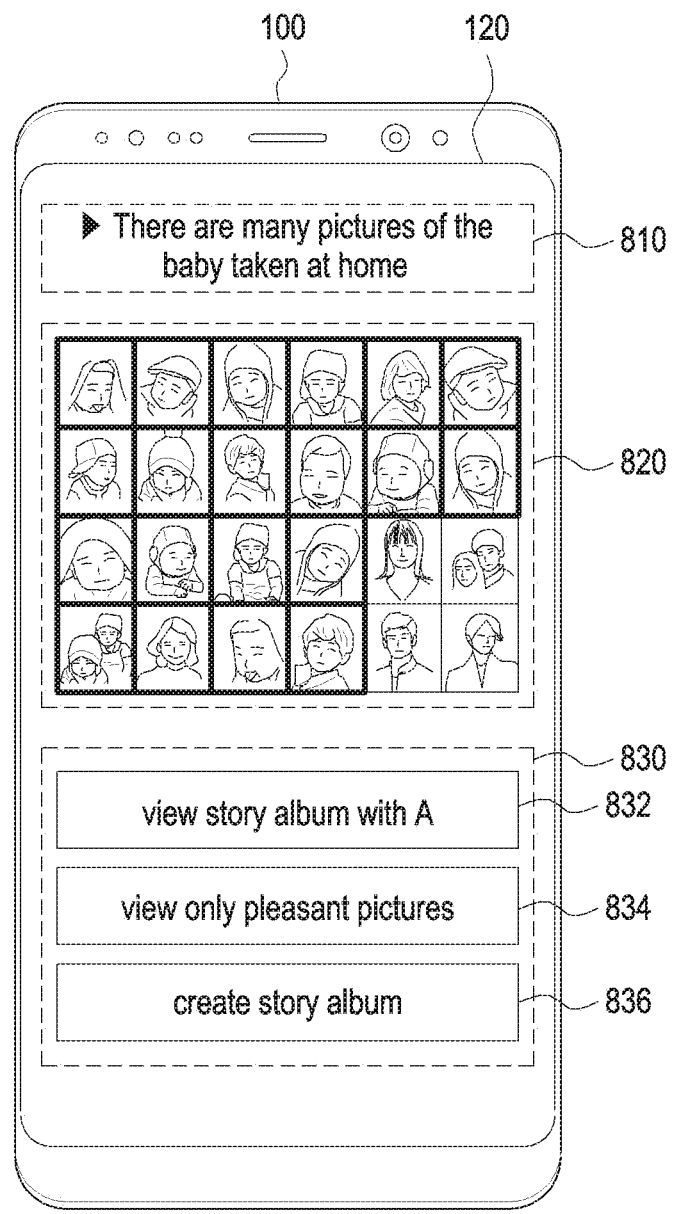
FIG. 8D illustrates an operation of providing additional information other than a search condition included in a user utterance according to an embodiment of the disclosure.

FIG. 8D illustrates an operation of providing additional information other than a search condition included in a user utterance according to an embodiment of the disclosure.

Figure 8E:
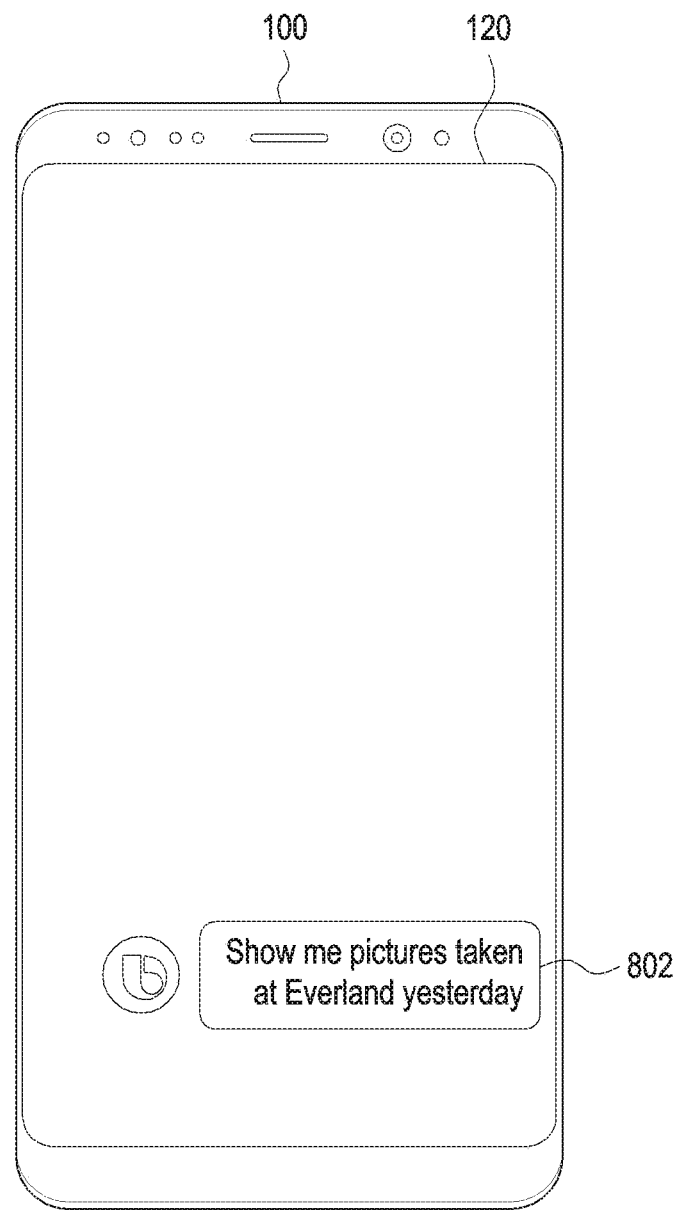
FIG. 8E illustrates an operation of providing additional information other than a search condition included in a user utterance according to an embodiment of the disclosure.

FIG. 8E illustrates an operation of providing additional information other than a search condition included in a user utterance according to an embodiment of the disclosure.

Figure 8F:
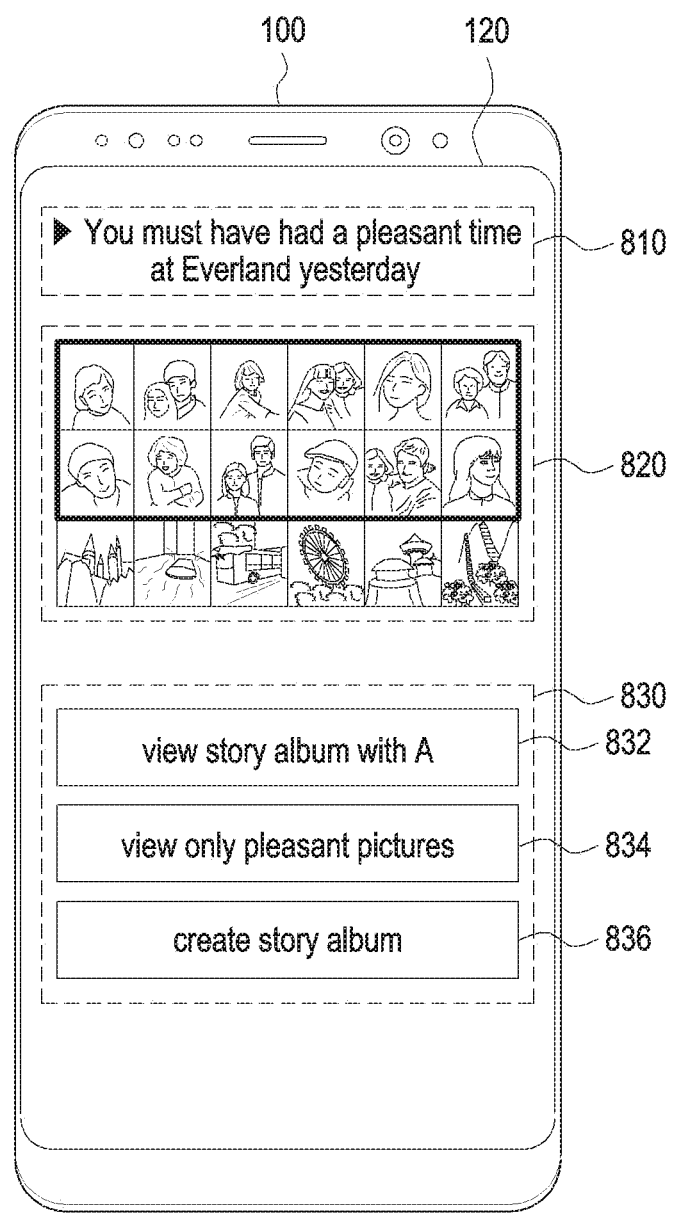
FIG. 8F illustrates an operation of providing additional information other than a search condition included in a user utterance according to an embodiment of the disclosure.

FIG. 8F illustrates an operation of providing additional information other than a search condition included in a user utterance according to an embodiment of the disclosure.

Referring to FIG. 7A, a user terminal 100 according to various embodiments of the disclosure may receive a user utterance in operation 700. In operation 705, the user terminal 100 according to various embodiments of the disclosure may retrieve an image stored in the user terminal 100 on the basis of the user utterance. In operation 710, the user terminal 100 according to various embodiments of the disclosure may identify an attribute of the retrieved image. In operation 715, the user terminal 100 according to various embodiments of the disclosure may provide a response including a search condition according to the user utterance and additional information along with the retrieved image on the basis of the attribute of the retrieved image.

Referring to FIG. 7B, in operation 720, the user terminal 100 according to various embodiments of the disclosure may receive a user utterance (e.g., "Show me pictures taken last year!" or "Show me pictures taken at home!").

In operation 725, the user terminal 100 according to various embodiments of the disclosure may transmit user utterance information to an intelligent server 200.

In operation 730, the intelligent server 200 according to various embodiments of the disclosure may generate first operation information on the basis of the received user utterance information. The operation information (e.g., a path rule) according to various embodiments of the disclosure may include information about an operation (task) of the user terminal 100 retrieving an image according to the user utterance. The first operation information according to various embodiments of the disclosure may include information about an operation of the user terminal 100 identifying an attribute (e.g., metadata) of an image retrieved according to the user utterance. The attribute of the image according to various embodiments of the disclosure may include at least one of information about the location where at least one retrieved image is taken (e.g., an administrative district, such as "Yongtong-gu, Suwon", or a landmark, such as "Everland"), information about the time at which a plurality of images is taken (e.g., 10:35 a.m. yesterday), information about the relationship between a plurality of persons included in the plurality of images (e.g. family or wife), information about emotions of at least one person included in the plurality of images (e.g. anger, sadness, surprise, embarrassment, or pleasure), information about an event related to the plurality of images (e.g. a wedding or birthday), and an attribute of an object included in the image (e.g., a document, a landscape, or food). The user terminal 100 according to various embodiments of the disclosure may identify information about the relationship between a plurality of persons on the basis of the frequency with which a particular person is photographed in images taken by a user. The user terminal 100 according to various embodiments of the disclosure may analyze the facial expression of a person included in an image taken by the user, thereby identifying an emotional state (e.g., as a probability of a specific emotion). According to various embodiments of the disclosure, various techniques may be applied as methods for identifying the relationship between a plurality of persons included in an image or the emotional state of a person. The user terminal 100 according to various embodiments of the disclosure may identify the proportion of each attribute of at least one retrieved image 820 as in FIG. 8B. For example, the user terminal 100 may analyze retrieved images (e.g., analyze the relationship between people or analyze the facial expression of a person), thereby determining 70% of images identified as "pleasure", 50% of images including a baby, and 20% of images identified as "sadness". The user terminal 100 according to various embodiments of the disclosure may use metadata of each image when analyzing the at least one retrieved image 820.

In operation 735, the intelligent server 200 according to various embodiments of the disclosure may transmit the generated first operation information to the user terminal 100.

In operation 740, the user terminal 100 according to various embodiments of the disclosure may retrieve (select) an image according to the first operation information received from the intelligent server 200. The user terminal 100 according to various embodiments of the disclosure may display the retrieved image on the user terminal 100. In operation 745, the user terminal 100 according to various embodiments of the disclosure may identify an attribute of the retrieved image according to the first operation information received from the intelligent server 200. In operation 750, the user terminal 100 according to various embodiments of the disclosure may transmit information about the identified attribute to the intelligent server 200.

In operation 755, the user terminal 100 according to various embodiments of the disclosure may generate second operation information on the basis of the identified attribute. The second operation information according to various embodiments of the disclosure may include information about an operation of the user terminal 100 outputting a first expression (e.g., "last year") substantially the same as an expression included in the user utterance and a second expression (e.g., "pleasant occasion") based on the identified attribute of the at least one retrieved image 820. As used herein, the term "first expression" may refer to an expression indicating a criterion for retrieving an image intended by the user's utterance. As used herein, the term "second expression" or "third expression" may refer to an expression generated by the intelligent server 200 or the user terminal 100 on the basis of the attribute of the at least one retrieved image 820. As used herein, the term "expression" may be used interchangeably/alternatively with the term "parameter". In operation 760, the intelligent server 200 according to various embodiments of the disclosure may transmit the second operation information to the user terminal 100.

In operation 765, the user terminal 100 according to various embodiments of the disclosure may provide a response including a sentence (e.g., "You must have had many pleasant occasions last year!") including a search condition (e.g., the first expression "last year") and additional information (e.g., the second expression "pleasant occasion") along with the at least one retrieved image 820 on the basis of the second operation information.

Referring to FIG. 8A, the user terminal 100 according to various embodiments of the disclosure may receive an utterance (e.g., "Show me pictures taken last year!") in text 802 from the user.

Referring to FIG. 8B, the user terminal 100 according to various embodiments of the disclosure may provide a response on the basis of second operation information. The response according to various embodiments of the disclosure may include at least one of a specified first sentence 810 including at least a first expression and a second expression, at least one retrieved image 820, and a user interface 830 for reclassifying (reconfiguring) the at least one retrieved image 820. The first sentence 810 according to various embodiments of the disclosure may include a sentence including the first expression (e.g., "last year") and the second expression (e.g., "pleasant occasion"). According to various embodiments of the disclosure, the first expression included in the first sentence 810 may include an expression substantially the same as an expression included in the utterance from the user. For example, when the user inputs an utterance including the expression "last year", not only "last year" but also "one year ago" may be selected as the first expression by the user terminal 100 or the intelligent server 200. FIG. 8B illustrates the case where "pleasant occasion" is selected (generated) as the second expression by the intelligent server 200 since the proportion of objects having a smiling face (e.g., a person 822) among the at least one retrieved image 820 is identified as the highest (e.g., 16 images out of 24 images). The user terminal 100 according to various embodiments of the disclosure may output (e.g., display) a sentence "You must have had many pleasant occasions last year!" in response to the second operation information. The first sentence 810 and a second sentence 802, as in FIG. 8E, according to various embodiments of the disclosure may be output in an utterance form through the user terminal 100. The user interface 830 according to various embodiments of the disclosure may include menus 832, 834, and 836 for reclassifying the retrieved image according to a specified criterion.

Referring to FIG. 8C, the user terminal 100 according to various embodiments of the disclosure may receive an utterance (e.g., "Show me pictures taken at home!") 802 from the user. The user terminal 100 according to various embodiments of the disclosure may display the content of the received utterance 802.

Referring to FIG. 8D, the user terminal 100 according to various embodiments of the disclosure may provide a response on the basis of second operation information. FIG. 8D illustrates the case where "baby" is selected as a second expression by the intelligent server 200 since the proportion of baby pictures among retrieved images is identified as the highest. The user terminal 100 according to various embodiments of the disclosure may output (e.g., display) a message "There are many pictures of the baby taken at home" in response to the second operation information. In FIG. 8D, images including the expression "baby" are displayed in bold for convenience of explanation. According to various embodiments of the disclosure, the bold lines are shown for convenience of explanation and may not actually be displayed.

Referring to FIG. 8E, the user terminal 100 according to various embodiments of the disclosure may receive an utterance (e.g., "Show me pictures taken at Everland yesterday") from the user.

Referring to FIG. 8F, the user terminal 100 according to various embodiments of the disclosure may provide a response on the basis of second operation information. FIG. 8F illustrates the case where the expression "pleasant" is selected as a second expression by the intelligent server 200 since the proportion of images including a smiling face among at least one of the retrieved images is identified as the highest (e.g., 12 images out of 18 images). The user terminal 100 according to various embodiments of the disclosure may output (e.g., display) a message "You must have had a pleasant time at Everland yesterday" in response to the second operation information. In FIG. 8F, images including smiling faces are displayed in bold lines for convenience of explanation. According to various embodiments of the disclosure, the bold lines are shown for convenience of explanation, and may not actually be displayed. According to various embodiments of the disclosure, the user terminal 100 may identify the name of a landmark (e.g., Everland) corresponding to a specific location (e.g., an address) on the basis of information about the location where a picture is taken.

Figure 9A:
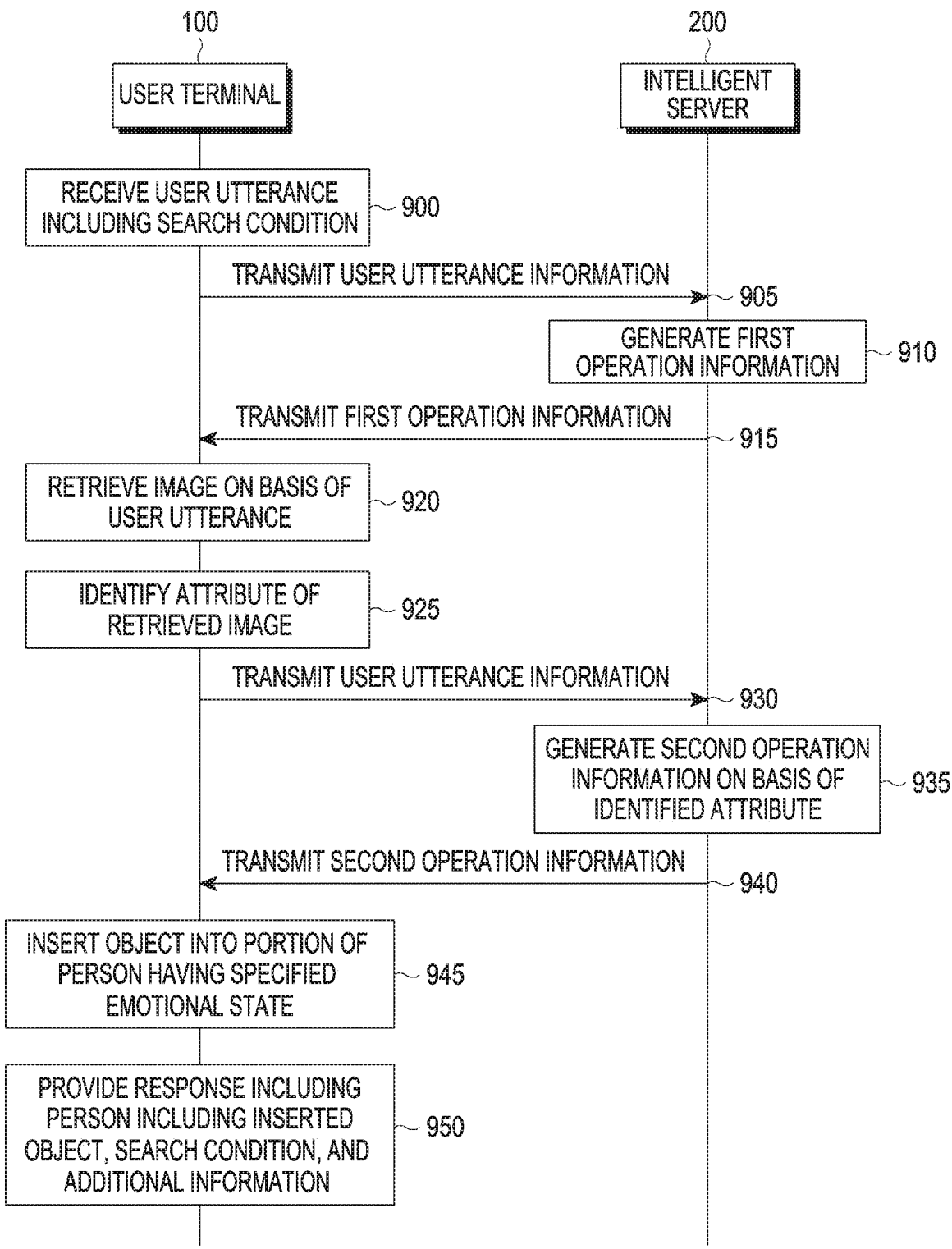
FIG. 9A illustrates an operation of changing a portion of a person having a specific facial expression among objects included in an image retrieved according to a user utterance into a graphical object and displaying the graphical object according to an embodiment of the disclosure.

FIG. 9A illustrates an operation of changing a portion of a person having a specific facial expression among objects included in an image retrieved according to a user utterance into a graphical object and displaying the graphical object according to an embodiment of the disclosure.

Figure 9B:
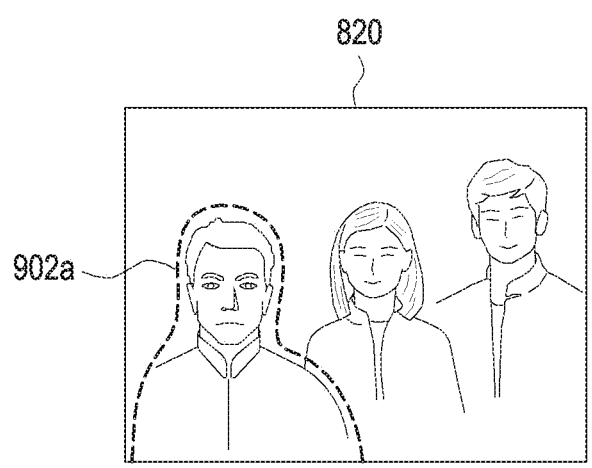
FIG. 9B illustrates an operation of changing a portion of a person having a specific facial expression among objects included in an image retrieved according to a user utterance into a graphical object and displaying the graphical object according to an embodiment of the disclosure.

FIG. 9B illustrates an operation of changing a portion of a person having a specific facial expression among objects included in an image retrieved according to a user utterance into a graphical object and displaying the graphical object according to an embodiment of the disclosure.

Figure 9C:
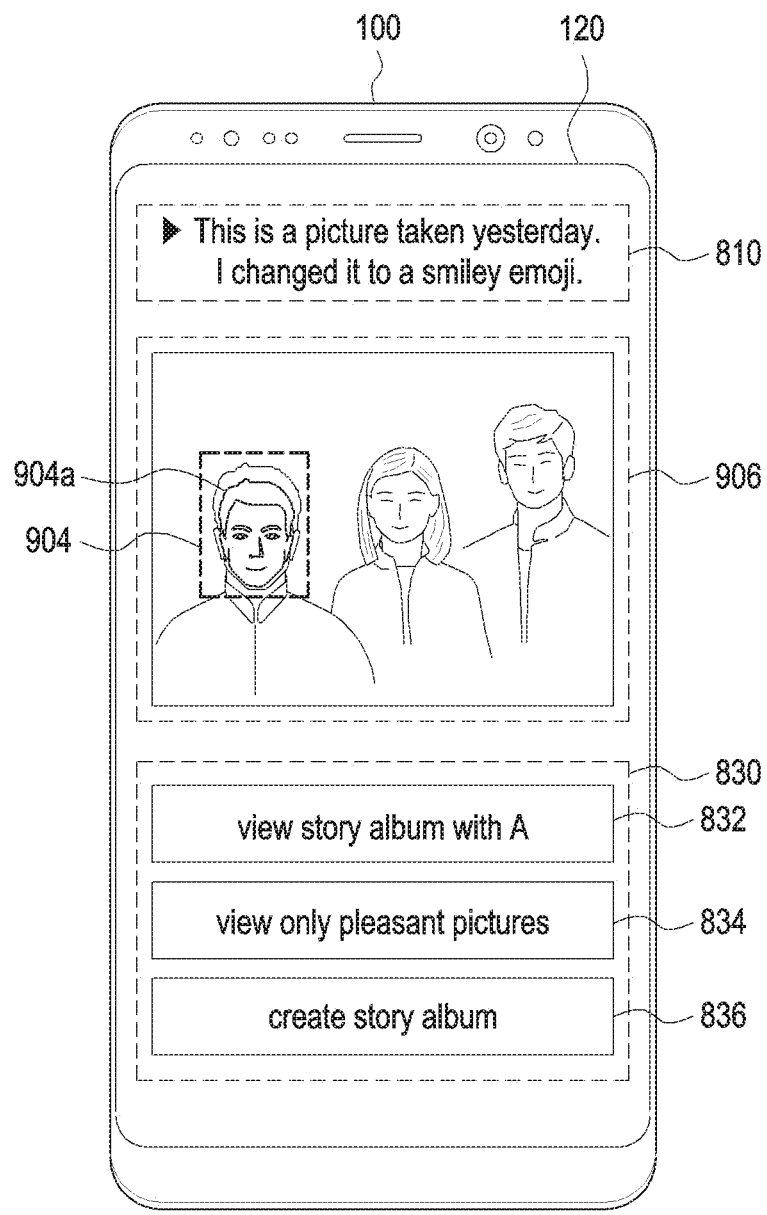
FIG. 9C illustrates an operation of changing a portion of a person having a specific facial expression among objects included in an image retrieved according to a user utterance into a graphical object and displaying the graphical object according to an embodiment of the disclosure.

FIG. 9C illustrates an operation of changing a portion of a person having a specific facial expression among objects included in an image retrieved according to a user utterance into a graphical object and displaying the graphical object according to an embodiment of the disclosure.

Figure 9D:
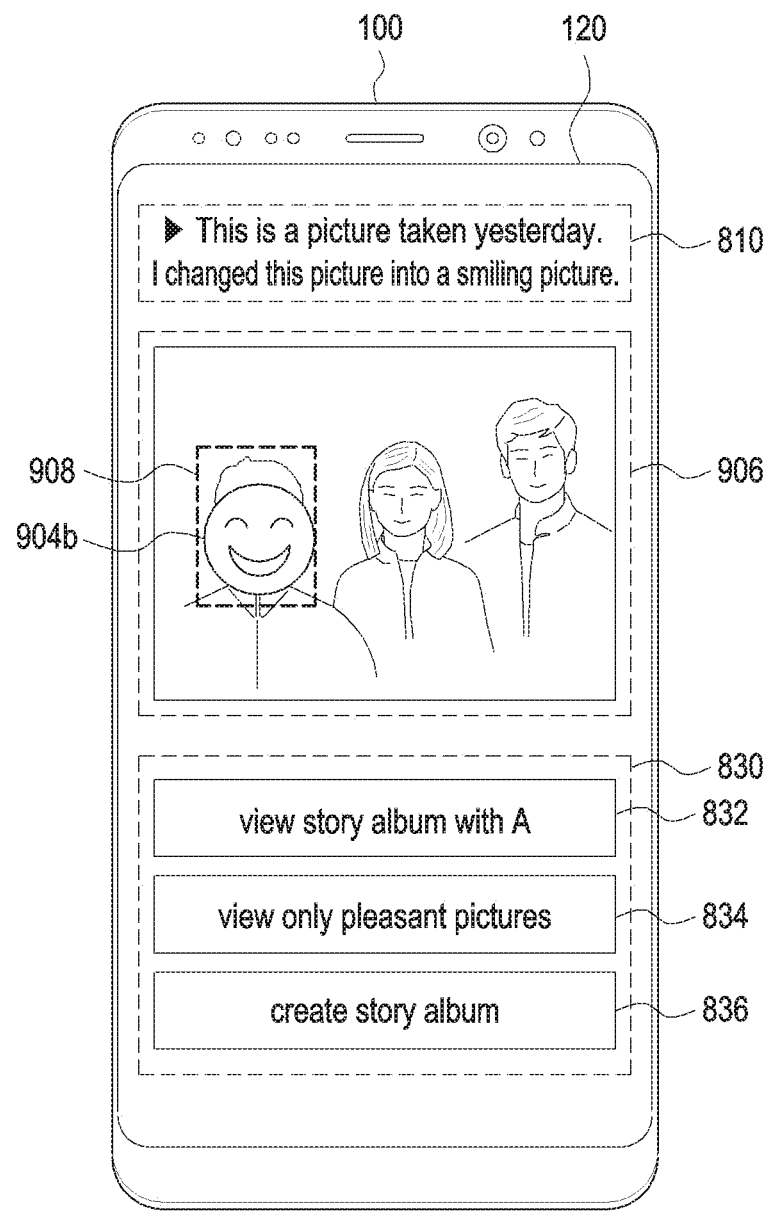
FIG. 9D illustrates an operation of changing a portion of a person having a specific facial expression among objects included in an image retrieved according to a user utterance into a graphical object and displaying the graphical object according to an embodiment of the disclosure.

FIG. 9D illustrates an operation of changing a portion of a person having a specific facial expression among objects included in an image retrieved according to a user utterance into a graphical object and displaying the graphical object according to an embodiment of the disclosure.

Operation 900 to operation 930 illustrated in FIG. 9A are the same as operation 720 to operation 750 illustrated in FIG. 7B.

Referring to FIG. 9A, in operation 935, an intelligent server 200 according to various embodiments of the disclosure may generate second operation information on the basis of an attribute identified in operation 925. The second operation information according to various embodiments of the disclosure may include information about an operation of a user terminal 100 changing a portion of a person identified as having a specified emotional state according to the facial expression of the person into an object (e.g., an emoji) and displaying the object. The second operation information according to various embodiments of the disclosure may include information about an operation of the user terminal 100 providing a response including the person including the changed object, a search condition (e.g., "yesterday" in the utterance "Show me pictures taken yesterday!"), and additional information (e.g., "I changed this picture into a smiling picture"). The second operation information is transmitted to the user terminal 100 in operation 940.

In operation 945, the user terminal 100 according to various embodiments of the disclosure may insert an object (e.g., an emoji) into a portion (e.g., the face) of a person having a specified emotional state on the basis of the second operation information. In operation 950, the user terminal 100 according to various embodiments of the disclosure may provide a response including the person including the object changed in operation 945, a search condition (e.g., "yesterday" in the utterance "Show me pictures taken yesterday!"), and additional information (e.g., "I changed this picture into a smiling picture").

According to various embodiments of the disclosure, the user terminal 100 may identify the facial expression of the person included in at least one retrieved image 820 (e.g., at least one image displayed in response to "Show me pictures taken yesterday!") according to first operation information.

Referring to FIG. 9B, a case where the at least one retrieved image 820 according to the first operation information includes a person 902a who is not smiling is illustrated. The user terminal 100 according to various embodiments of the disclosure may identify the person 902a who is not smiling among people included in the at least one retrieved image 820. The user terminal 100 according to various embodiments of the disclosure may insert a smiling face 904b in pictures of a person 902a who is not smiling into the at least one retrieved image 820.

Referring to FIG. 9C, an embodiment in which a picture of the smiling face 904a is inserted into a specified area 904 (e.g., an area including a face) is illustrated. According to various embodiments of the disclosure, the user terminal 100 may output (e.g., display) a first sentence 810 "This is a picture taken yesterday. I changed this picture into a smiling picture" on the basis of the second operation information. According to various embodiments of the disclosure, the intelligent server 200 may select expressions "into a smiling picture" and "I changed" as at least one second expression according to the insertion of a specific graphical object. The user terminal 100 according to various embodiments of the disclosure may display an image 906 including the inserted graphical object (e.g., the picture of the smiling face 904*a*) in an area 908 of the image 906. The user terminal 100 according to various embodiments of the disclosure may display a user interface 830 under the image 906 including the inserted graphical object.

Referring to FIG. 9D, an embodiment in which a smiley emoji 904*b* is inserted into the at least one retrieved image 820 is illustrated rather than the picture of the smiling face 904*b* illustrated in FIG. 9C. Operations other than the operation of inserting the smiley emoji 940*b* with reference to FIG. 9D are the same as those illustrated in FIG. 9C. Various embodiments of the disclosure illustrated in FIG. 9C and FIG. 9D may also be performed according to user input.

Figure 10A:
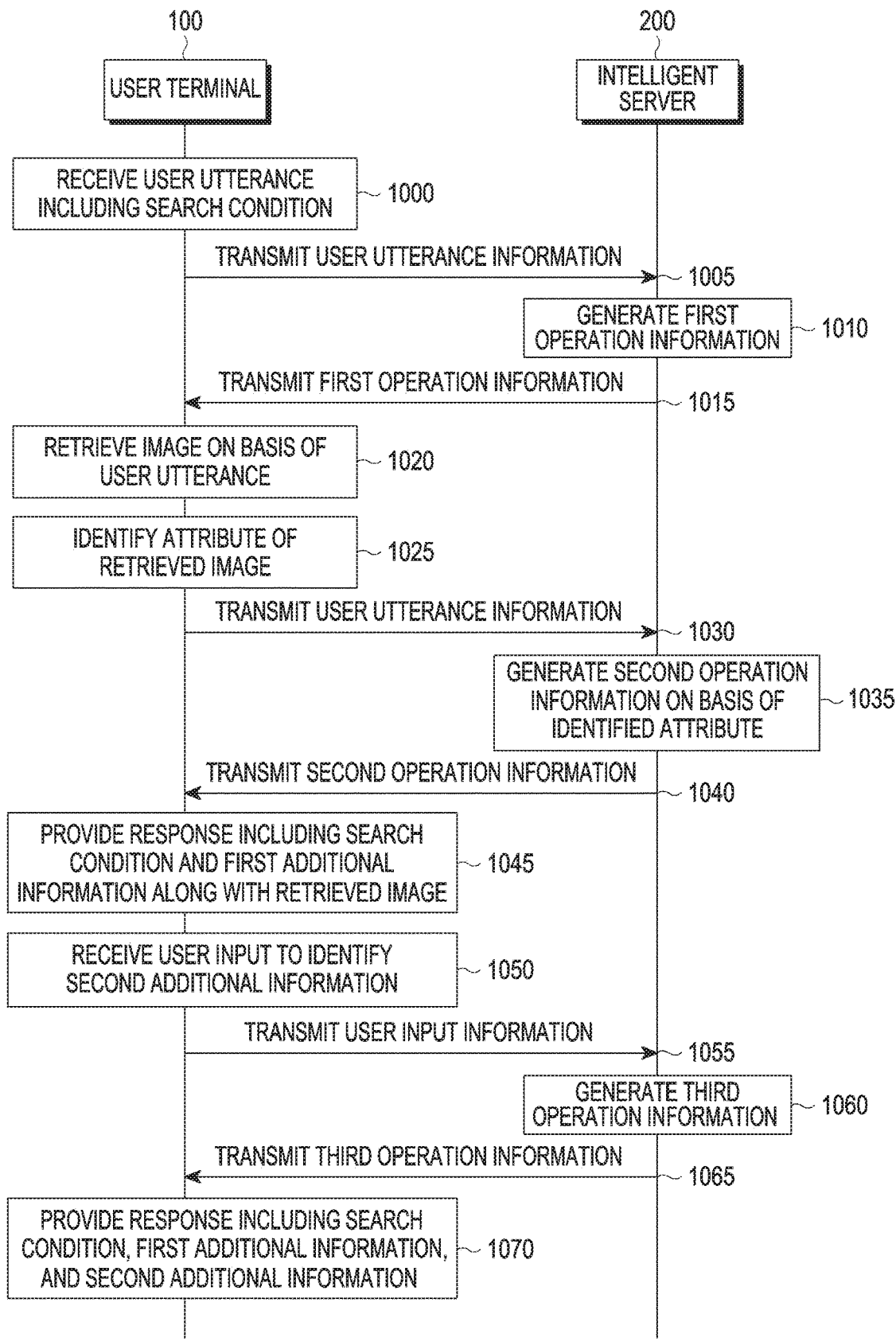
FIG. 10A illustrates an operation of providing first additional information and second additional information on the basis of an image retrieved according to a user utterance according to an embodiment of the disclosure.

FIG. 10A illustrates an operation of providing first additional information and second additional information on the basis of an image retrieved according to a user utterance according to an embodiment of the disclosure.

Figure 10B:
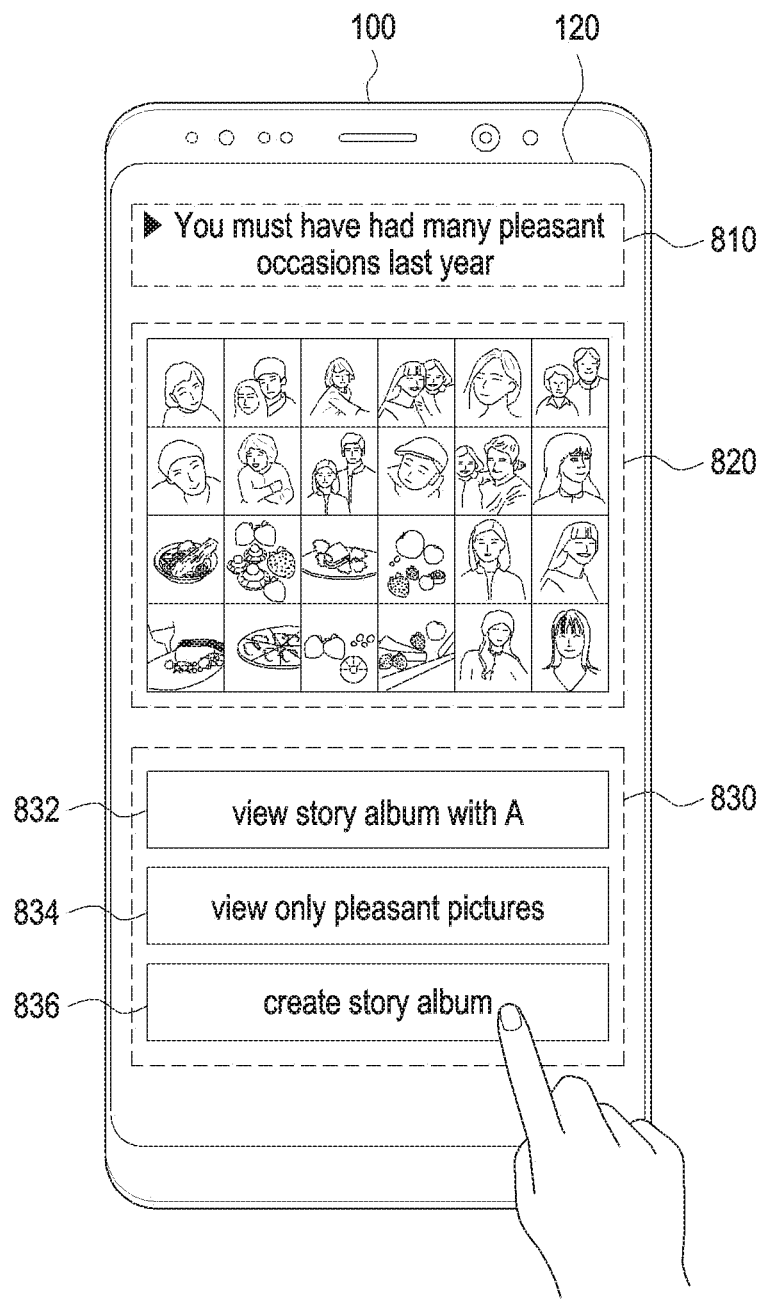
FIG. 10B illustrates an operation of providing first additional information and second additional information on the basis of an image retrieved according to a user utterance according to an embodiment of the disclosure.

FIG. 10B illustrates an operation of providing first additional information and second additional information on the basis of an image retrieved according to a user utterance according to an embodiment of the disclosure.

Figure 10C:
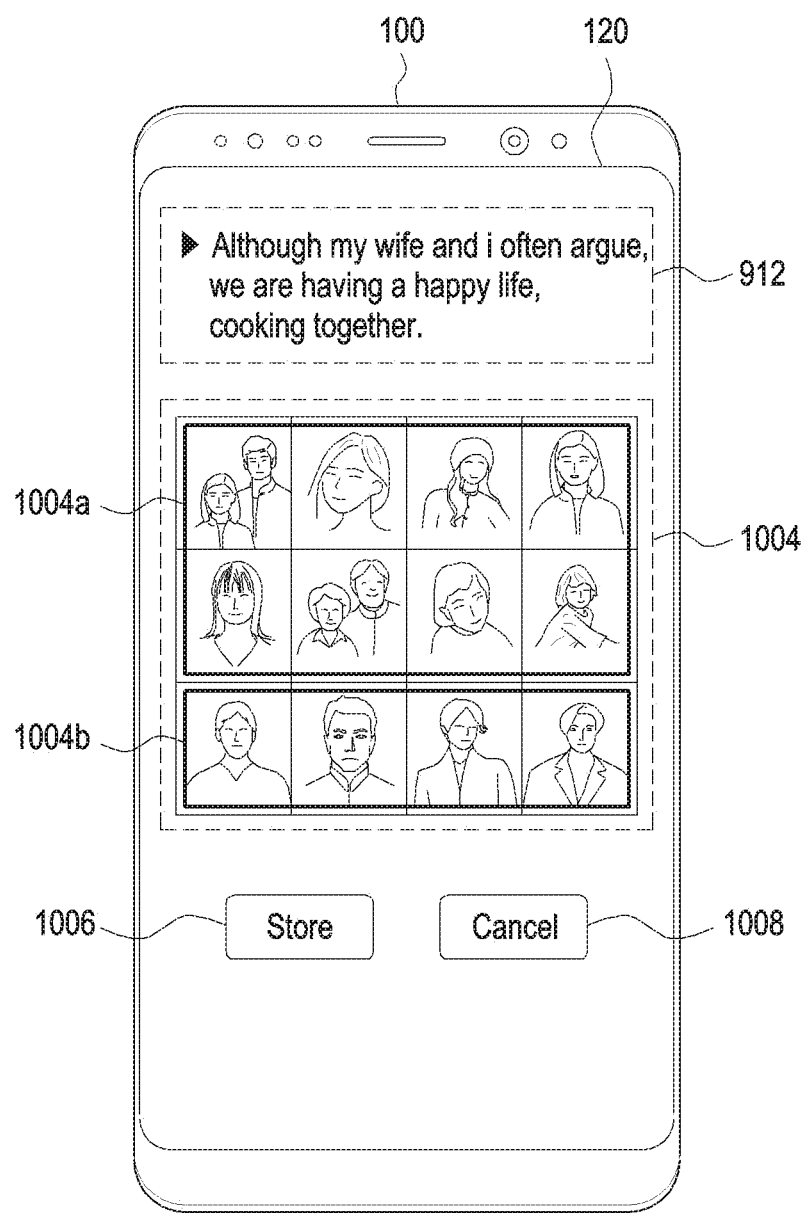
FIG. 10C illustrates an operation of providing first additional information and second additional information on the basis of an image retrieved according to a user utterance according to an embodiment of the disclosure.

FIG. 10C illustrates an operation of providing first additional information and second additional information on the basis of an image retrieved according to a user utterance according to an embodiment of the disclosure.

Operation 1000 to operation 1040 illustrated in FIG. 10A are the same as operation 720 to operation 760 illustrated in FIG. 7B.

Referring to FIG. 10A, in operation 1045, a user terminal 100 according to various embodiments of the disclosure may provide a response including a search condition (e.g., a first expression "last year") and first additional information (e.g., a second expression "pleasant") along with a retrieved image on the basis of second operation information.

In operation 1050, the user terminal 100 according to various embodiments of the disclosure may receive user input to identify second additional information. According to various embodiments of the disclosure, the second additional information may include at least one expression (e.g., a third expression "wife" and "although often having an argument") selected on the basis of an attribute (e.g., wife or sadness) of at least one image having the next highest proportion following an attribute (e.g., pleasure) of an image having the highest proportion among at least one retrieved image 820. For example, when the proportion of images corresponding to "pleasure" among retrieved images is the highest and the proportion of images including "wife" is the second highest, an intelligent server 200 may select the expression "wife" as the second additional information. Further, when the proportion of images including a person looking sad among the retrieved images is the next highest following the proportion of the images including "wife", the intelligent server 200 may select the expression "when having an argument" or "when feeing sad" as the second additional information. In addition, when the proportion of images including food among the retrieved images is the next highest following the proportion of the images including the person looking sad, the intelligent server 200 may select the expression "cooking" or "tasty dish" as the second additional information. In operation 1055, the user terminal 100 according to various embodiments of the disclosure may transmit information about the user input received in operation 1050 to the intelligent server 200.

In operation 1060, the intelligent server 200 according to various embodiments of the disclosure may generate third operation information on the basis of user input received in operation 1055. According to various embodiments of the disclosure, the third operation information may include information about an operation of the user terminal 100 outputting (e.g., displaying) a sentence including the search condition (e.g., the first expression) included in a user utterance, the first additional information (e.g., the second expression), and the second additional information (e.g., the third expression). According to various embodiments of the disclosure, the third operation information may include information about an operation of the user terminal 100 arranging and providing the at least one retrieved image 820 in chronological order according to each emotional state. In operation 1065, the intelligent server 200 according to various embodiments of the disclosure may transmit the third operation information generated in operation 1060 to the user terminal 100.

In operation 1070, the user terminal 100 according to various embodiments of the disclosure may provide a response including the search condition based on the user utterance, the first additional information, and the second additional information on the basis of the third operation information received from the intelligent server 200.

Referring to FIG. 10B, the user terminal 100 may receive user input to select a specific menu item (e.g., "Create Story Album" 836) on a user interface 830.

Referring to FIG. 10C, when the user selects the specific menu item (e.g., "Create Story Album" 836), the user terminal 100 may output (e.g., display) a second sentence 912 including the second additional information (e.g., "wife", "although often having an argument", "cooking", or "happy life"). The second sentence 912 according to various embodiments of the disclosure may include a sentence provided along with an image reconstructed according to the user's request. According to various embodiments of the disclosure, when the user selects the specific menu item (e.g., "Create Story Album" 836), the user terminal 100 may display an image 1004 obtained by classifying the at least one retrieved image 820 according to emotional state. FIG. 10C illustrates an embodiment in which images 1004*a* corresponding to a pleasant emotion and images 1004*b* corresponding to a sad emotion are separately displayed. According to various embodiments of the disclosure, images respectively included in the images 1004*a* corresponding to the pleasant emotion and the images 1004*b* corresponding to the sad emotion may be displayed in the order of the time the images were taken. According to various embodiments of the disclosure, each of the images corresponding to the respective emotions may be displayed along with a graphical object representing an identified emotional state (e.g., pleasure or sadness). According to various embodiments of the disclosure, the user terminal 100 may display a menu 1006 to store the second sentence 912 and the images 1004 classified by emotion and a menu 1008 to go back to the previous operation on the basis of the second operation information.

Figure 11A:
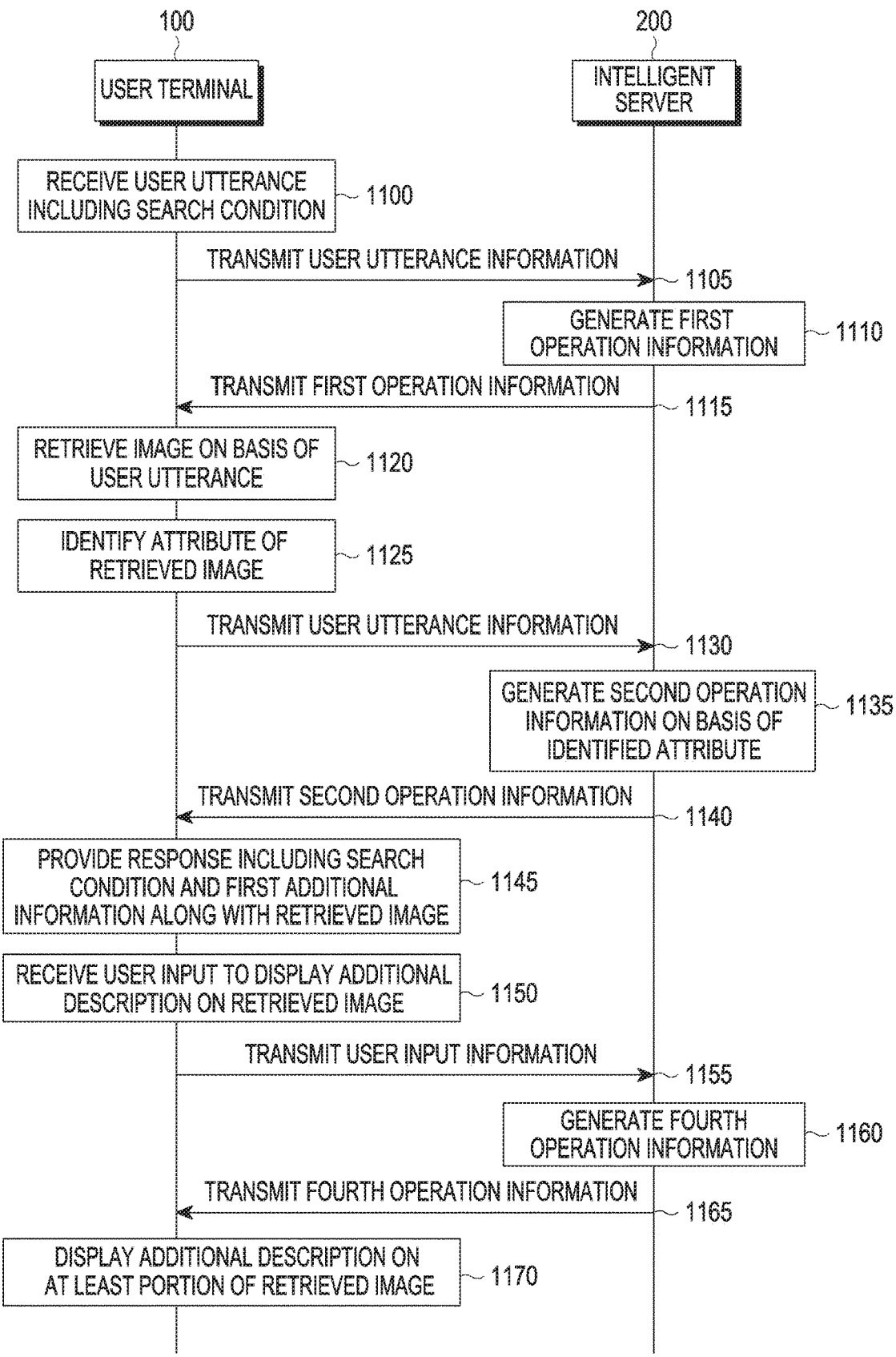
FIG. 11A illustrates an operation of additionally displaying an additional description associated with an image on the image retrieved according to a user utterance according to an embodiment of the disclosure.

FIG. 11A illustrates an operation of additionally displaying an additional description associated with an image on the image retrieved according to a user utterance according to an embodiment of the disclosure.

Figure 11B:
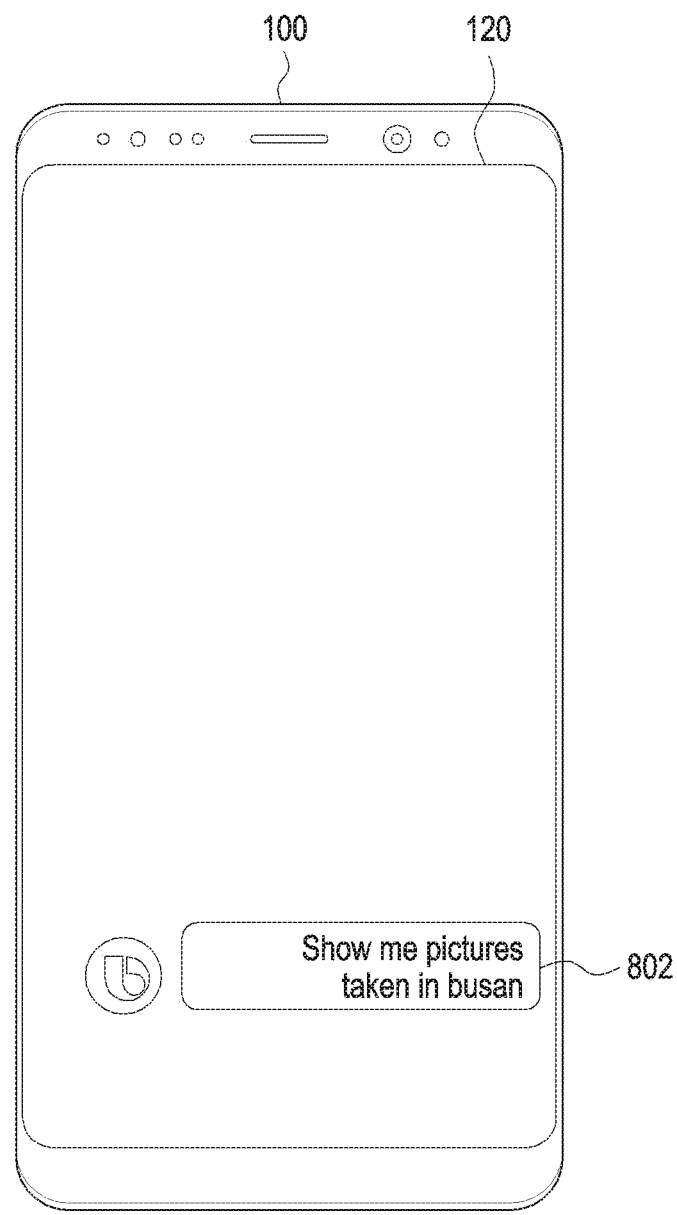
FIG. 11B illustrates an operation of additionally displaying an additional description associated with an image on the image retrieved according to a user utterance according to an embodiment of the disclosure.

FIG. 11B illustrates an operation of additionally displaying an additional description associated with an image on the image retrieved according to a user utterance according to an embodiment of the disclosure.

Figure 11C:
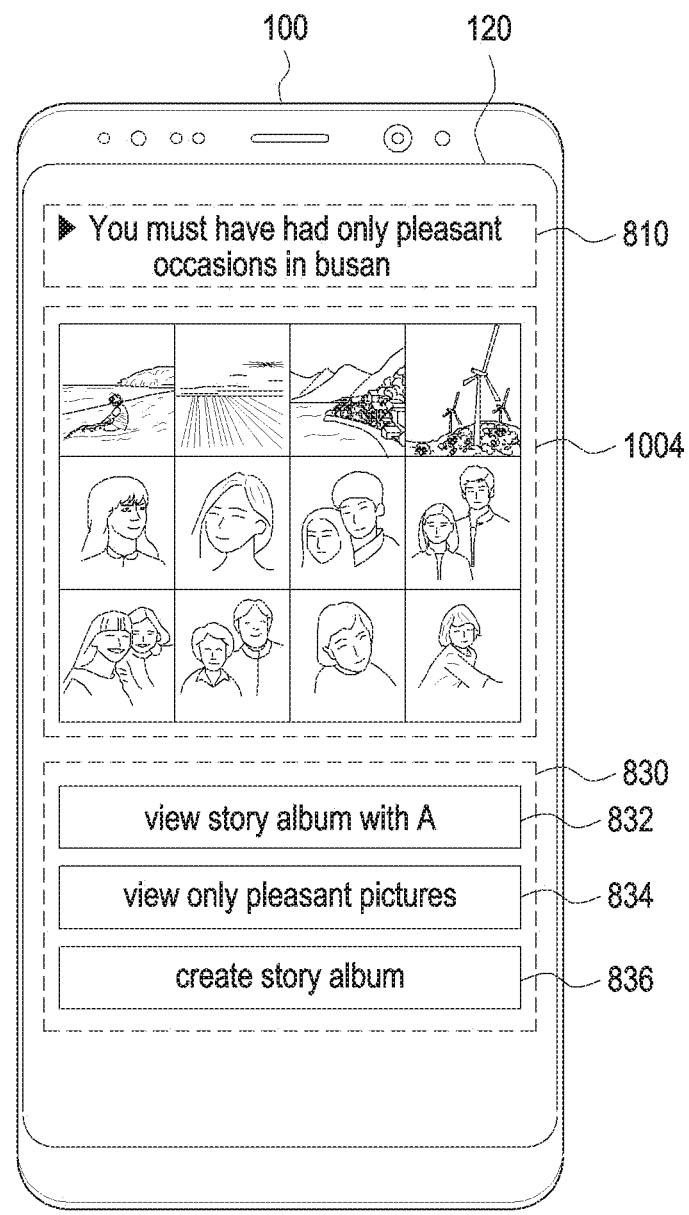
FIG. 11C illustrates an operation of additionally displaying an additional description associated with an image on the image retrieved according to a user utterance according to an embodiment of the disclosure.

FIG. 11C illustrates an operation of additionally displaying an additional description associated with an image on the image retrieved according to a user utterance according to an embodiment of the disclosure.

Figure 11D:
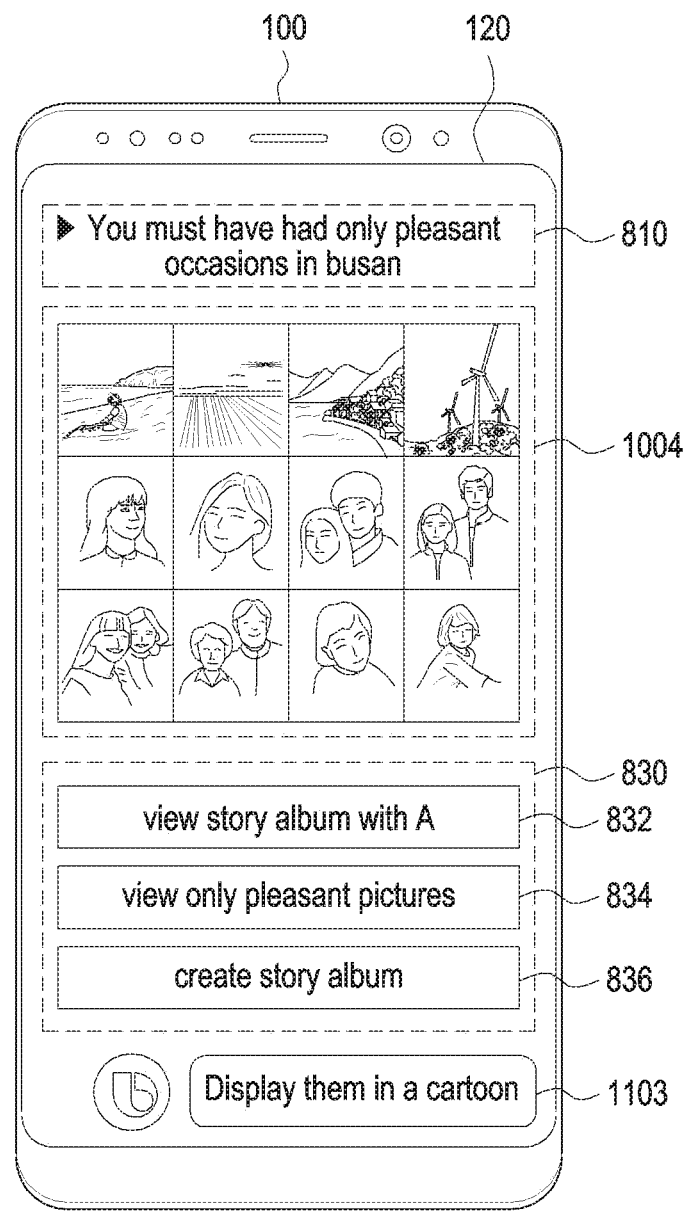
FIG. 11D illustrates an operation of additionally displaying an additional description associated with an image on the image retrieved according to a user utterance according to an embodiment of the disclosure.

FIG. 11D illustrates an operation of additionally displaying an additional description associated with an image on the image retrieved according to a user utterance according to an embodiment of the disclosure.

Figure 11E:
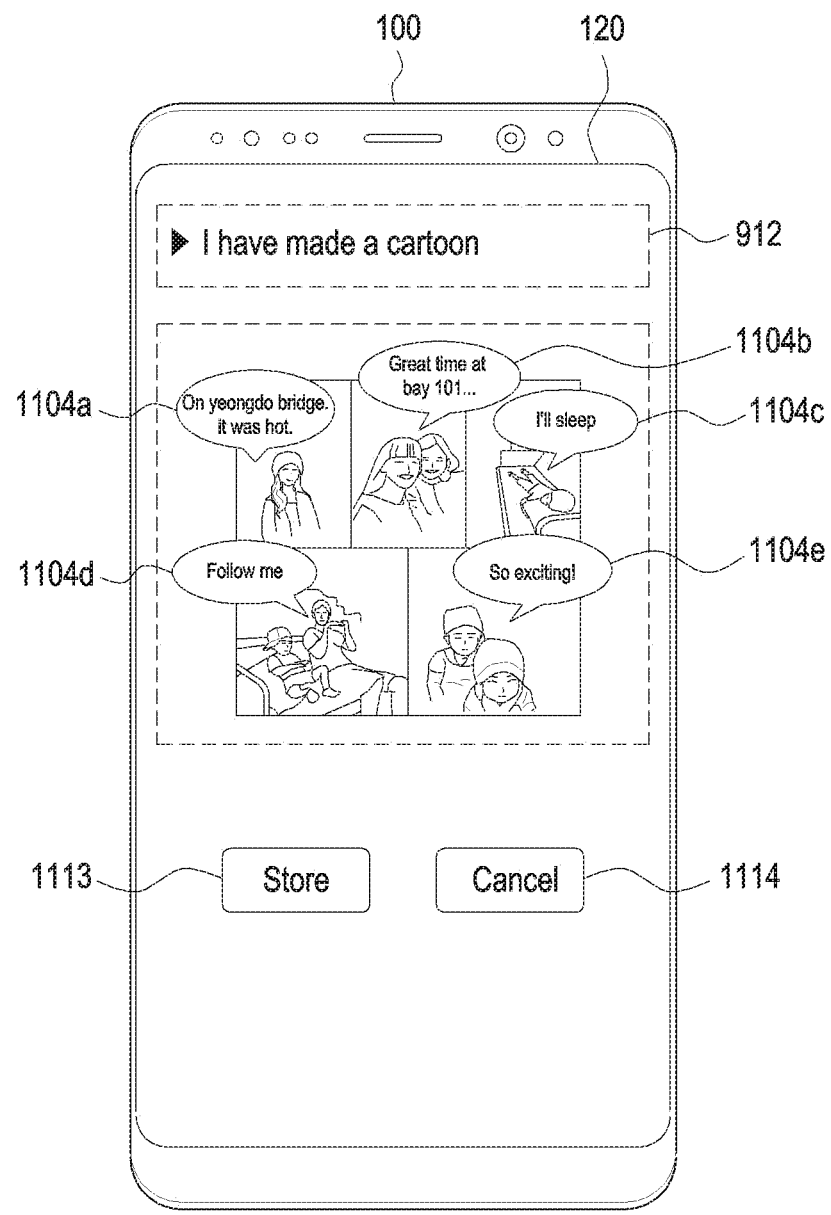
FIG. 11E illustrates an operation of additionally displaying an additional description associated with an image on the image retrieved according to a user utterance according to an embodiment of the disclosure.

FIG. 11E illustrates an operation of additionally displaying an additional description associated with an image on the image retrieved according to a user utterance according to an embodiment of the disclosure.

Operation 1100 to operation 1145 illustrated in FIG. 11A are the same as operation 720 to operation 765 illustrated in FIG. 7B.

Referring to FIG. 11A, in operation 1150, a user terminal 100 according to various embodiments of the disclosure may receive user input to display an additional description on a retrieved image. The additional description according to various embodiments of the disclosure may include a description associated with at least one object included in a specific image. The additional description according to various embodiments of the disclosure may be displayed in the form of a speech bubble on at least a portion of each image. In operation 1155, the user terminal 100 according to various embodiments of the disclosure may transmit information about the user input received in operation 1150 to an intelligent server 200.

Upon receiving the information about the user input, the intelligent server 200 according to various embodiments of the disclosure may generate fourth operation information in operation 1160 on the basis of an attribute of the retrieved image according to operation 1125. For example, the intelligent server 200 according to various embodiments of the disclosure may select an additional description on the basis of the attribute of the image, such as a location (e.g., "Busan") in which the image is taken, a landmark (e.g., "Yeongdo Bridge") included in the image, and the posture of a person (e.g., a lying position or a plurality of people in the same pose) included in the image. Details of the additional description according to various embodiments of the disclosure may be stored in advance in the intelligent server 200. The fourth operation information according to various embodiments of the disclosure may include information about an operation of the user terminal 100 displaying the additional description, selected by the intelligent server 200, along with at least one retrieved image 820. In operation 1165, the intelligent server 200 according to various embodiments of the disclosure may transmit the generated fourth operation information to the user terminal 100.

In operation 1170, the user terminal 100 according to various embodiments of the disclosure may display the additional description on at least a portion of the retrieved image on the basis of the fourth operation information.

Referring to FIG. 11B, the user terminal 100 according to various embodiments of the disclosure may receive a user utterance including a search condition (e.g., "picture taken in Busan"). According to various embodiments of the disclosure, the content of the received user utterance may be displayed on the user terminal 100.

Referring to FIG. 11C, the user terminal 100 according to various embodiments of the disclosure may display at least one of a first sentence 810, the at least one retrieved image 820, and a user interface 830 according to the user utterance.

Referring to FIG. 11D, the user terminal 100 according to various embodiments of the disclosure may receive user input 804 (e.g., "Display them in a cartoon!") to display the additional description on the at least one retrieved image. The user input 1103 according to various embodiments of the disclosure may be input in a spoken format. According to various embodiments of the disclosure, the user terminal 100 may display the user input 1103 (e.g., "Display them in a cartoon!") to display the additional description along with the first sentence 810, the at least one retrieved image 820, and the user interface 830.

Referring to FIG. 11E, the user terminal 100 according to various embodiments of the disclosure may display at least one of a second sentence 912 (e.g., "I have made a cartoon") corresponding to the user input 804 to display the additional description, images 1104 with additional descriptions 1104a, 1104b, 1104c, 1104d, and 1104e, a menu 1113 to store the images with the additional descriptions, and a menu 1114 to go back to the previous screen. The intelligent server 200 according to various embodiments of the disclosure may select the expression "cartoon" in response to user input requesting the display of an additional description in a speech bubble.

Figure 12A:
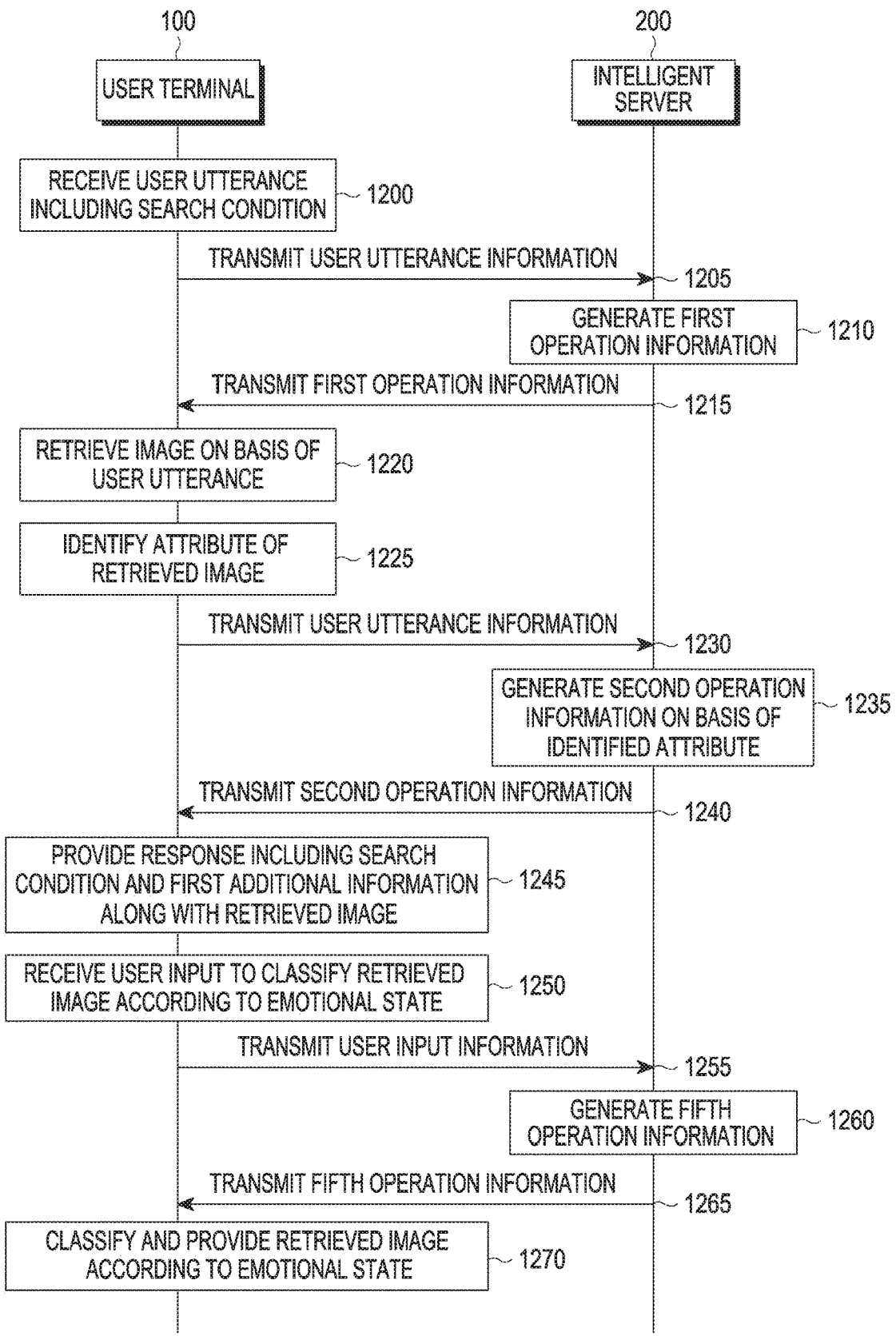
FIG. 12A illustrates an operation of classifying an image retrieved according to a user utterance by emotional state and displaying the image according to an embodiment of the disclosure.

FIG. 12A illustrates an operation of classifying an image retrieved according to a user utterance by emotional state and displaying the image according to an embodiment of the disclosure.

Figure 12B:
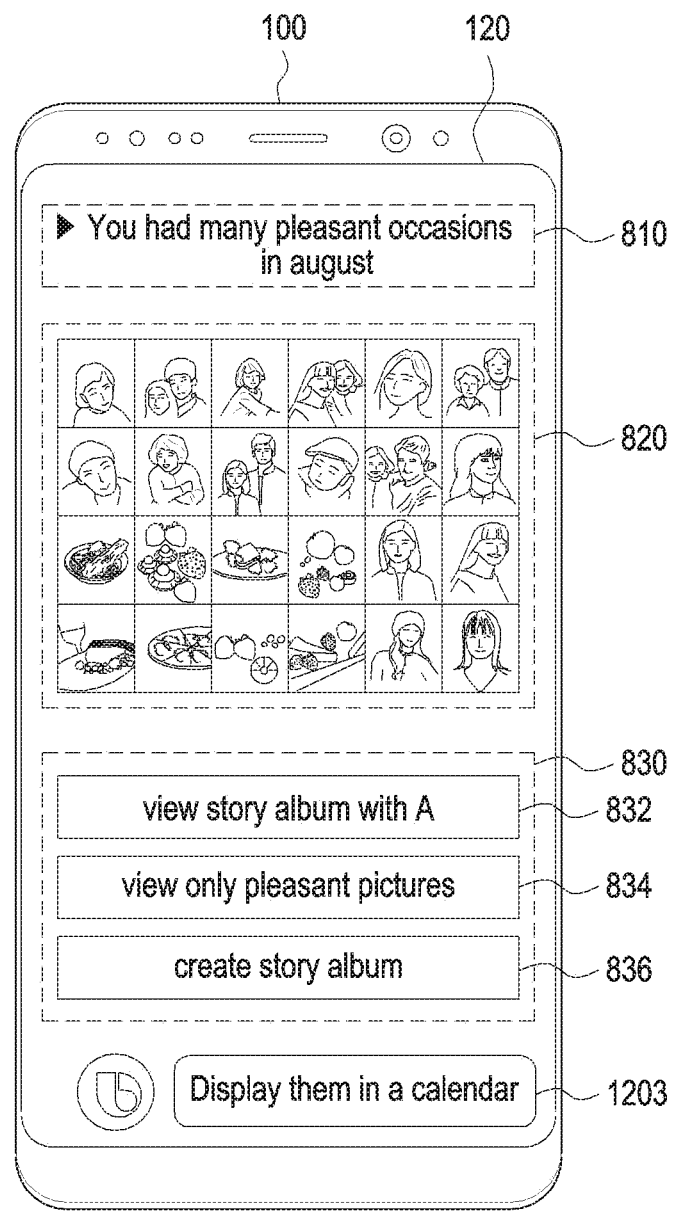
FIG. 12B illustrates an operation of classifying an image retrieved according to a user utterance by emotional state and displaying the image according to an embodiment of the disclosure.

FIG. 12B illustrates an operation of classifying an image retrieved according to a user utterance by emotional state and displaying the image according to an embodiment of the disclosure.

Figure 12C:
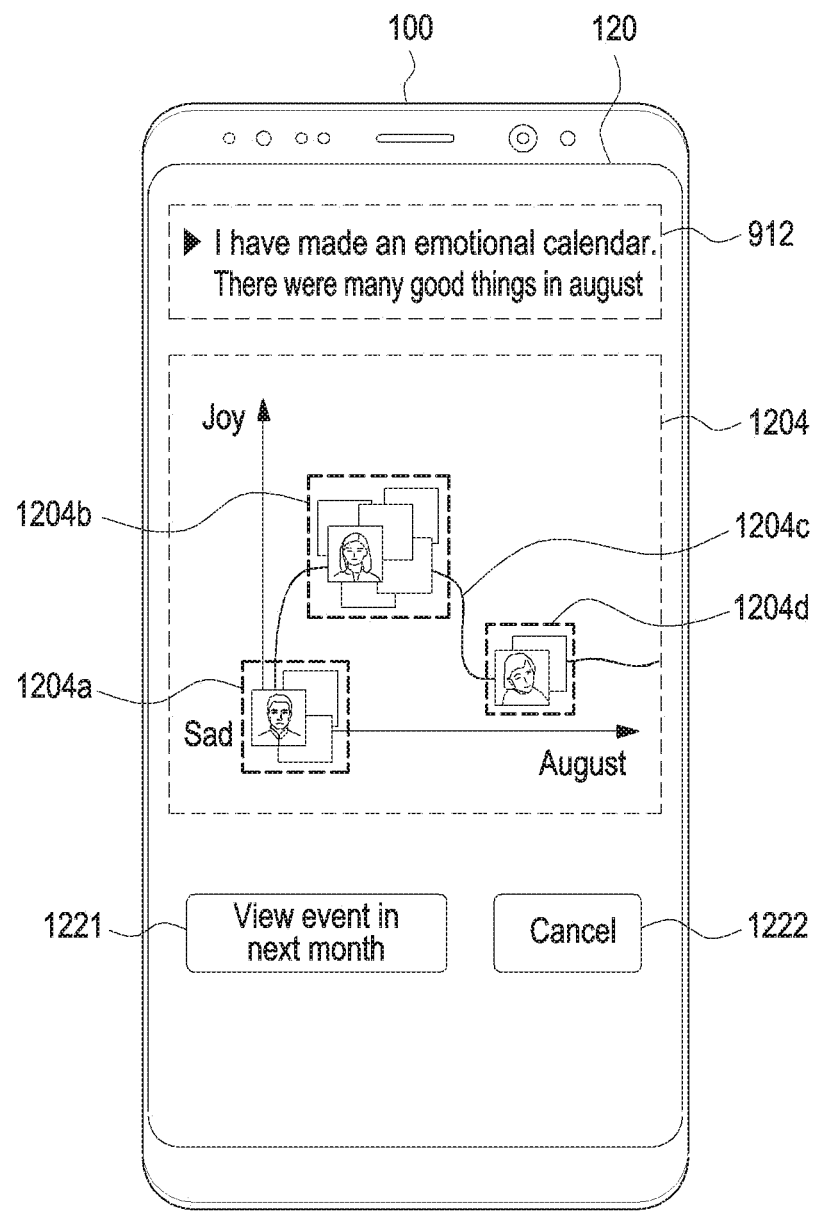
FIG. 12C illustrates an operation of classifying an image retrieved according to a user utterance by emotional state and displaying the image according to an embodiment of the disclosure.

FIG. 12C illustrates an operation of classifying an image retrieved according to a user utterance by emotional state and displaying the image according to an embodiment of the disclosure.

Figure 12D:
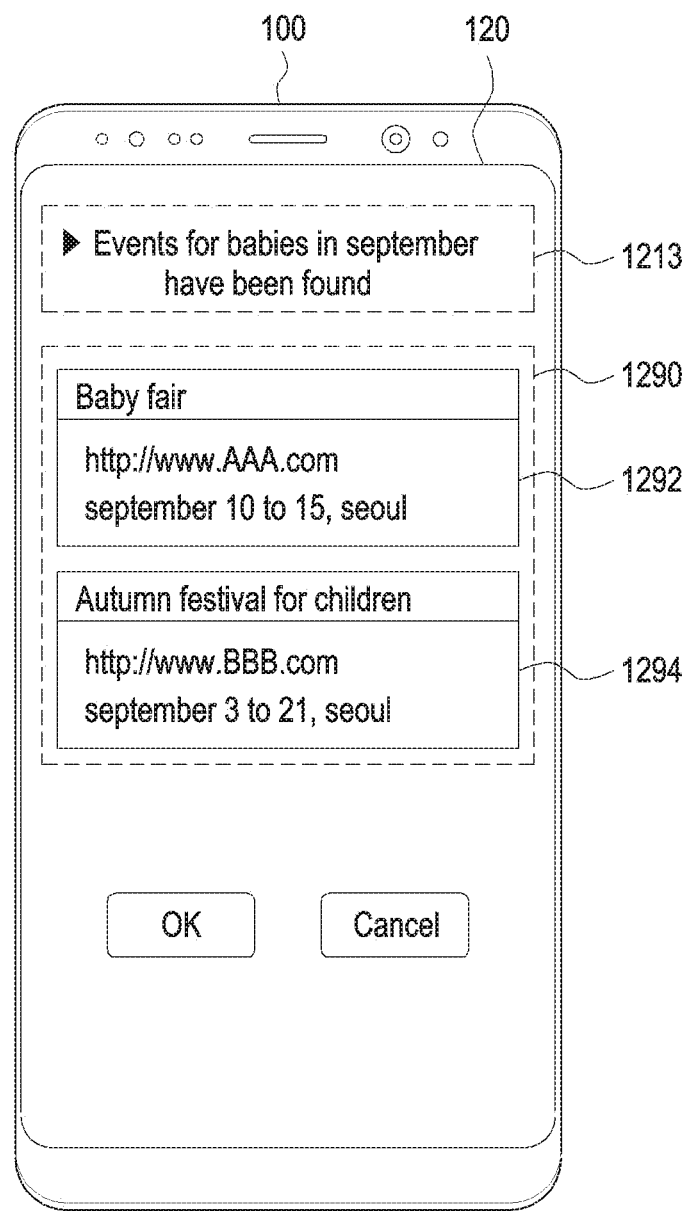
FIG. 12D illustrates an operation of classifying an image retrieved according to a user utterance by emotional state and displaying the image according to an embodiment of the disclosure.

FIG. 12D illustrates an operation of classifying an image retrieved according to a user utterance by emotional state and displaying the image according to an embodiment of the disclosure.

Operation 1200 to operation 1245 illustrated in FIG. 12A are the same as operation 720 to operation 765 illustrated in FIG. 7B.

Referring to FIG. 12A, in operation 1250, a user terminal 100 according to various embodiments of the disclosure may receive user input to classify at least one retrieved image 820 according to emotional state. The user terminal 100 according to various embodiments of the disclosure may transmit information about the received user input to an intelligent server 200 in operation 1255.

Upon receiving the information about the user input, the intelligent server 200 according to various embodiments of the disclosure may generate fifth operation information. The fifth operation information according to various embodiments of the disclosure may include information about an operation of the user terminal 100 arranging the emotional state of a person included in the at least one retrieved image 820 in chronological order and displaying the emotional state in a graph. For example, the fifth operation information according to various embodiments of the disclosure may include information about an operation of the user terminal 100 identifying an emotional state having the highest proportion on each date (i.e., a representative emotional state on each date) in images taken on at least one date (e.g., August 1, 10, 20, and 30) included in a specific month (e.g., August) included in the user utterance and selectively displaying at least one image corresponding to the emotional state having the highest proportion. The at least one date (e.g., August 1, 10, 20, and 30) according to various embodiments of the disclosure may be selected as target date for identifying a representative emotion when the number of images captured on each date included in a period (e.g., August) specified by the user is a predetermined number (e.g., 10) or greater.

Among the at least one date according to various embodiments of the disclosure, any date included in a period specified by the user may be selected as a target date for identifying a representative emotion regardless of the number of captured images. The fifth operation information according to various embodiments of the disclosure may further include information about an operation of the user terminal 100 providing information about an event (e.g., information about a baby fair and information about a concert) associated with a search condition included in the user utterance. In operation 1265, the intelligent server 200 according to various embodiments of the disclosure may transmit the fifth operation information generated in operation 1260 to the user terminal 100.

In operation 1270, the user terminal 100 according to various embodiments of the disclosure may arrange and provide the at least one retrieved image 820 in a graph type according to the received fifth operation information.

Referring to FIG. 12B, the user terminal 100 according to various embodiments of the disclosure may display a first sentence 810, the at least one retrieved image 820, and a user interface 830. The first sentence 810 illustrated in FIG. 12B may include a sentence provided in response to the user utterance (e.g., "Show a picture taken in August!"). The user terminal 100 according to various embodiments of the disclosure may receive user input 1203 (e.g., "Display them in a calendar!") to identify an emotional distribution in a particular month. The user input 1203 according to various embodiments of the disclosure may be entered through user utterance. According to various embodiments of the disclosure, the user terminal 100 may display the received user input 1203 along with at least one of the first sentence 810, the at least one retrieved image 820, and the user interface 830. The graph type according to various embodiments of the disclosure is for illustration, and a representative emotion and an image corresponding to each date may be displayed in a calendar format.

Referring to FIG. 12C, the user terminal 100 according to various embodiments of the disclosure may display a second sentence 912 (e.g., "I have made an emotional calendar. There were many good things in August"), a representative emotion on at least one date of a specified month, at least one image 1204, a menu 1221 to provide event information associated with the search condition included in the user utterance (e.g., "Show me pictures taken in August!"), and a menu 1222 to go back to the previous screen in response to the user input 1203 to identify the emotional distribution in the particular month using the at least one retrieved image 820. FIG. 12C illustrates an embodiment in which the emotional distribution is expressed in a graph type, which is for illustration. In the graph type according to various embodiments of the disclosure, the x axis may represent time (e.g., month and date), and the y axis may represent the probability of an emotion (e.g., the probability of having a pleasant emotion). Referring to the emotional distribution illustrated in FIG. 12C according to various embodiments of the disclosure, sadness is selected as a representative emotion on August 1, pleasure is selected as a representative emotion on August 7, and slight sadness is selected as a representative emotion on August 25. The user terminal 100 according to various embodiments of the disclosure may also display information about an event (e.g., birthday) existing on a specific date (e.g., August 7). The user terminal 100 according to various embodiments of the disclosure may display at least one image 1204*a*, 1204*b*, 1204*c* or 1204*d* corresponding to a representative emotion. The user terminal 100 according to various embodiments of the disclosure may identify the probability of an emotional state at the time of photographing on the basis of the facial expression of a person included in the at least one retrieved image 820.

The intelligent server 200 according to various embodiments of the disclosure may select a second expression on the basis of the number of images included in each representative emotion. For example, as illustrated in FIG. 12C, when the largest number of images corresponds to pleasure among the at least one retrieved image 820, the intelligent server 200 may select a sentence or expression "There were many good things". The intelligent server 200 according to various embodiments of the disclosure may identify a date including the largest number of images. For example, when the largest number of images identified as pleasure corresponds to August 7, the intelligent server 200 according to various embodiments of the disclosure may select the expression "early August". Accordingly, the user terminal 100 may briefly provide the user with an emotion in a specific period (e.g., August) included in the user utterance. The intelligent server 200 according to various embodiments of the disclosure may provide the user terminal 100 with an operation of outputting information about the selected sentence or expression as the fifth operation information.

According to various embodiments of the disclosure, the user terminal 100 may receive selection input via the menu 1221 to provide event information associated with the search condition included in the user utterance (e.g., "Show me pictures taken in August!"). Upon receiving the selection input via the menu 1221 to provide event information associated with the search condition included in the user utterance (e.g., "Show me pictures taken in August!"), as illustrated in FIG. 12D, the user terminal 100 according to various embodiments of the disclosure may provide event information 1290 (e.g., events scheduled to be held in September) associated with the search condition (e.g., a picture taken in August) included in the user utterance (e.g., "Show me pictures taken in August!").

Referring to FIG. 12D, an embodiment in which based on at least one response 1213 information about a "Baby Fair" event 1292 and an "Autumn Festival for Children" event 1294 is provided as an example of the event information 1290 is illustrated.

Figure 13A:
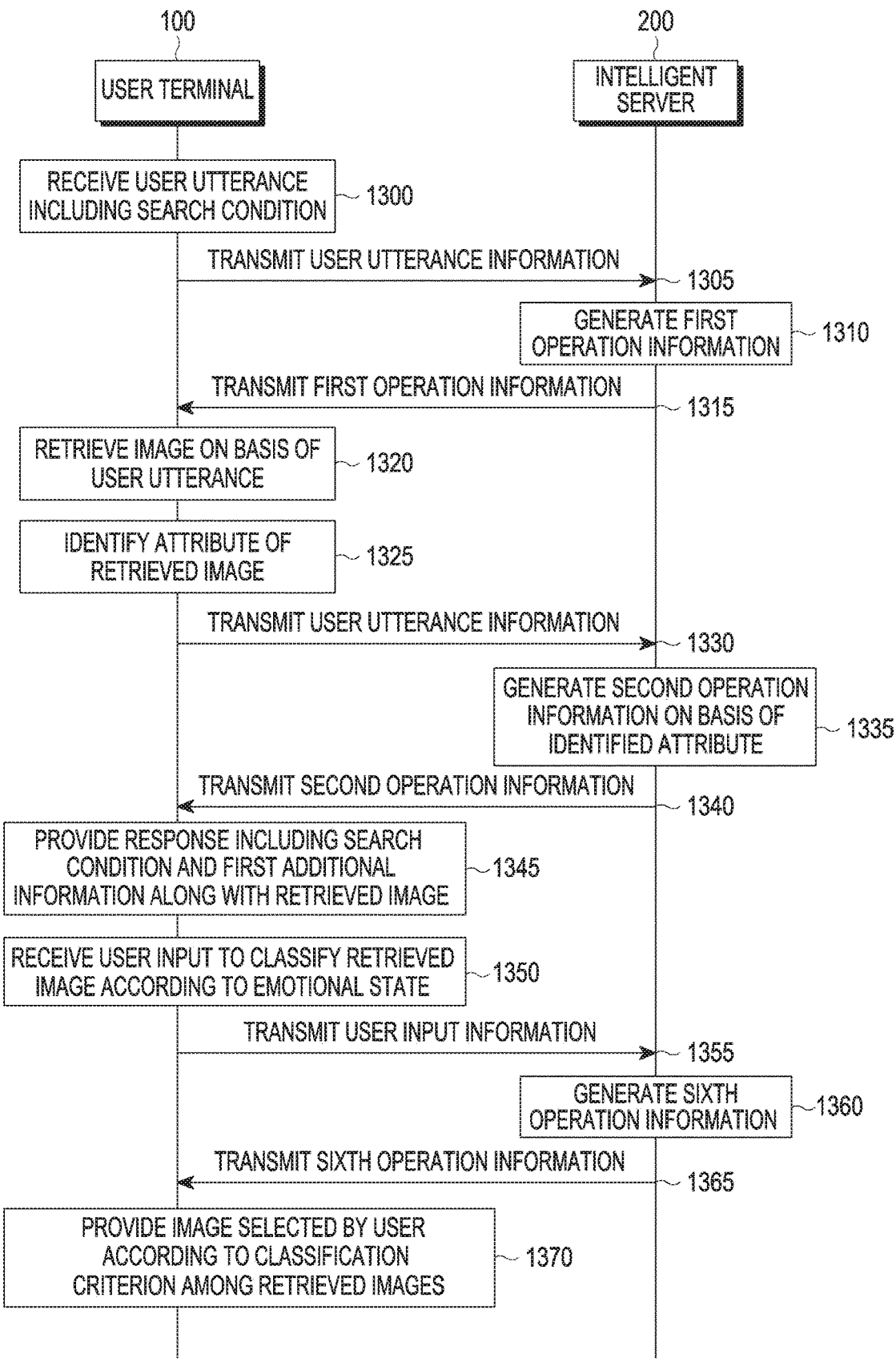
FIG. 13A illustrates an operation of selectively displaying an image retrieved according to a user utterance depending on a specified emotional state according to an embodiment of the disclosure.

FIG. 13A illustrates an operation of selectively displaying an image retrieved according to a user utterance depending on a specified emotional state according to an embodiment of the disclosure.

Figure 13B:
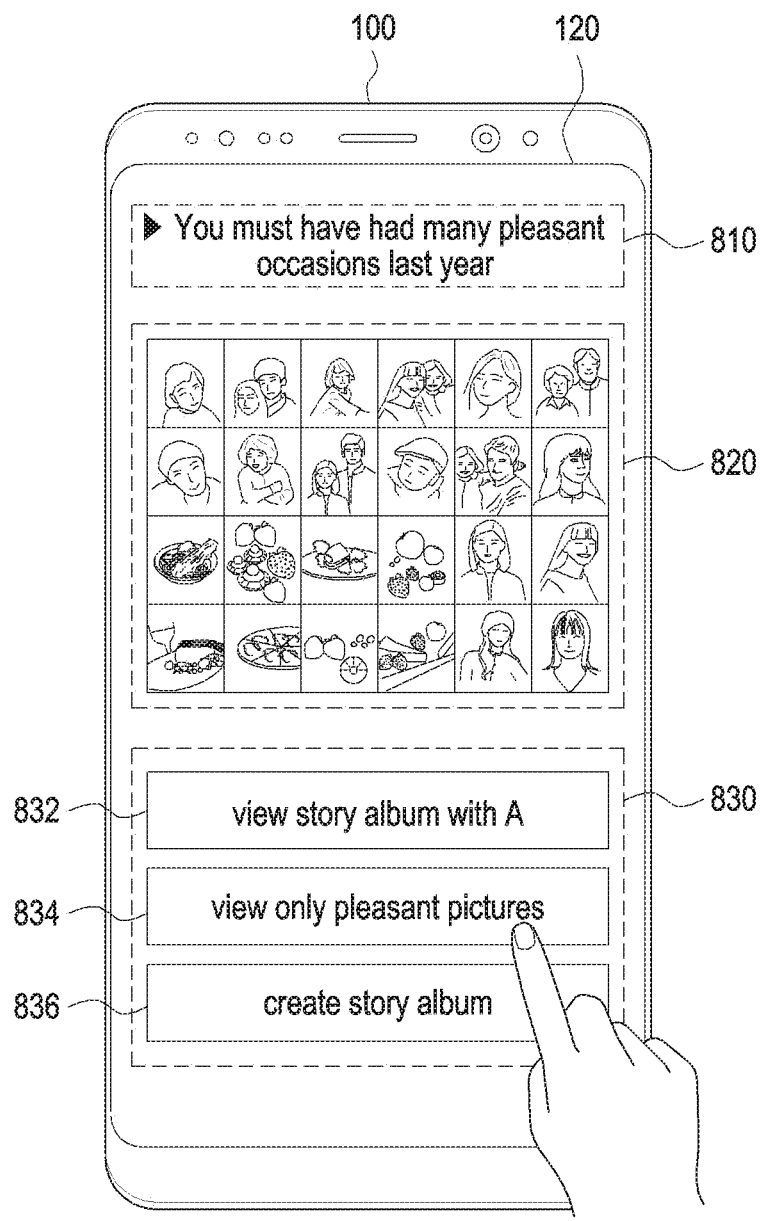
FIG. 13B illustrates an operation of selectively displaying an image retrieved according to a user utterance depending on a specified emotional state according to an embodiment of the disclosure.

FIG. 13B illustrates an operation of selectively displaying an image retrieved according to a user utterance depending on a specified emotional state according to an embodiment of the disclosure.

Figure 13C:
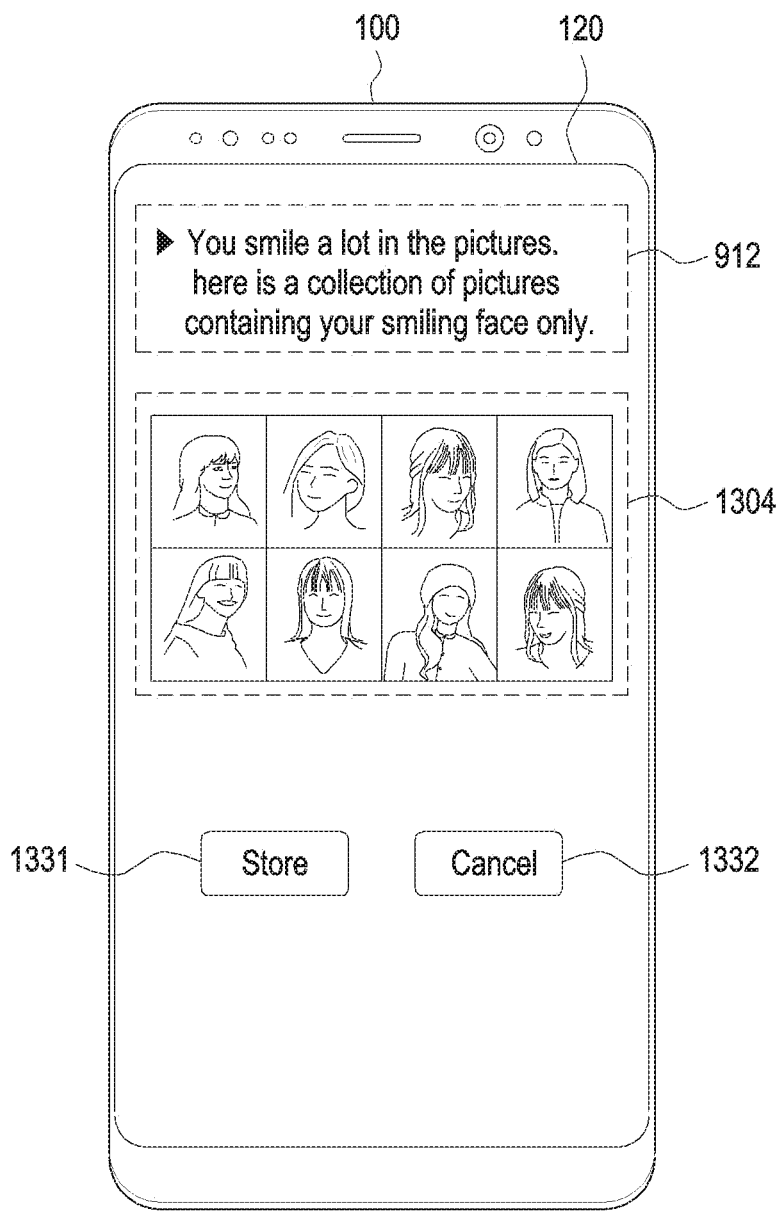
FIG. 13C illustrates an operation of selectively displaying an image retrieved according to a user utterance depending on a specified emotional state according to an embodiment of the disclosure.

FIG. 13C illustrates an operation of selectively displaying an image retrieved according to a user utterance depending on a specified emotional state according to an embodiment of the disclosure.

Figure 13D:
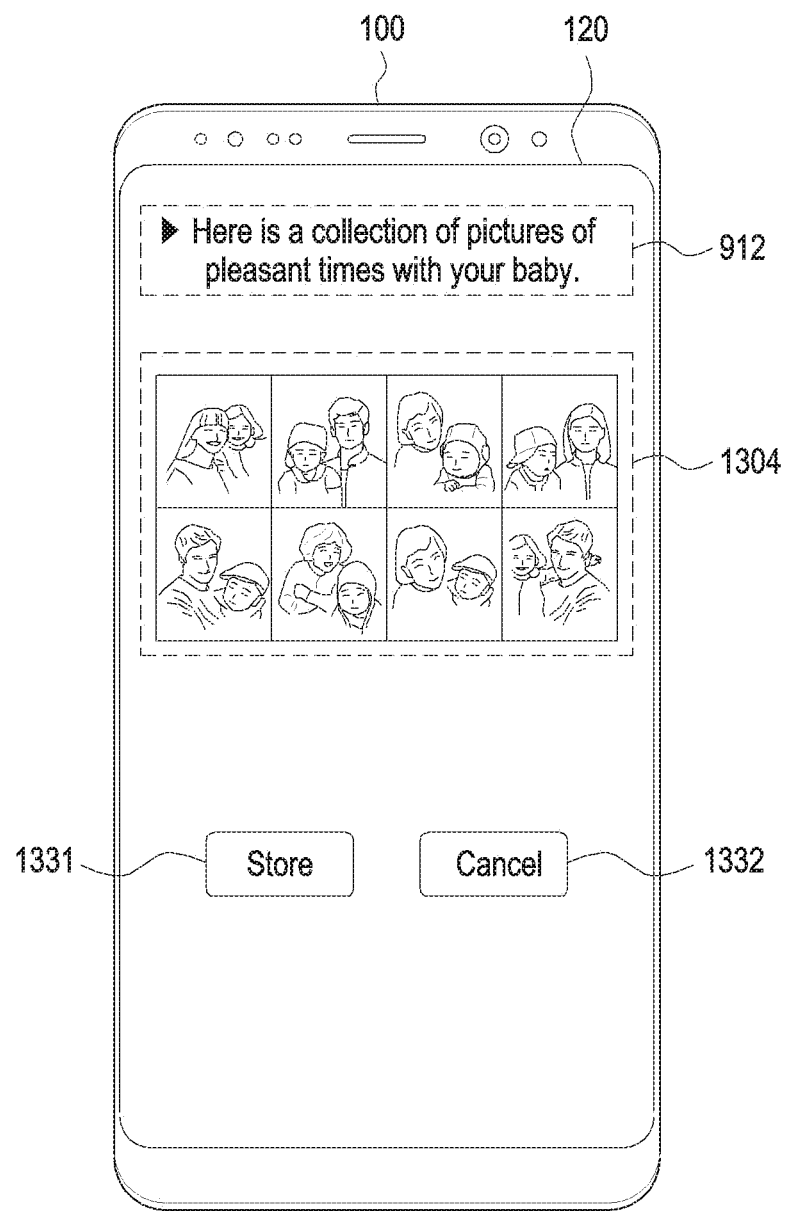
FIG. 13D illustrates an operation of selectively displaying an image retrieved according to a user utterance depending on a specified emotional state according to an embodiment of the disclosure.

FIG. 13D illustrates an operation of selectively displaying an image retrieved according to a user utterance depending on a specified emotional state according to an embodiment of the disclosure.

Operation 1300 to operation 1345 illustrated in FIG. 13A are the same as operation 720 to operation 765 illustrated in FIG. 7B.

Referring to FIG. 13A, a user terminal 100 according to various embodiments of the disclosure may receive user input to reclassify (selectively display) a retrieved image. For example, the user terminal 100 according to various embodiments of the disclosure may selectively display at least one image having a smiling face among at least one retrieved image according to the user input. The user terminal 100 according to various embodiments of the disclosure may transmit information in operation 1355 about the user input received in operation 1350 to an intelligent server 200.

The intelligent server 200 according to various embodiments of the disclosure, in operation 1360, may generate sixth operation information according to the received information about the user input. The sixth operation information according to various embodiments of the disclosure may include information about an operation of the user terminal 100 providing an image selected according to a classification criterion (e.g., for displaying only a smiling picture) of the user from among the at least one retrieved image. In operation 1365, the intelligent server 200 according to various embodiments of the disclosure may transmit the generated sixth operation information to the user terminal 100.

In operation 1370, the user terminal 100 according to various embodiments of the disclosure may provide the image, selected according to the classification criterion selected by the user from among the at least one retrieved image, on the basis of the sixth operation information received from the intelligent server 200.

Referring to FIG. 13B, the user terminal 100 according to various embodiments of the disclosure may receive input to reclassify at least one retrieved image from the user. For example, the user terminal 100 according to various embodiments of the disclosure may receive a selection of a "view only pleasant pictures" menu 834 from the user. According to various embodiments of the disclosure, the input to reclassify the at least one retrieved image may also be received through user utterance.

Referring to FIG. 13C, upon receiving the input from the user, the user terminal 100 according to various embodiments of the disclosure may display at least one image 1304 reclassified by the user (at least one image including a smiling person) among the least one retrieved image. For example, at least one image including a person having a smiley face may be displayed. FIG. 13C illustrates an embodiment in which the user terminal 100 selectively displays a smiling image of only a particular user according to the user input. According to various embodiments of the disclosure, the user terminal 100 may select and display all images having a smiling face among the at least one retrieved image. The user terminal 100 according to various embodiments of the disclosure may display a second sentence 912 (e.g., "You smile a lot in the pictures. Here is a collection of pictures containing your smiling face only.") to describe the at least one reclassified image 1304 in addition to the at least one image 1304 reclassified by the user. According to various embodiments of the disclosure, the intelligent server 200 may generate, as the sixth operation information, an operation of selecting the second sentence 912 according to the user input to reclassify the at least one retrieved image 820 and an operation of the user terminal 100 displaying the second sentence 912. The user terminal 100 according to various embodiments of the disclosure may display a menu 1331 to store the at least one reclassified image 1304 and a menu 1332 to go back to the previous screen.

Referring to FIG. 13D, the user terminal 100 according to various embodiments of the disclosure may receive user input to identify only an image including a particular person (e.g., a baby) among the at least one retrieved image 820. Upon receiving the user input to identify only the image including the particular person (e.g., a baby), the user terminal 100 according to various embodiments of the disclosure may selectively display only a picture including the particular person as the at least one reclassified image 1304. In this case, the intelligent server 200 according to various embodiments of the disclosure may generate an operation of selectively displaying the picture including the particular person as the sixth operation information.

Figure 14A:
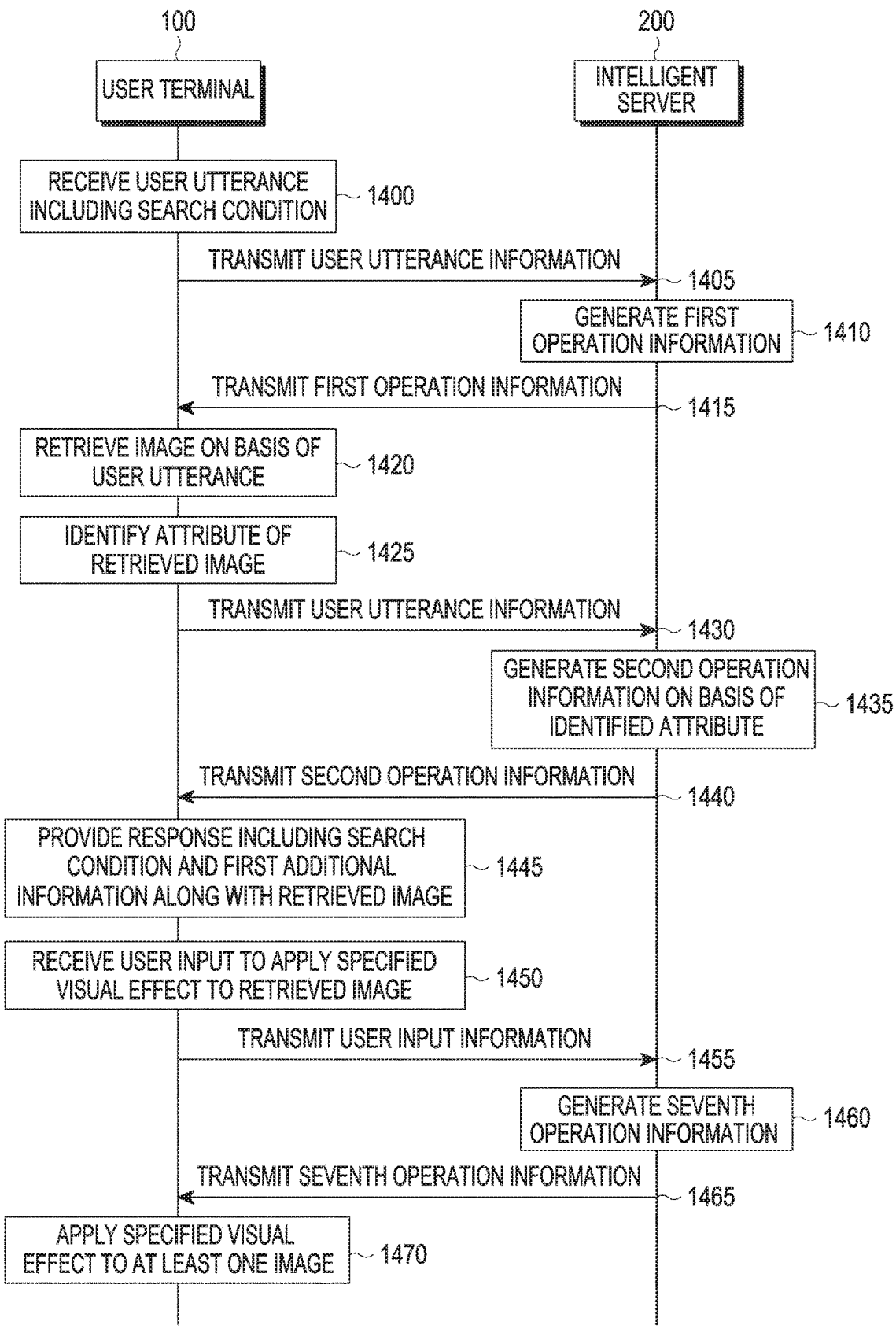
FIG. 14A illustrates an operation of displaying an image retrieved according to a user utterance by applying a specified visual effect to the image or by changing the retrieved image to another image corresponding thereto according to an embodiment of the disclosure.

FIG. 14A illustrates an operation of displaying an image retrieved according to a user utterance by applying a specified visual effect to the image or by changing the retrieved image to another image corresponding thereto according to an embodiment of the disclosure.

Figure 14B:
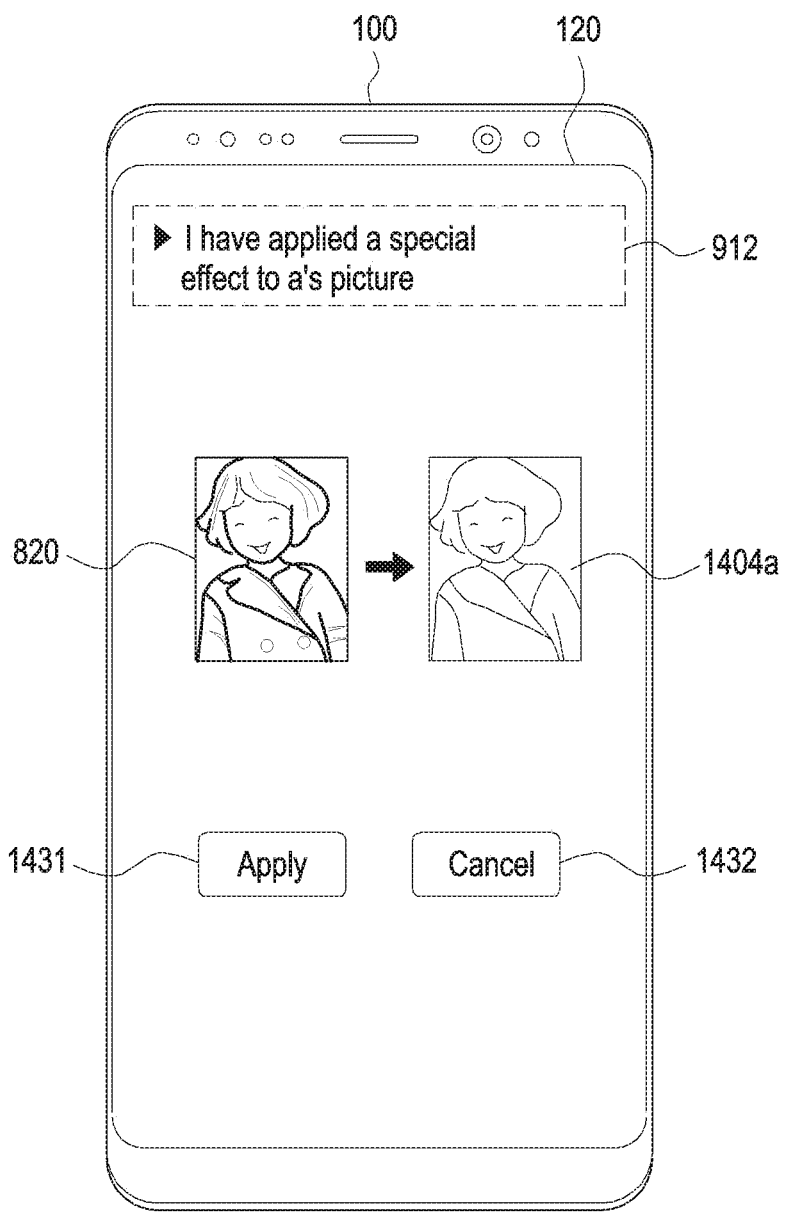
FIG. 14B illustrates an operation of displaying an image retrieved according to a user utterance by applying a specified visual effect to the image or by changing the retrieved image to another image corresponding thereto according to an embodiment of the disclosure.

FIG. 14B illustrates an operation of displaying an image retrieved according to a user utterance by applying a specified visual effect to the image or by changing the retrieved image to another image corresponding thereto according to an embodiment of the disclosure.

Figure 14C:
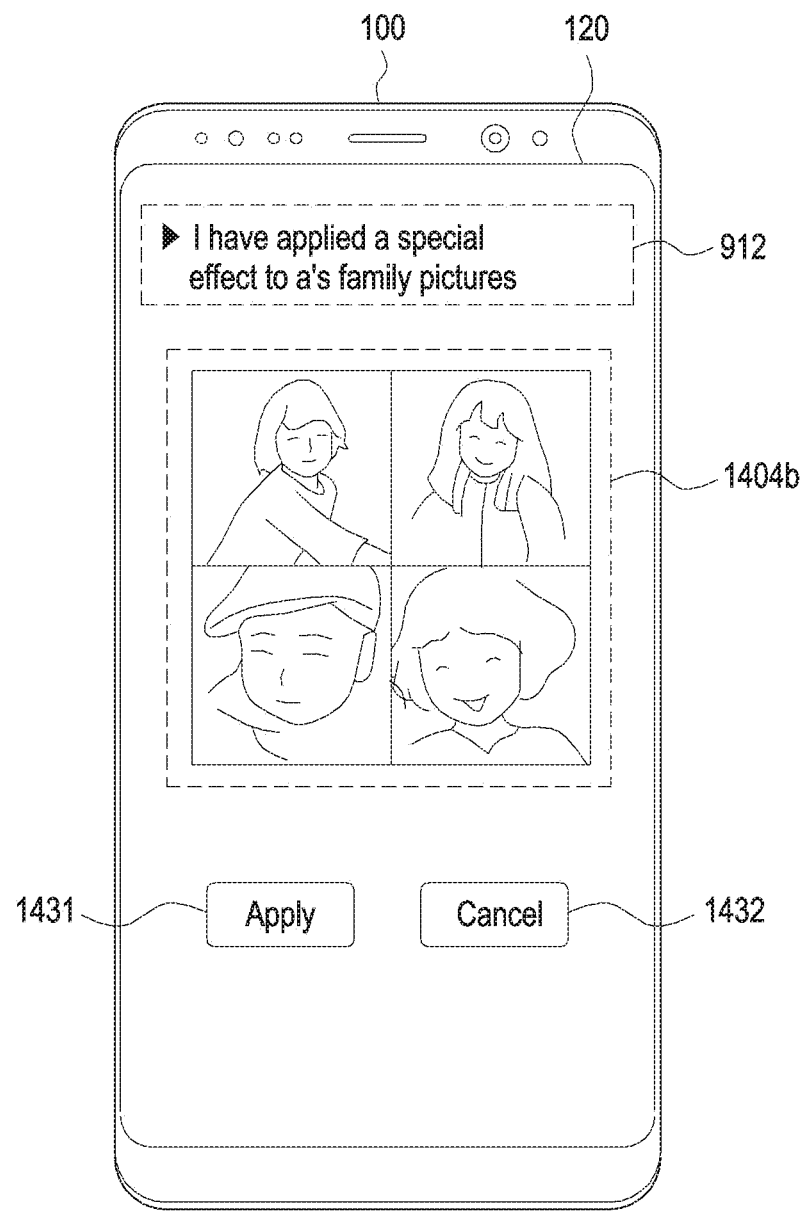
FIG. 14C illustrates an operation of displaying an image retrieved according to a user utterance by applying a specified visual effect to the image or by changing the retrieved image to another image corresponding thereto according to an embodiment of the disclosure.

FIG. 14C illustrates an operation of displaying an image retrieved according to a user utterance by applying a specified visual effect to the image or by changing the retrieved image to another image corresponding thereto according to an embodiment of the disclosure.

Figure 14D:
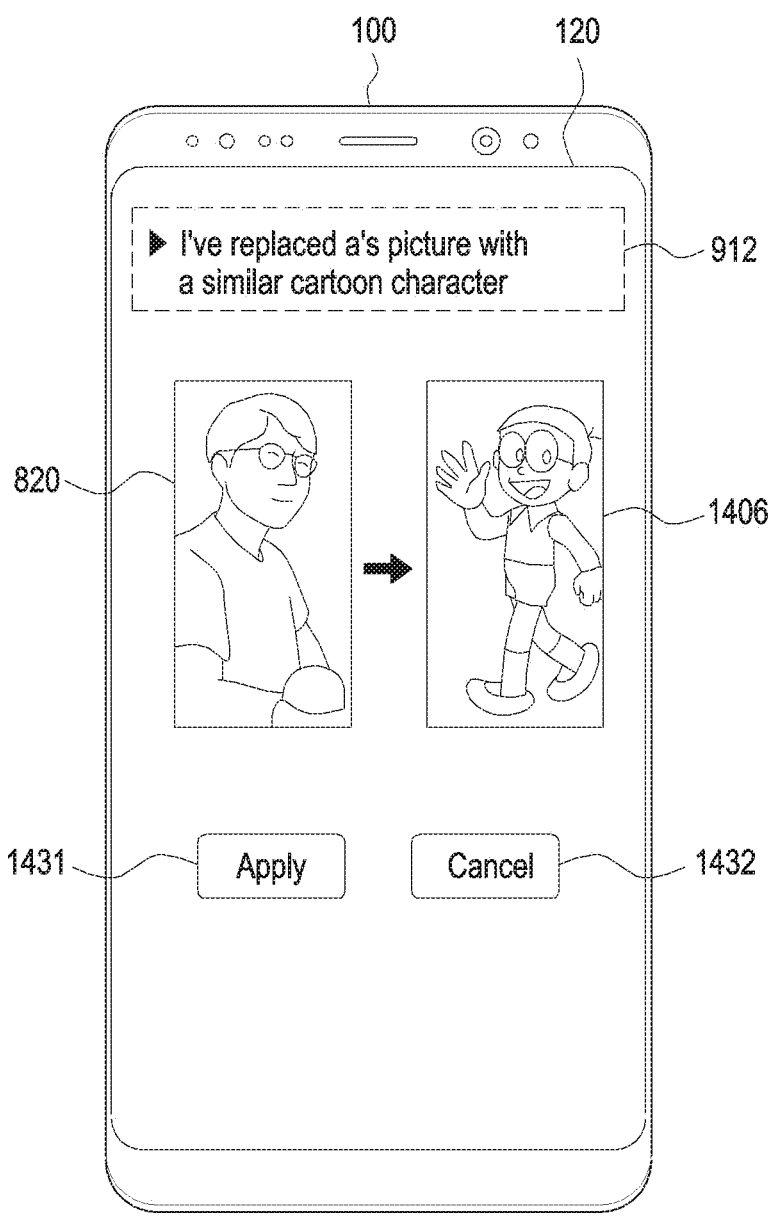
FIG. 14D illustrates an operation of displaying an image retrieved according to a user utterance by applying a specified visual effect to the image or by changing the retrieved image to another image corresponding thereto according to an embodiment of the disclosure.

FIG. 14D illustrates an operation of displaying an image retrieved according to a user utterance by applying a specified visual effect to the image or by changing the retrieved image to another image corresponding thereto according to an embodiment of the disclosure.

Operation 1400 to operation 1445 illustrated in FIG. 14A are the same as operation 720 to operation 765 illustrated in FIG. 7B.

Referring to FIG. 14A, in operation 1450, a user terminal 100 according to various embodiments of the disclosure may receive user input to apply a specified visual effect (e.g., a watercolor effect) to at least one retrieved image. The user input according to various embodiments of the disclosure may be received by touch input on a particular menu or through utterance. The user terminal 100 according to various embodiments of the disclosure may transmit the received user input to an intelligent server 200 in operation 1455.

In operation 1460, the intelligent server 200 according to various embodiments of the disclosure may generate seventh operation information according to the received user input. The seventh operation information according to various embodiments of the disclosure may include information about an operation of the user terminal 100 applying the specified visual effect to at least one image among the at least one retrieved image. According to various embodiments of the disclosure, the at least one image to which the specified visual effect is applied may include an image including a particular person (i.e., a user). According to various embodiments of the disclosure, the particular person may be specified by the intelligent server 200 or may be specified in advance. The intelligent server 200 according to various embodiments of the disclosure may transmit the generated seventh operation information to the user terminal 100 in operation 1465.

In operation 1470, the user terminal 100 according to various embodiments of the disclosure may apply the specified visual effect to at least one image according to the received seventh operation information.

Referring to FIG. 14B, the user terminal 100 may display a result 1404*a* of applying the specified visual effect (e.g., a watercolor effect) to the image 820 including the particular person. According to various embodiments of the disclosure, the user terminal 100 may output (e.g., display) the sentence "I have applied a special effect to A's picture" as a second response 912 along with the image to which the specified visual effect is applied. The intelligent server 200 according to various embodiments of the disclosure may generate, as the seventh operation information, an image to which the visual effect is to be applied and information about an operation of the user terminal 100 displaying the image before the visual effect is applied and an image after the visual effect is applied. The user terminal 100 according to various embodiments of the disclosure may display a menu 1431 to apply the specified visual effect and a menu 1432 to go back to the previous screen. According to various embodiments of the disclosure, the image to which the visual effect is to be applied may be an image of any person (e.g., a family member) having a special relationship with the particular person.

Referring to FIG. 14C, an embodiment in which the specified visual effect 1404b is applied to any person having a special relationship with the particular person is illustrated.

Referring to FIG. 14D, the user terminal 100 according to various embodiments of the disclosure may retrieve and display a character image similar to the particular person. The user terminal 100 according to various embodiments of the disclosure may identify a feature point of a person included in the at least one retrieved image 820 and may retrieve a character image 1406 having a feature point similar to the identified feature point through a network or may retrieve a character stored in the user terminal 100. The user terminal 100 according to various embodiments of the disclosure may display the retrieved character image. The user terminal 100 according to various embodiments of the disclosure may output (e.g., display) the sentence "I've replaced A's picture with a similar cartoon character" as the second response 912 along with the retrieved character image 1406. The user terminal 100 according to various embodiments of the disclosure may display the menu 1431 to apply the specified visual effect and the menu 1432 to go back to the previous screen.

Figure 15A:
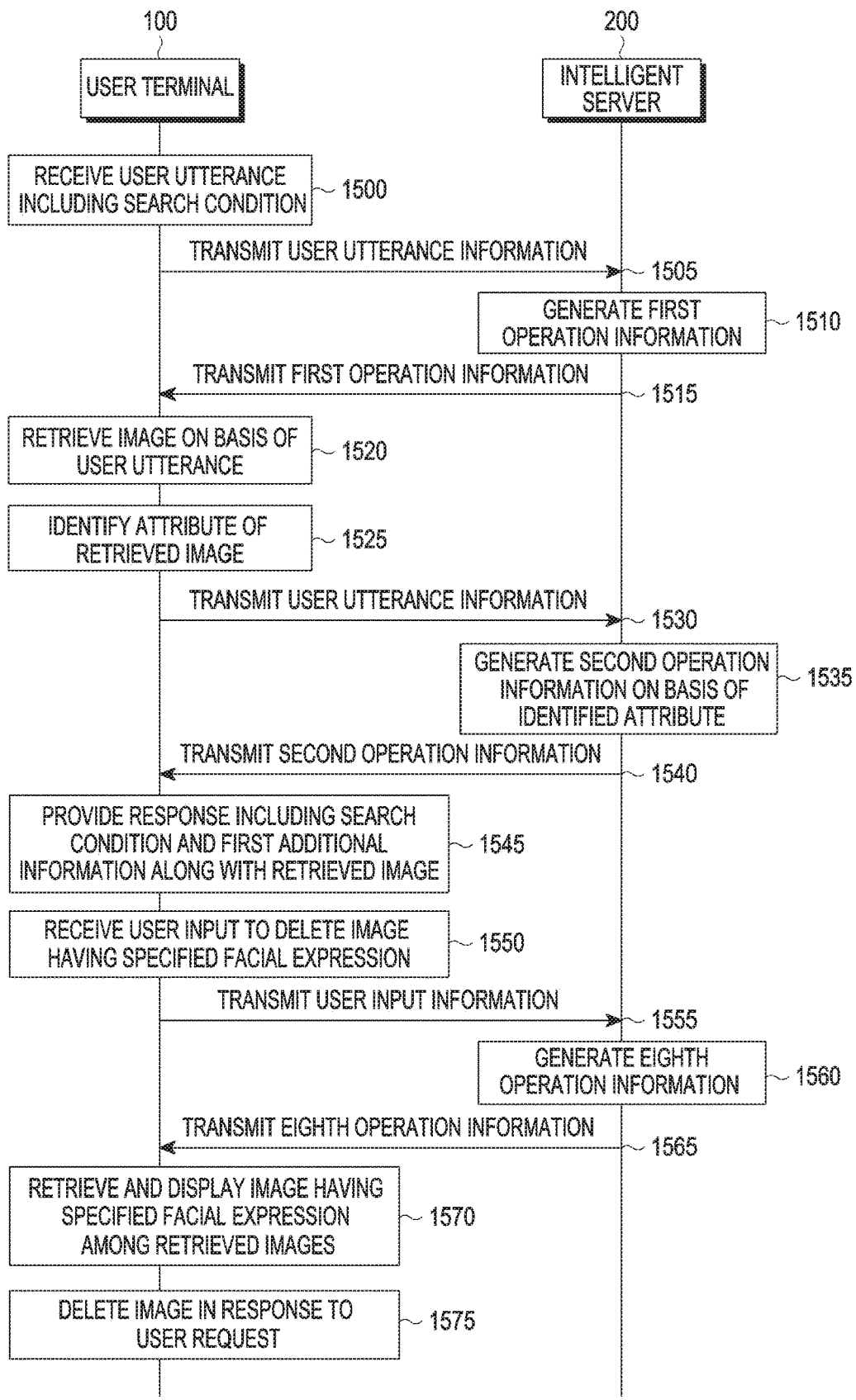
FIG. 15A illustrates an operation of deleting at least one image having a specified emotional state among images retrieved according to a user utterance according to an embodiment of the disclosure.

FIG. 15A illustrates an operation of deleting at least one image having a specified emotional state among images retrieved according to a user utterance according to an embodiment of the disclosure.

Figure 15B:
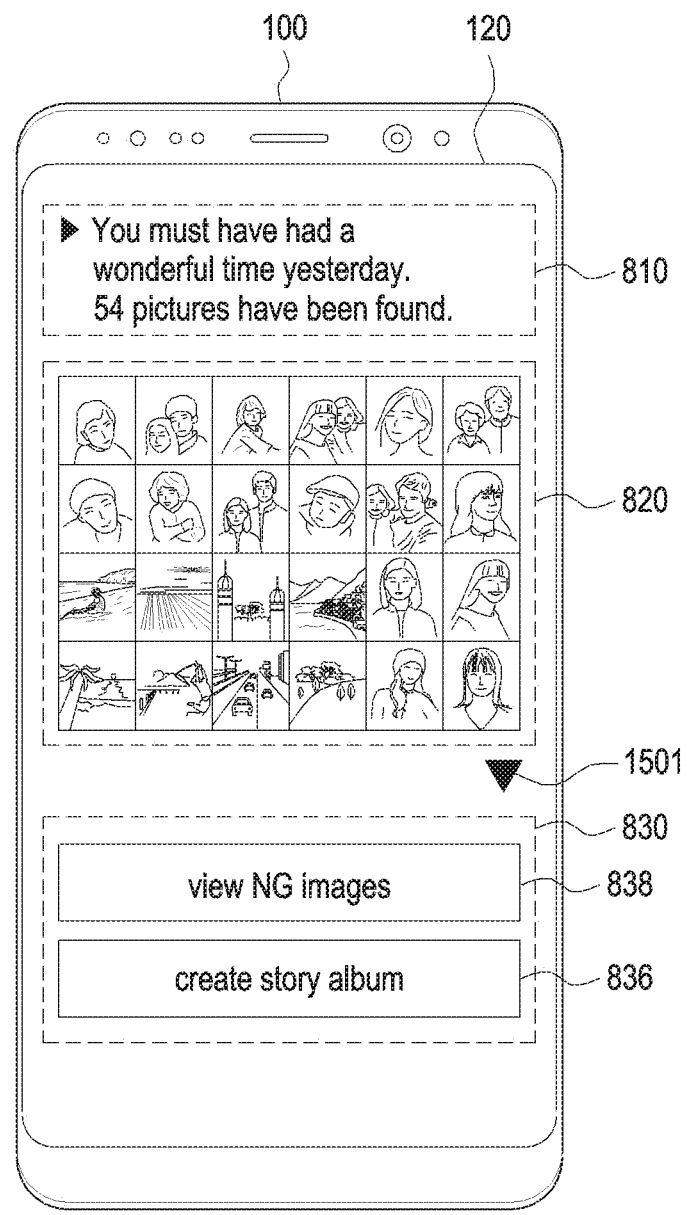
FIG. 15B illustrates an operation of deleting at least one image having a specified emotional state among images retrieved according to a user utterance according to an embodiment of the disclosure.

FIG. 15B illustrates an operation of deleting at least one image having a specified emotional state among images retrieved according to a user utterance according to an embodiment of the disclosure.

Figure 15C:
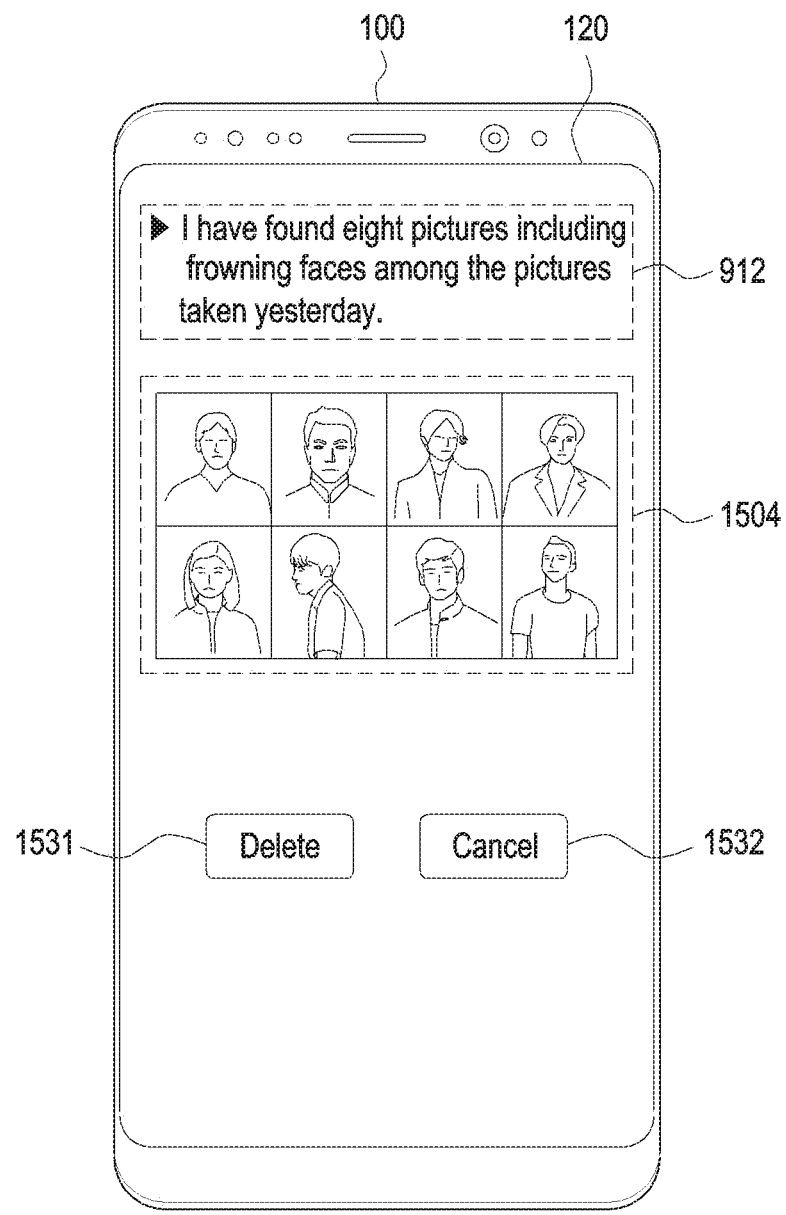
FIG. 15C illustrates an operation of deleting at least one image having a specified emotional state among images retrieved according to a user utterance according to an embodiment of the disclosure.

FIG. 15C illustrates an operation of deleting at least one image having a specified emotional state among images retrieved according to a user utterance according to an embodiment of the disclosure.

Operation 1500 to operation 1545 illustrated in FIG. 15A are the same as operation 720 to operation 765 illustrated in FIG. 7B.

Referring to FIG. 15A, in operation 1550, a user terminal 100 according to various embodiments of the disclosure may receive user input to delete an image having a specified facial expression. In operation 1555, the user terminal 100 according to various embodiments of the disclosure may transmit information about the received user input to an intelligent server 200. The intelligent server 200 according to various embodiments of the disclosure may generate eighth operation information according to the information about the received user input in operation 1560. The eighth operation information according to various embodiments of the disclosure may include information about an operation of the user terminal 100 retrieving and displaying an image having a specified facial expression (e.g., a frowning face) among the at least one retrieved image 820 and an operation of the user terminal 100 deleting the image having the specified facial expression in response to a user request. In operation 1565, the intelligent server 200 according to various embodiments of the disclosure may transmit the generated eighth operation information to the user terminal 100.

In operation 1570, the user terminal 100 according to various embodiments of the disclosure may retrieve and display the image having the specified facial expression among the at least one retrieved image according to the eighth operation information. In operation 1575, the user terminal 100 according to various embodiments of the disclosure may delete the image having the specified facial expression in response to a user request.

Referring to FIG. 15B, the user terminal 100 may display at least one of a first sentence 810, the at least one retrieved image 820, and a user interface 830. The user terminal 100 according to various embodiments of the disclosure may display an indicator 1501 to additionally display the at least one retrieved image 820. The user terminal 100 according to various embodiments of the disclosure may display a menu 838 (e.g., "View NG images") to delete the specified facial expression. The user terminal 100 according to various embodiments of the disclosure may receive user input to select the menu 838 to delete the specified facial expression.

Referring to FIG. 15C, the user terminal 100 according to various embodiments of the disclosure may display at least one image 1504 having the specified facial expression among the at least one retrieved image 820 according to the user input to select the menu 838 to delete the specified facial expression. According to various embodiments of the disclosure, the user terminal 100 may output (e.g., display) the sentence "I have found eight pictures including a frowning face among the pictures taken yesterday" as a second sentence 912. The intelligent server 200 according to various embodiments of the disclosure may generate, as the eighth operation information, information about the operation of the user terminal 100 outputting the sentence "I have found eight pictures including a frowning face among the pictures taken yesterday". The user terminal 100 according to various embodiments of the disclosure may display a menu 1531 to delete the at least one image 1504 having the specified facial expression and a menu 1532 to go back to the previous screen. According to various embodiments of the disclosure, when the menu 1531 to delete the at least one image 1504 having the specified facial expression is selected, the user terminal 100 may display, on each image, a check box to select an image to be deleted. The user terminal 100 according to various embodiments of the disclosure may delete at least one selected image according to user input to delete the at least one image among the at least one image 1504 having the specified facial expression. A delete request according to various embodiments of the disclosure may be input by user utterance (e.g., "Delete frowning pictures!") replaceable/interchangeable with the selection of the menu 1531.

Figure 16A:
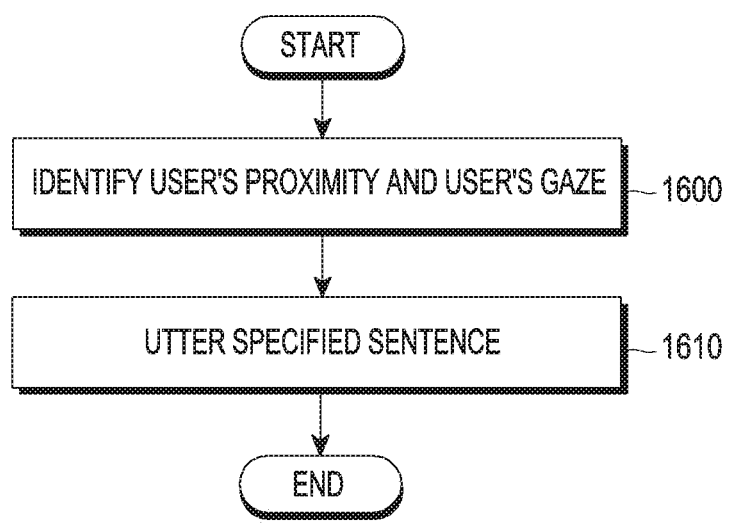
FIG. 16A illustrates an operation of outputting a specified sentence by identifying a user's proximity to or gaze upon a user terminal according to an embodiment of the disclosure.

FIG. 16A illustrates an operation of outputting a specified sentence by identifying a user's proximity to or gaze upon the user terminal 100 according to an embodiment of the disclosure.

Figure 16B:
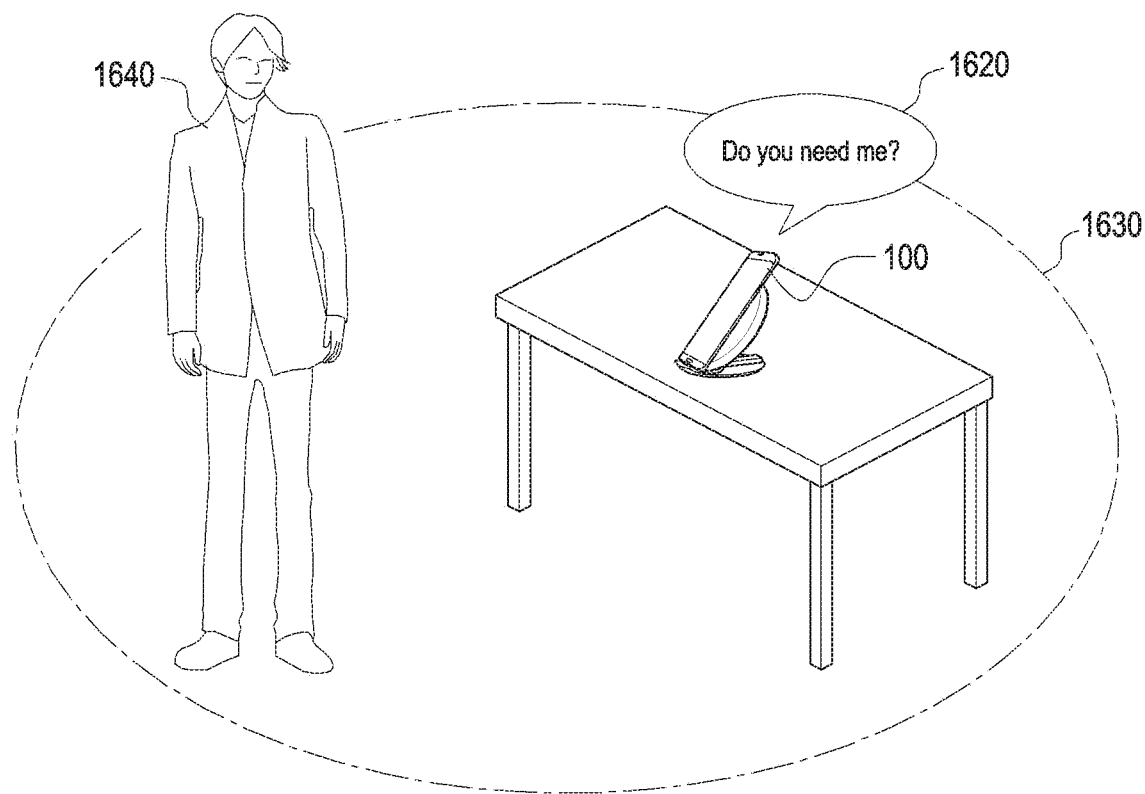
FIG. 16B illustrates an operation of outputting a specified sentence by identifying a user's proximity to or gaze upon a user terminal according to an embodiment of the disclosure.

FIG. 16B illustrates an operation of outputting a specified sentence by identifying a user's proximity to or gaze upon the user terminal 100 according to an embodiment of the disclosure.

Figure 16C:
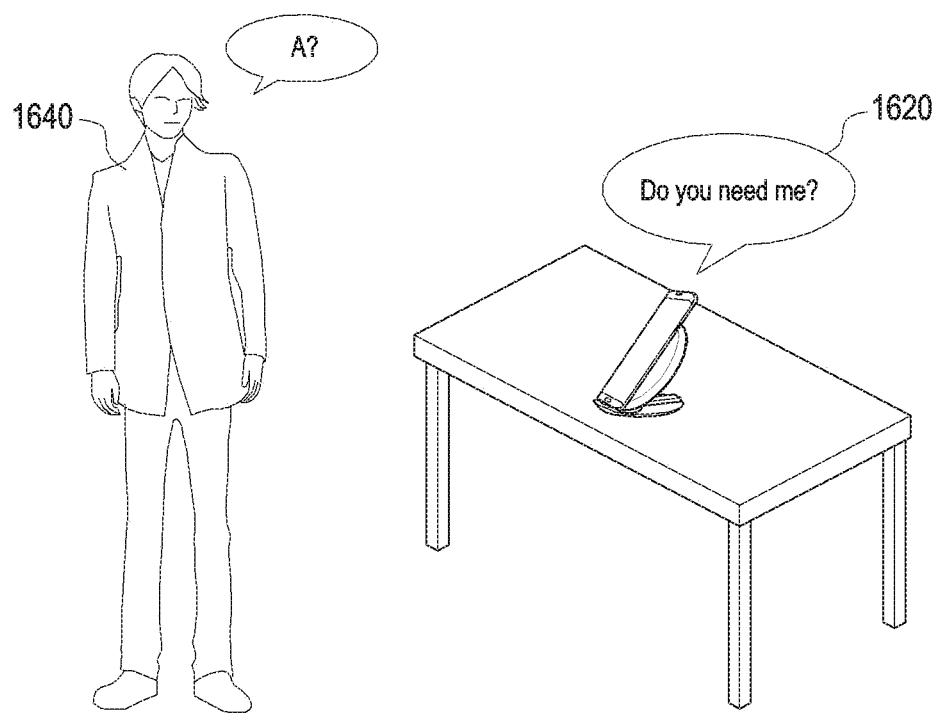
FIG. 16C illustrates an operation of outputting a specified sentence by identifying a user's proximity to or gaze upon a user terminal according to an embodiment of the disclosure.

FIG. 16C illustrates an operation of outputting a specified sentence by identifying a user's proximity to or gaze upon the user terminal 100 according to an embodiment of the disclosure.

Referring to FIG. 16A, in operation 1600, the user terminal 100 according to various embodiments of the disclosure may identify the proximity of the user and the gaze of the user. The user terminal 100 according to various embodiments of the disclosure may identify the proximity of the user and the gaze of the user using a sensor module (e.g., a camera module) of the user terminal 100.

In operation 1610, when the user is detected to be within a specified range and the user gaze is identified to be directed to the user terminal 100, the user terminal 100 according to various embodiments of the disclosure may utter a specified sentence.

Referring to FIG. 16B, the case where a user 1640 is positioned within a specified range 1630 from the user terminal 100 and the gaze of the user 1640 is directed to the user terminal 100 is illustrated. In this case, the user terminal 100 according to various embodiments of the disclosure may output a specified sentence 1620 (e.g., "Do you need me?"). An operation of outputting a specified utterance according to various embodiments of the disclosure may be controlled by an intelligent server 200 (e.g., performed according to operation information received from the intelligent server 200). Alternatively, the operation of outputting the specified utterance according to various embodiments of the disclosure may also be controlled by a processor 150 of the user terminal 100. The user terminal 100 according to various embodiments of the disclosure may output an indicator having a specified color and flashing at a specified speed while outputting the specified sentence 1620 (e.g., "Do you need me?").

Referring to FIG. 16C, an embodiment of waking up a user terminal using a specified one-syllable expression is illustrated. According to various embodiments of the disclosure, when receiving a user utterance including a one-syllable expression (e.g., "A"), the user terminal 100 may switch from a sleep state to a wake-up state (e.g., a state in which an intelligent application is executed). According to various embodiments of the disclosure, when switching to the wake-up state, the user terminal 100 may output the specified sentence 1620 (e.g., "Do you need me?") when the user terminal 100 is switched to the wake-up state.

Figure 17A:
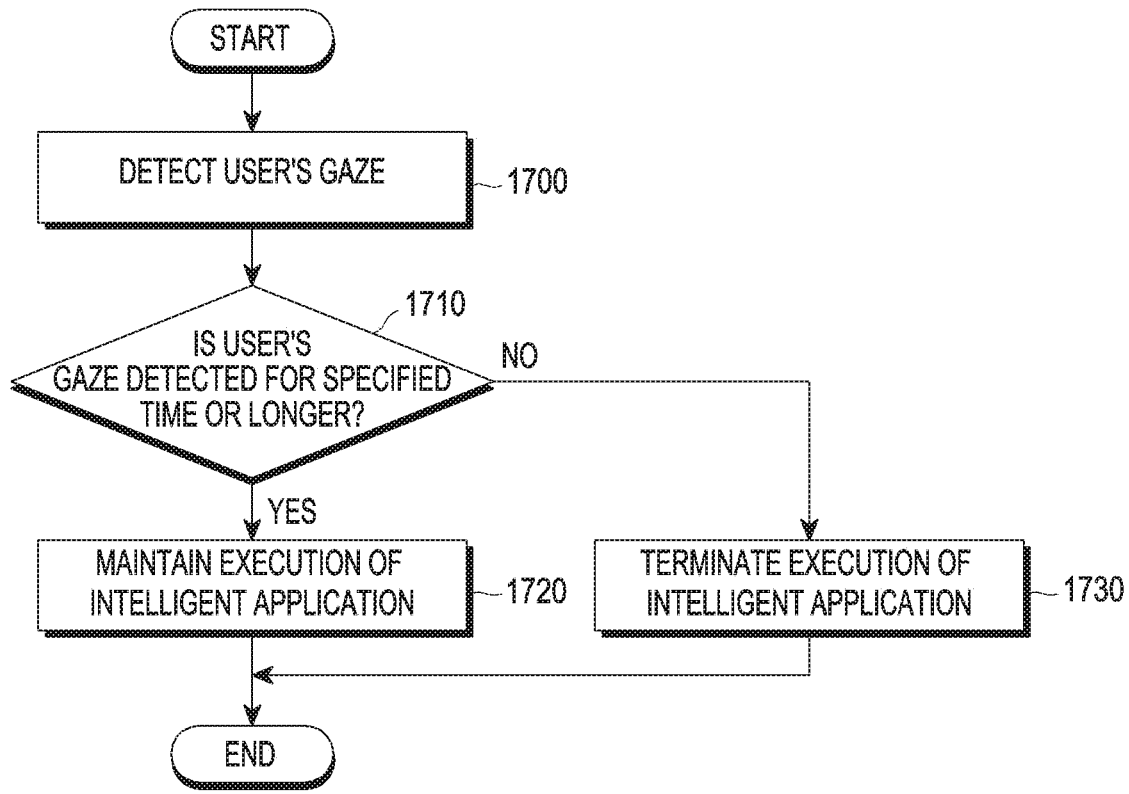
FIG. 17A illustrates an operation of maintaining execution of an intelligent application executed on the basis of a user's gaze or utterance according to an embodiment of the disclosure.

FIG. 17A illustrates an operation of maintaining execution of an intelligent application executed on the basis of a user's gaze or utterance according to an embodiment of the disclosure.

Figure 17B:
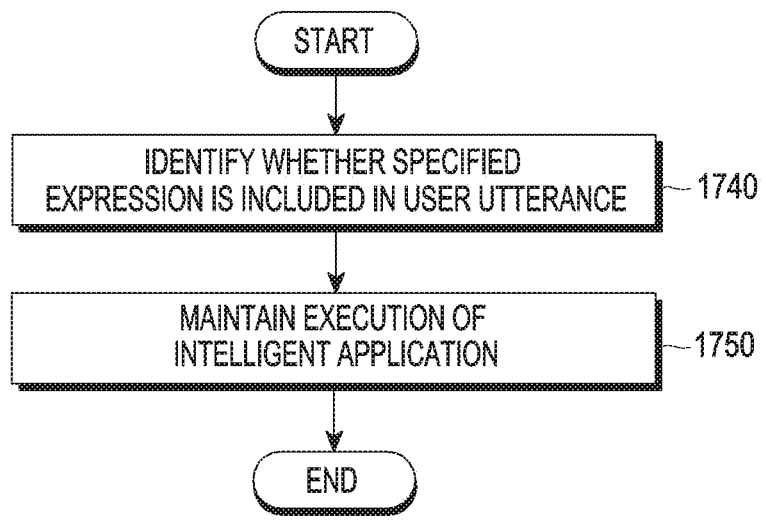
FIG. 17B illustrates an operation of maintaining execution of an intelligent application executed on the basis of a user's gaze or utterance according to an embodiment of the disclosure.

FIG. 17B illustrates an operation of maintaining execution of an intelligent application executed on the basis of a user's gaze or utterance according to an embodiment of the disclosure.

Referring to FIG. 17A, in operation 1700, a user terminal 100 according to various embodiments of the disclosure may detect the gaze of a user. In operation 1710, the user terminal 100 according to various embodiments of the disclosure may determine whether the gaze of the user is continuously detected for a specified time or longer. When it is determined that the gaze of the user is continuously detected for the specified time or longer (yes in operation 1710), the user terminal 100 according to various embodiments of the disclosure may maintain execution of an intelligent application in operation 1720. When it is determined that the gaze of the user is not continuously detected for the specified time or longer (no in operation 1710), the user terminal 100 according to various embodiments of the disclosure may terminate execution of the intelligent application in operation 1730. Operations illustrated in FIG. 17A according to various embodiments of the disclosure may be controlled by the user terminal (e.g., a processor 150) or an intelligent server 200.

Referring to FIG. 17B, in operation 1740, the user terminal 100 according to various embodiments of the disclosure may identify whether a specified expression is included in a user utterance. The specified expression according to various embodiments of the disclosure may include an expression that is unconsciously spoken while the user is speaking, such as "Uhm" or "so". When it is identified that the specified expression is included in the user utterance, the user terminal 100 according to various embodiments of the disclosure may maintain execution of the intelligent application in operation 1750. Operations illustrated in FIG. 17B according to various embodiments of the disclosure may be controlled by the user terminal (e.g., the processor 150) or the intelligent server 200.

Figure 18A:
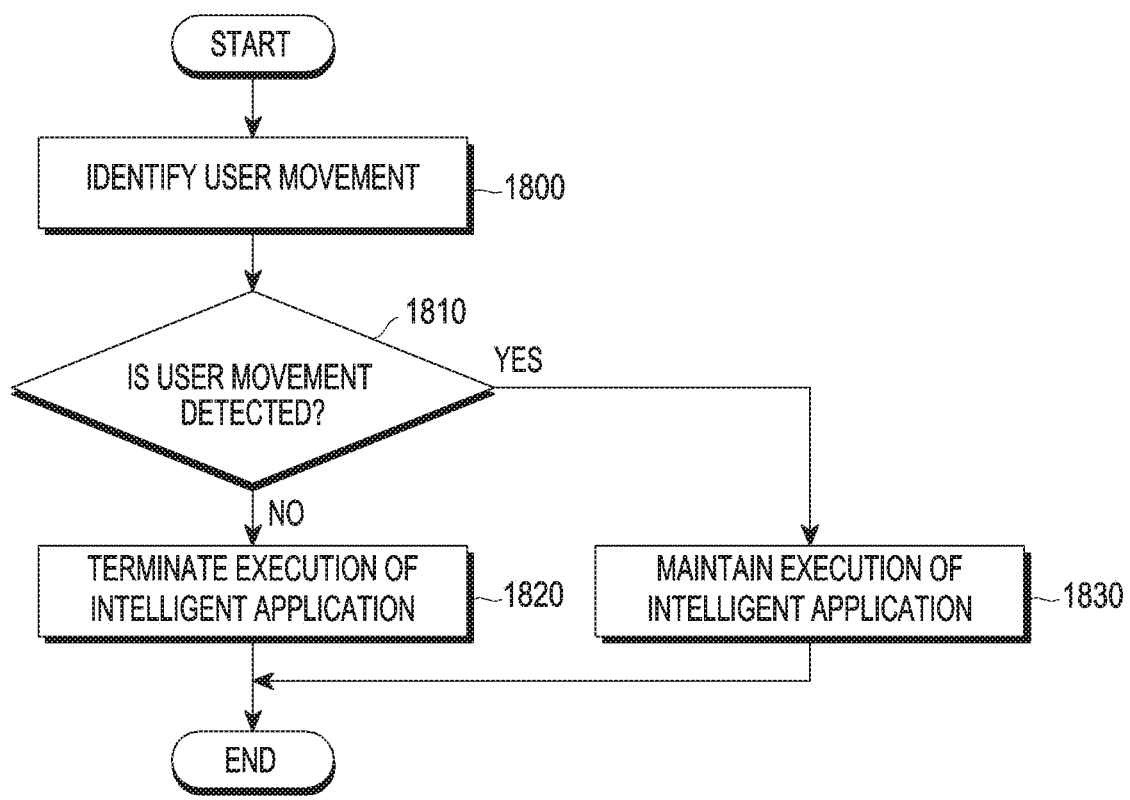
FIG. 18A illustrates an operation of terminating execution of an intelligent application executed on the basis of a user's gaze or utterance according to an embodiment of the disclosure.

FIG. 18A illustrates an operation of terminating execution of an intelligent application executed on the basis of a user's gaze or utterance according to an embodiment of the disclosure.

Figure 18B:
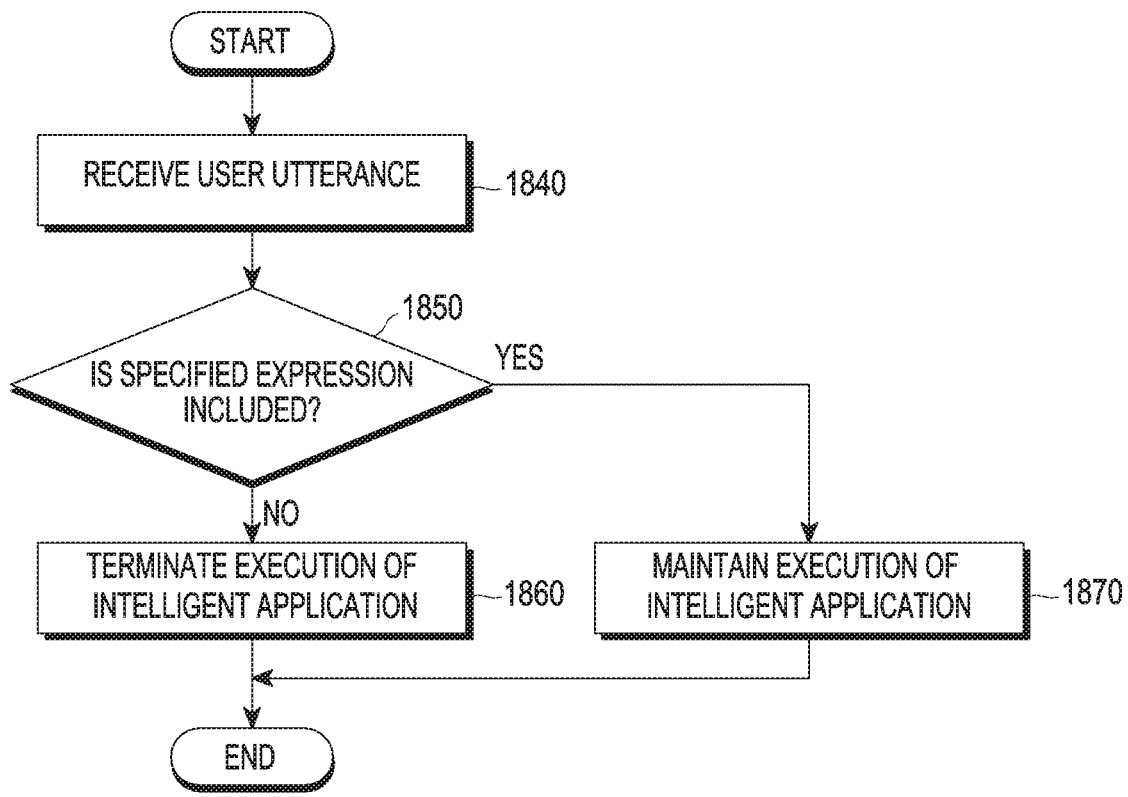
FIG. 18B illustrates an operation of terminating execution of an intelligent application executed on the basis of a user's gaze or utterance according to an embodiment of the disclosure.

FIG. 18B illustrates an operation of terminating execution of an intelligent application executed on the basis of a user's gaze or utterance according to an embodiment of the disclosure.

Referring to FIG. 18A, in operation 1800, a user terminal 100 according to various embodiments of the disclosure may identify the movement of a user. In operation 1810, the user terminal 100 according to various embodiments of the disclosure may identify whether the movement of the user is detected. When the movement of the user is not detected (no in operation 1810), the user terminal 100 according to various embodiments of the disclosure may terminate execution of an intelligent application in operation 1820. When the movement of the user is detected (yes in operation 1810), the user terminal 100 according to various embodiments of the disclosure may maintain execution of the intelligent application in operation 1830. Operations illustrated in FIG. 18A according to various embodiments of the disclosure may be controlled by the user terminal (e.g., a processor 150) or an intelligent server 200.

Referring to FIG. 18B, in operation 1840, the user terminal 100 according to various embodiments of the disclosure may receive a user utterance. In operation 1850, the user terminal 100 according to various embodiments of the disclosure may determine whether a specified expression is included in the user utterance. The specified expression according to various embodiments of the disclosure may include, for example, an imperative expression such as "Tell me" or an interrogative expression such as "What is it?". When the specified expression is not included (no in operation 1850), the user terminal 100 according to various embodiments of the disclosure may terminate execution of the intelligent application in operation 1860. When the specified expression is included (yes in operation 1850), the user terminal 100 according to various embodiments of the disclosure may maintain execution of the intelligent application in operation 1870. Operations illustrated in FIG. 18B according to various embodiments of the disclosure may be controlled by the user terminal (e.g., the processor 150) or the intelligent server 200. The user terminal 100 according to various embodiments of the disclosure may output an indicator having a specified color and flashing according to a specified time interval while the intelligent application is being executed.

Figure 19A:
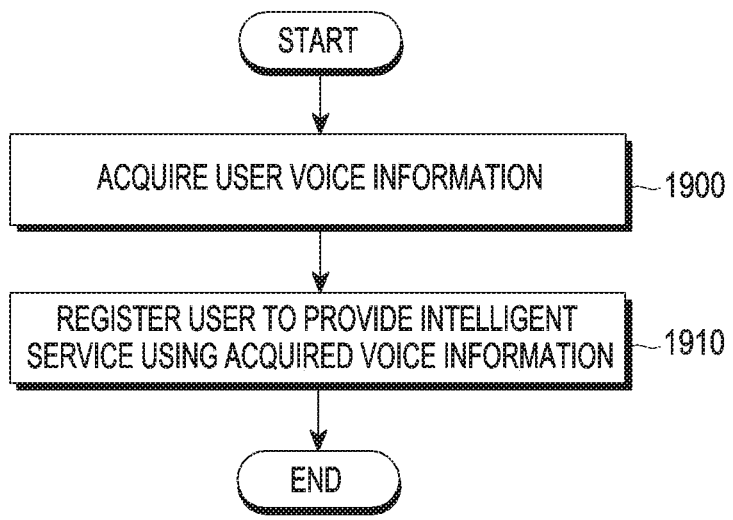
FIG. 19A illustrates an operation of registering the voice of a user on the basis of any user utterance according to an embodiment of the disclosure.

FIG. 19A illustrates an operation of registering the voice of a user on the basis of any user utterance according to an embodiment of the disclosure.

Figure 19B:
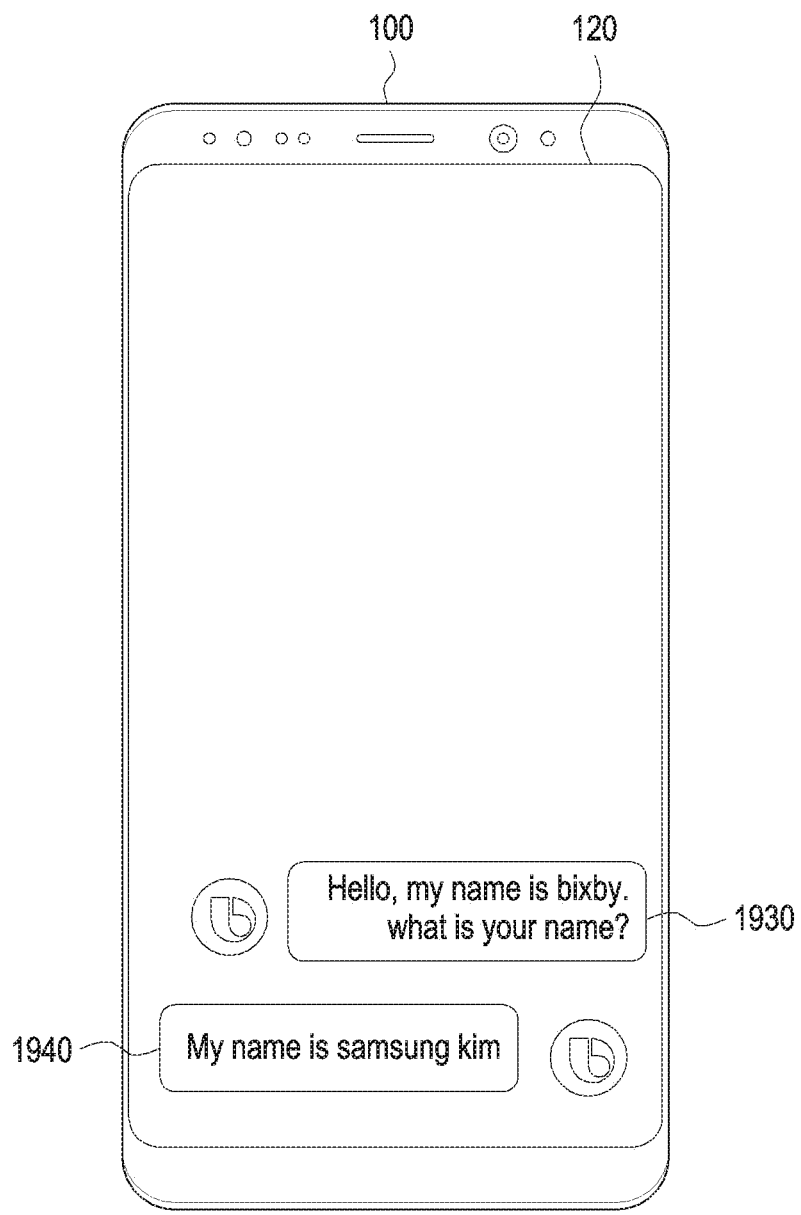
FIG. 19B illustrates an operation of registering the voice of a user on the basis of any user utterance according to an embodiment of the disclosure.

FIG. 19B illustrates an operation of registering the voice of a user on the basis of any user utterance according to an embodiment of the disclosure.

Figure 19C:
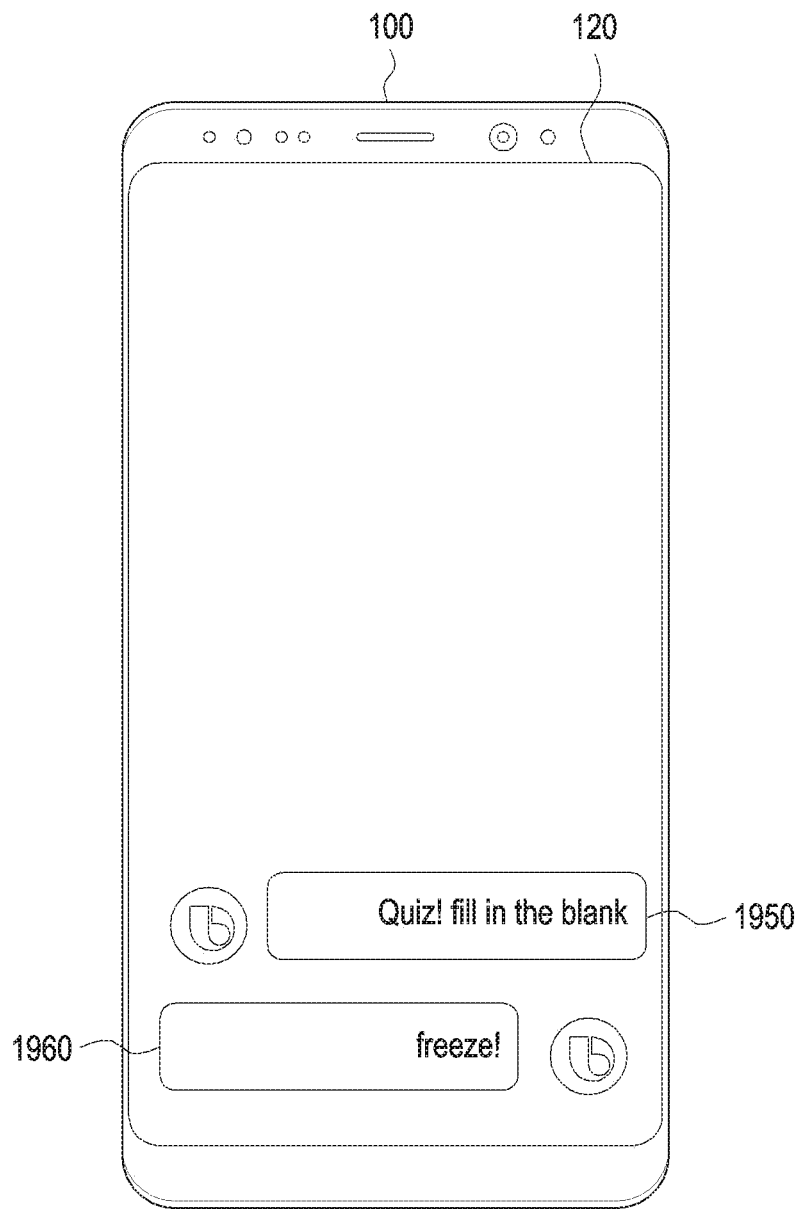
FIG. 19C illustrates an operation of registering the voice of a user on the basis of any user utterance according to an embodiment of the disclosure.

FIG. 19C illustrates an operation of registering the voice of a user on the basis of any user utterance according to an embodiment of the disclosure.

Referring to FIG. 19A, in operation 1900, a user terminal 100 according to various embodiments of the disclosure may acquire voice information about a user. According to various embodiments of the disclosure, the voice information about the user acquired in operation 1900 may be voice information based on any user utterance rather than voice information based on a sentence specified in advance to register the voice information about the user. In operation 1910, the user terminal 100 according to various embodiments of the disclosure may register the user to provide an intelligent service using the acquired voice information.

FIG. 19B and FIG. 19C illustrate an embodiment of storing, in the user terminal 100 or an intelligent server 200, the voice of the user for identifying the user on the basis of any user utterance rather than the sentence specified in advance.

Referring to FIG. 19B, the user terminal 100 according to various embodiments of the disclosure may output a first question 1930 in a dialog type (e.g., "Hello, my name is Bixby. What is your name") to the user in order to register the voice of the user. The user terminal 100 according to various embodiments of the disclosure may display the first question 1930 output as a sound. The user terminal 100 according to various embodiments of the disclosure may receive a first response 1940 (e.g., "My name is Samsung Kim") from the user in response to the first question 1930. The user terminal 100 according to various embodiments of the disclosure may register the user using the received first response 1940.

Referring to FIG. 19C, the user terminal 100 according to various embodiments of the disclosure may output a second question 1950 in a quiz type (e.g., "Quiz! Fill in the blank.") to the user in order to register the voice of the user. The user terminal 100 according to various embodiments of the disclosure may display the second question 1950 output as a sound. The user terminal 100 according to various embodiments of the disclosure may receive a second sentence 1960 (e.g., "Freeze!") from the user in response to the second question 1950. The user terminal 100 according to various embodiments of the disclosure may register the user using the received second sentence 1960.

Figure 20A:
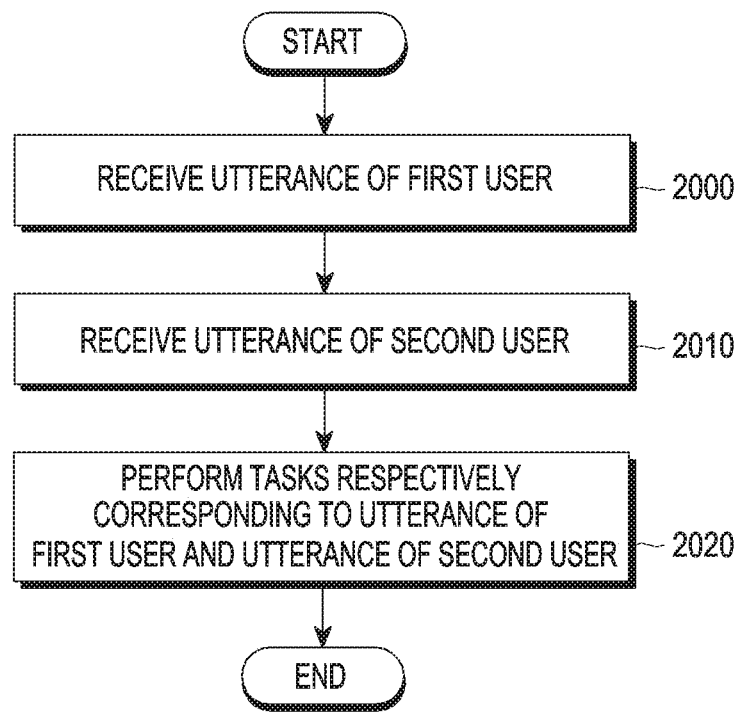
FIG. 20A illustrates an operation of processing the utterance of a first user and the utterance of a second user together when the utterance of the second user is input while the first user is using an intelligent application according to an embodiment of the disclosure.

FIG. 20A illustrates an operation of processing the utterance of a first user and the utterance of a second user together when the utterance of the second user is input while the first user is using an intelligent application according to an embodiment of the disclosure.

Figure 20B:
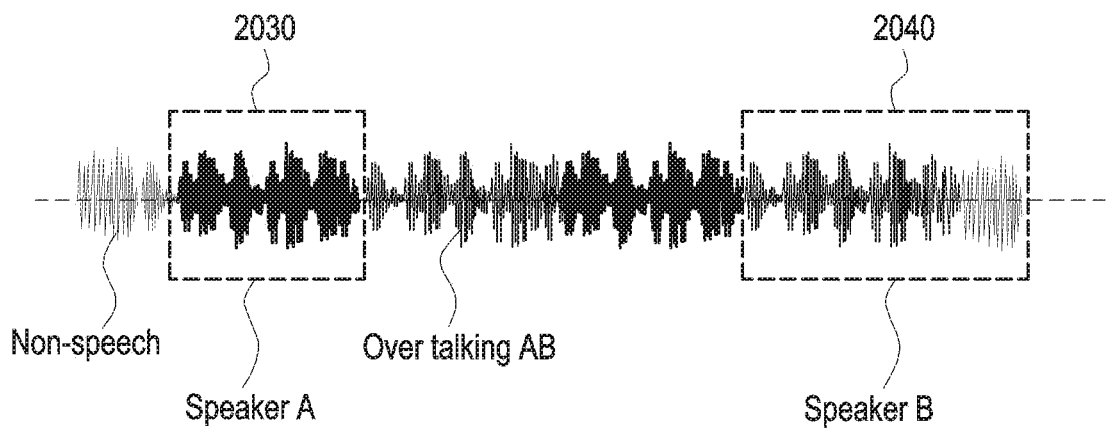
FIG. 20B illustrates an operation of processing the utterance of a first user and the utterance of a second user together when the utterance of the second user is input while the first user is using an intelligent application according to an embodiment of the disclosure.

FIG. 20B illustrates an operation of processing the utterance of a first user and the utterance of a second user together when the utterance of the second user is input while the first user is using an intelligent application according to an embodiment of the disclosure.

Figure 20C:
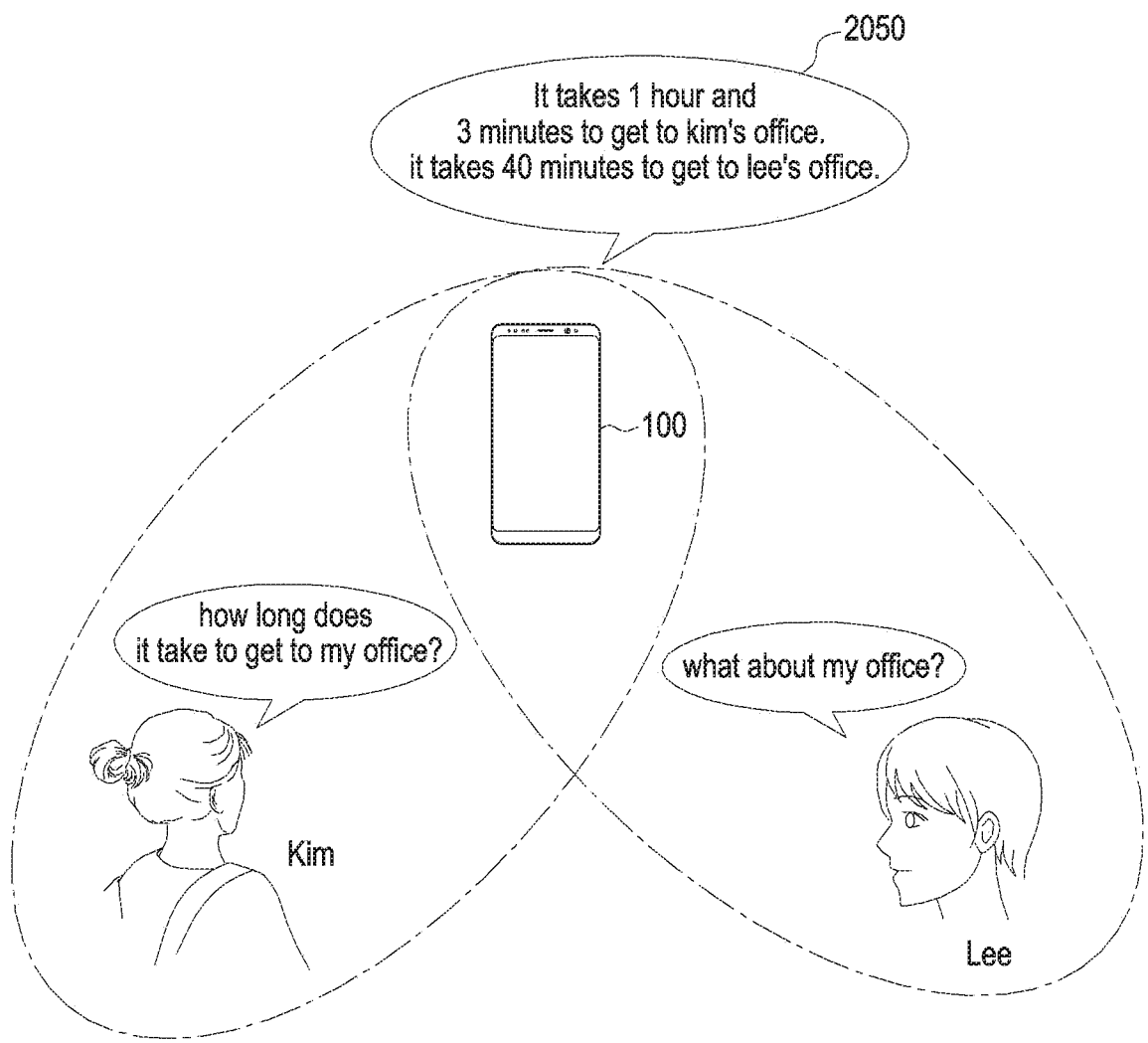
FIG. 20C illustrates an operation of processing the utterance of a first user and the utterance of a second user together when the utterance of the second user is input while the first user is using an intelligent application according to an embodiment of the disclosure.

FIG. 20C illustrates an operation of processing the utterance of a first user and the utterance of a second user together when the utterance of the second user is input while the first user is using an intelligent application according to an embodiment of the disclosure.

Referring to FIG. 20A, in operation 2000, a user terminal 100 according to various embodiments of the disclosure may receive an utterance of a first user. In operation 2010, the user terminal 100 according to various embodiments of the disclosure may receive an utterance of a second user. In operation 2020, the user terminal 100 according to various embodiments of the disclosure may perform tasks respectively corresponding to the utterance of the first user and the utterance of the second user.

Referring to FIG. 20B, the user terminal 100 according to various embodiments of the disclosure may distinguish the utterances of different users by separating the waveform of the voice of the first user (e.g., speaker A) 2030 and the waveform of the voice of the second user (e.g., speaker B) 2040.

Referring to FIG. 20C, when an utterance of the second user (e.g., Lee) is input within a pre-specified time after an utterance of the first user (e.g., Kim) is input, the user terminal 100 according to various embodiments of the disclosure may perform tasks corresponding to the respective utterances of the users and may output the result 2050 of performing the tasks.

Various operations performed by the intelligent server 200 described herein may also be performed by the processor 150 of the user terminal 100.

The user terminal 100 according to various embodiments of the disclosure may include various types of devices. The user terminal 100 according to various embodiments of the disclosure may include, for example, a portable communication device (e.g., a smartphone), a computer, a portable multimedia device, a portable medical device, a camera, a wearable device, or a home appliance. The user terminal 100 according to the embodiment of the disclosure is not limited to the aforementioned devices.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with,", it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments of the disclosure may be configured as software including one or more instructions stored in a storage medium readable by a machine (e.g., the user terminal 100). For example, a processor of the machine may invoke at least one of the one or more stored instructions from the storage medium and may execute the instruction. This allows the machine to be operated to perform at least one function according to the invoked at least one instruction. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

The method according to various embodiments disclosed herein may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of an application store, or a relay server.

According to various embodiments, each component (e.g., a module or a program) of the above-described components may include a single entity or multiple entities. According to various embodiments, one or more components of the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A user terminal comprising:
   at least one processor; and
   a memory,
   wherein the memory is configured to store instructions configured, when executed, to enable the at least one processor to:
   receive a user utterance for classifying a plurality of images according to a specified reference,
   transmit information about the received user utterance to an external electronic device using a communication circuit, and
   perform a task according to received operation information by receiving the operation information associated with the user utterance from the external electronic device based on the information transmitted, and
   wherein the operation information comprises information associated with an operation of providing a first expression, included in the user utterance and corresponding to the specified reference, for classifying the plurality of images and at least one second expression indicating attribute information about a plurality of images classified by the first expression.

2. The user terminal of claim 1, wherein the attribute information comprises at least one of information about a location in which the plurality of images are taken, information about a time at which the plurality of images are taken, information about a relationship between a plurality of people in the plurality of images, information about an emotion associated with at least one person in the plurality of images, or information about an event associated with the plurality of images.

3. The user terminal of claim 1, wherein the operation information further comprises information associated with an operation of the at least one processor displaying at least one user interface for classifying the plurality of images according to the attribute information on a touch screen display of the user terminal.

4. The user terminal of claim 3, wherein the operation information further comprises:
   information associated with an operation of the at least one processor detecting a facial expression of at least one person in the plurality of images in response to a user input via the at least one user interface according to the user input via the at least one user interface, and
   information associated with an operation of the at least one processor changing a specified portion of the at least one person into a pre-specified graphical object and displaying the graphical object on the touch screen display when an emotional state of the at least one person is identified as a first emotional state based on the detected facial expression.

5. The user terminal of claim 3, wherein the operation information further comprises information associated with an operation of the at least one processor identifying at least one of a relationship between a plurality of people in the plurality of images, an emotional state of the plurality of people, or a location in which the plurality of images are taken, and an operation of transmitting the identified one to the external electronic device according to a user input via the at least one user interface.

6. The user terminal of claim 5, wherein the operation information further comprises information associated with an operation of the at least one processor providing a third expression generated by the external electronic device based on at least one of the relationship between the plurality of people, the emotional state, or the location.

7. The user terminal of claim 3, wherein the operation information further comprises information associated with an operation of the at least one processor selectively displaying at least one image comprising a person having a facial expression corresponding to an emotional state selected by a user among the plurality of images according to a user input via the at least one user interface.

8. The user terminal of claim 3, wherein the operation information further comprises information associated with an operation of the at least one processor changing at least one image comprising a person among the plurality of images to an image corresponding to the person, and an operation of displaying the changed image on the touch screen display according to a user input via the at least one user interface.

9. The user terminal of claim 3, wherein the operation information further comprises information associated with an operation of the at least one processor deleting at least one image comprising a person having a facial expression corresponding to a specified emotion according to a user input via the at least one user interface.

10. The user terminal of claim 1, wherein the operation information further comprises information associated with an operation of displaying, on at least one image among the plurality of images, an additional description associated with attribute information about the at least one image.

11. The user terminal of claim 1, wherein the operation information further comprises information associated with an operation of providing the plurality of images and information about a recommended event associated with the first expression.

12. A control method of a user terminal, the control method comprising:
   receiving a user utterance for classifying a plurality of images according to a specified reference;
   transmitting information about the received user utterance to an external electronic device using a communication circuit of the user terminal; and
   performing a task according to operation information by receiving the operation information associated with the user utterance from the external electronic device based on the information transmitted,
   wherein the operation information comprises information associated with an operation of providing a first expression, included in the user utterance and corresponding to the specified reference, for classifying the plurality of images and at least one second expression indicating attribute information about a plurality of images classified by the first expression.

13. The control method of claim 12, wherein the attribute information further comprises at least one of information about a location in which the plurality of images is taken, information about a time at which the plurality of images is taken, information about a relationship between a plurality of people in the plurality of images, information about an emotion associated with at least one person in the plurality of images, or information about an event associated with the plurality of images.

14. The control method of claim 12, wherein the operation information further comprises an operation of at least one processor of the user terminal displaying at least one user interface for classifying the plurality of images according to the attribute information on a touch screen display of the user terminal.

15. The control method of claim 14, wherein the operation information further comprises:
   an operation of at least one processor of the user terminal detecting a facial expression of at least one person in the plurality of images in response to a user input via the at least one user interface according to the user input via the at least one user interface, and
   an operation of the at least one processor changing a specified portion of the at least one person into a pre-specified graphical object and displaying the graphical object on the touch screen display when an emotional state of the at least one person is identified as a first emotional state based on the detected facial expression.

16. The control method of claim 12, wherein the operation information further comprises information associated with an operation of providing the plurality of images and information about a recommended event associated with the first expression.

17. A user terminal comprising:
   at least one processor configured as a portion of the user terminal or configured to remotely communicate with the user terminal; and
   a memory configured to be disposed in the user terminal or outside the user terminal and to be operatively connected to the at least one processor,
   wherein the memory is further configured to store instructions that, when executed, cause the at least one processor to:
      receive a user utterance for classifying a plurality of images according to a specified reference, and
      perform a task associated with the user utterance based on reception of the user utterance, and
   wherein the task comprises a task of providing a first expression, included in the user utterance and corresponding to the specified reference, for classifying the plurality of images and at least one second expression indicating attribute information about the plurality of images classified by the first expression.

18. The user terminal of claim 17, wherein the attribute information further comprises at least one of information about a location in which the plurality of images is taken, information about a time at which the plurality of images is taken, information about a relationship between a plurality of people in the plurality of images, information about an emotion associated with at least one person in the plurality of images, or information about an event associated with the plurality of images.

19. The user terminal of claim 18, wherein, when the emotion associated with the at least one person in the plurality of images is identified, the instruction further cause the at least one processor to alter the at least one person in the plurality of images in conformity with the emotion.

20. The user terminal of claim 19, wherein the altering comprises substituting a face of the at least one person in the plurality of images with an emoji of the emotion.

21. The user terminal of claim 17, wherein the task further comprises a task of the at least one processor displaying at least one user interface for classifying the plurality of images according to the attribute information on a touch screen display of the user terminal.

22. The user terminal of claim 17, wherein the task further comprises a task of displaying, on at least one image among the plurality of images, an additional description associated with attribute information about the at least one image.

23. The user terminal of claim 17, wherein the attribute information further comprises information of an object in at least one image of the plurality of images.

* * * * *